(12) United States Patent
Bross et al.

(10) Patent No.: US 12,003,723 B2
(45) Date of Patent: Jun. 4, 2024

(54) UNIFIED TRANSFORM TYPE SIGNALING AND TRANSFORM TYPE DEPENDENT TRANSFORM COEFFICIENT LEVEL CODING

(71) Applicant: FRAUNHOFER-GESELLSCHAFT ZUR FÖRDERUNG DER ANGEWANDTEN FORSCHUNG E.V., Munich (DE)

(72) Inventors: Benjamin Bross, Berlin (DE); Phan Hoang Tung Nguyen, Berlin (DE); Paul Keydel, Berlin (DE); Heiko Schwarz, Berlin (DE); Detlev Marpe, Berlin (DE); Thomas Wiegand, Berlin (DE); Christian Helmrich, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/208,952

(22) Filed: Jun. 13, 2023

(65) Prior Publication Data
US 2023/0328242 A1   Oct. 12, 2023

Related U.S. Application Data

(63) Continuation of application No. 17/362,869, filed on Jun. 29, 2021, now Pat. No. 11,706,413, which is a
(Continued)

(30) Foreign Application Priority Data

Jan. 2, 2019   (EP) ..................................... 19150112
Mar. 12, 2019  (EP) ..................................... 19162406

(51) Int. Cl.
*H04N 19/12* (2014.01)
*H04N 19/129* (2014.01)
(Continued)

(52) U.S. Cl.
CPC ........... *H04N 19/12* (2014.11); *H04N 19/129* (2014.11); *H04N 19/132* (2014.11); *H04N 19/176* (2014.11); *H04N 19/46* (2014.11)

(58) Field of Classification Search
CPC .... H04N 19/12; H04N 19/129; H04N 19/132; H04N 19/176; H04N 19/46;
(Continued)

(56) References Cited

U.S. PATENT DOCUMENTS

2014/0362925 A1   12/2014 Nguyen
2016/0100168 A1   4/2016  Rapaka et al.
(Continued)

FOREIGN PATENT DOCUMENTS

KR   100627597   9/2006
TW   201626794   7/2016

OTHER PUBLICATIONS

Bross, B., et al, "AHG18: Enabling lossless coding with minimal impact on VVC design" JVET-P0606; m50583, (Oct. 4, 2019), 16. JVET Meeting; Oct. 1, 2019-Oct. 11, 2019; Geneva; (The Joint Video Exploration Team of ISO/IEC JTC1/SC29/WG11 and ITU-T SG.16).
(Continued)

*Primary Examiner* — Richard T Torrente
(74) *Attorney, Agent, or Firm* — NIXON & VANDERHYE P.C.

(57) ABSTRACT

A picture in a data stream is subdivided into different size transform bocks. For a transform block, a transformation is selected by checking whether the block's size exceeds a threshold. If it does, a default technique is used to select the
(Continued)

transformation. If it does not, a transformation is used from a list of transformations as identified by an index, the list including an identity transformation and non-identity transformations. A coefficients block in the data stream is decoded, and if the selected transformation is the identity transformation, then the coefficients block is used as a residual sample array, and if the selected transformation is not the identity transformation, the coefficients block is subjected to an inverse transformation corresponding to the selected transformation to obtain a residual sample array used to correct a prediction for the transform block.

9 Claims, 26 Drawing Sheets

Related U.S. Application Data continuation of application No. PCT/EP2019/087162, filed on Dec. 30, 2019.

(51) Int. Cl.
*H04N 19/132* (2014.01)
*H04N 19/176* (2014.01)
*H04N 19/46* (2014.01)

(58) Field of Classification Search
CPC .. H04N 19/157; H04N 19/467; H04N 19/503; H04N 19/593; H04N 19/61; H04N 19/625; H04N 19/70; H04N 19/102
See application file for complete search history.

(56) References Cited

U.S. PATENT DOCUMENTS

2020/0177901 A1* 6/2020 Choi ................... H04N 19/159
2020/0404308 A1* 12/2020 Filippov .............. H04N 19/107

OTHER PUBLICATIONS

Bross, B., et al, "Versatile Video Coding (Draft 7)" JVET-P2001; m51515, (Nov. 14, 2019), 16. JVET Meeting; Oct. 1, 2019-Oct. 11, 2019; Geneva (Part 1).

Bross, B., et al, "Versatile Video Coding (Draft 7)" JVET-P2001; m51515, (Nov. 14, 2019), 16. JVET MEeting; Oct. 1, 2019-Oct. 11, 2019; Geneva (Part 2).

Chen, J., et al, "Algorithm description for Versatile Video Coding and Test Model 3 (VTM 3)" No. m45226, (Dec. 24, 2018), 124. MPEG Meeting; Oct. 8, 2018-Oct. 12, 2018; Macao; (Motion Picture Expert Group or ISO/IEC JTC1/SC29/WG11.

Egilmez, Hilmi E., et al, "CE6-related: MTS with 4-point DST/DCT-4 and large block support" JVET of ITU-T SG 16 WP 3 and ISOC/IEC JTC 1/SC 29/WG 11; $12^{th}$ Meeting: Macao, CN Oct. 2018.

Ma, T-C, et al, "CE3-2.5: Residual coding selection signaling for lossless coding" JVET-Q0070; m51658, (Dec. 25, 2019), 17. JVET Meeting; Jan. 1, 2020-Jan. 17, 2020; Brussels; (The Joint Video Exploration Team of ISO/IEC JTC1/SC29/WG11 and ITU-T SG.16).

Nguyen, T., et al, "Description of Core Experiment 3 (CE3): Lossless Coding" $16^{th}$ JVET Meeting, Geneva; (The Joint Video Exploration Team of ISO/IEC JTC1/SC29/WG11 and ITU-T SG.16), No. JVET-P2023; m51514, Dec. 18, 2019, XP030224343.

Siekmann, Mischa, "CE6—Set of Transforms (Tests 6.3.1)" No. JVET-L0261, (Sep. 24, 2018), 12. JVET Meeting; Oct. 3, 2018-Oct. 12, 2018; Macao; (The Joint Video Exploration Team of ISO/IEC JTC1/SC29/WG11 and ITU-T SG.16), URL:http://phenix.int-evry.fr/jvet/doc_end_user/documents/12_Macao/wg11/JVET-L0261-v1.zip.

Bross, B., et al, JVET-L1001-v9, "Working Draft 3 of Versatile Video Coding" Macao, Oct. 2018.

Zhao et al, "CE6-related: Unification of Transform Skip mode and MTS" Document: JVET-L0289, Joint Video Experts Team (JVET) of ITU-T SG 16 WP 3 and ISO/IEC JTC 1/SC 29/WG 11, $12^{th}$ Meeting, Macao, CN, Oct. 3-12, 2018, 7 pages.

Bross et al, "Versatile Video Coding (Draft 2)" Document: JVET-K1001-v6, Joint Video Experts Team (JVET) of ITU-T SG 16 WP 3 and ISO/IEC JTC 1/SC 29 WG 11, $11^{th}$ Meeting, Ljubljana, SI, Jul. 10-18, 2018, 9 pages.

Panusopone et al, "Removal of last coefficient coding in transform skipping mode" Document: JCTVC-J0309-r3, Joint Collaborative Team on Video Coding (JCT-VC) of ITU-T SG16 WP3 and ISO/IEC JTC1/SC29/WG11, $10^{th}$ Meeting, Stockholm, SE, Jul. 11-20, 2012, 8 pages.

* cited by examiner

K1                  c-block

\* distribution based on select trafo = TSM

UNIFIED TRANSFORM TYPE SIGNALING AND TRANSFORM TYPE DEPENDENT TRANSFORM COEFFICIENT LEVEL CODING

CROSS-REFERENCES TO RELATED APPLICATIONS

This application is a continuation of U.S. application Ser. No. 17/362,869, filed Jun. 29, 2021, which is a continuation of PCT International Application No. PCT/EP2019/087162, filed Dec. 30, 2019, which claims the benefit of European Application Nos. EP 19150112.1, filed Jan. 2, 2019, and EP 19162406.3, filed Mar. 12, 2019, the entire contents of each of which are incorporated herein by reference in this application.

BACKGROUND OF THE INVENTION

Embodiments according to the invention related to unified transform type signaling and transform type dependent transform coefficient level coding.

Hybrid video compression schemes, such as AVC and HEVC, rely on block-based prediction followed by transform of the prediction residual, quantization of the transform coefficients, and entropy coding of the quantization indices. The latter is also referred to as transform coefficient level coding, or shortly level coding in the remainder of this document. The following description uses the term transform also for integer approximations of transforms as implemented in practical hybrid video compression schemes.

Conventionally, a fixed transform is specified in a video coding standard for each potential block size N×N. For example, the HEVC standard specifies the usage of a DCT-II, except for intra-picture predicted 4×4 blocks, for which a DST-VI is used. Higher compression efficiency can be achieved by enabling a choice between multiple per-defined transform types. The current draft for Versatile Video Coding (VVC) specifies a set of five different transform types (including the DCT-II). Together with the transform skip mode (TSM), where the transform is equal to the identity transform, in total six transform types are supported. The bitstream syntax includes a syntax by which the transform type selected by the encoder is signaled to the decoder. The coding is transform coefficient levels is independent of the selected transform type.

The presented invention describes a method for increasing the compression efficiency by a) unifying the signaling of the selected transform type and b) providing dedicated level coding techniques depending on the selected transform type.

Current state-of-the-art video coding technologies, including the VVC development, specify means to signal one of multiple pre-defined transform types including the possibility to skip the transform with TSM (i.e., using the identify transform). The entropy coding of the transform coefficient levels (i.e., the quantization indexes for the transform coefficients) is independent of the selected transform.

Transform Type Signaling

The current VVC development specifies N×M transform blocks with N≤64 and M≤64, and both N and M being integer powers of 2. Note that, in contrast to HEVC, rectangular (non-square) transform blocks are possible. When N≤32 and M≤32, additional transform types besides the DCT-II are available, with the technique being referred to as Multiple Transforms Selection (MTS). Similar to HEVC, for 4×4 transform blocks, the transform skip mode (TSM) is an additional coding option, which can be interpreted as using an identity transform. In the transform skip mode (TSM), prediction residual is processed directly by the quantization stage, skipping the transform stage. The Range Extensions profiles of HEVC specify an extension for TSM, which allows the usage of TSM for all transform block sizes (i.e., not only for 4×4 blocks).

High-level syntax elements (coded in the sequence parameter set) indicate whether MTS is enabled for intra-picture predicted blocks and/or inter-picture predicted blocks. When MTS is enabled, a coding unit (CU) level flag signals whether MTS is enabled for the CU whereas the selected transform type is specified by an index at transform unit (TU) level. In the current design of VVC, the usage of MTS is limited to luma transform blocks only. For the CU MTS flag, the employed context model depends on the coding quad-tree depth. A fixed binarization is employed for the TU MTS index, i.e., the selected transform type. Four possible transform types resulting in a 2-bin fixed-length code with each bin index employs two dedicated context models, one for intra-picture and one inter-picture predicted CUs. The mapping between TU MTS index, its binarization and the different transform types for horizontal and vertical transform directions is shown in the following table (table 1).

TABLE 1

| MTS signaling using CT MTS flag and TU MTS index | | | | |
|---|---|---|---|---|
| CU | TU MTS index | | transform type | |
| MTS flag | value | binarization | horizontal | vertical |
| 0 | — | — | DCT-II | DCT-II |
| 1 | 0 | 00 | DST-VII | DST-VII |
| 1 | 1 | 01 | DCT-VIII | DST-VII |
| 1 | 2 | 10 | DST-VII | DCT-VIII |
| 1 | 3 | 11 | DCT-VIII | DCT-VIII |

For TSM, a high-level flag (coded in the picture parameter set) indicates whether TSM is enabled. When TSM is enabled and MST is disabled, one flag per transform block signals that the transform stage is skipped for the block of the corresponding color component (Y, Cb or Cr).

Level Coding

The level coding in HEVC, as well as in the current VVC development, is independent from the selected transform type. In VVC (Draft 3), the level coding is similar to that of HEVC. First, the bitstream includes a flag that signals the significance of a transform block (coded block flag, CBF), i.e., the existence of a quantization index (level) unequal to zero. Second, when the block is significant (i.e., it includes any quantization index not equal to zero), the last significant scanning position is specified as offsets from the root in x and y coordinates with the root being located on the top-left corner of the transform block. Transform blocks 84 larger than 4×4 are divided into disjoint 4×4 sub-blocks 84' as illustrated in Figure. In the current VVC design, a diagonal scanning pattern 85 is used to scan the subblocks 84' as well as the levels inside the subblock 84'.

FIG. 25 shows an example of a transform block 84 divided into 16 4×4 subblocks 84' and the reverse diagonal scan patterns 85 used to scan the level inside a subblock 84' as well as the subblocks 84' inside a transform block 84.

The scanning of the transform block is done in a sub-block first manner. Particularly, the sub-block that contains the last significant scanning position is processed first and each sub-block is treated similar to a regular 4×4 block. For each sub-block that follows the sub-block with the last significant scanning position, a CBF is transmitted (coded_sub_block_flag). This subblock CBF signals the significance of the corresponding sub-block, except for the sub-block that contains the DC frequency position (top-left inside a transform block). Consequently, the levels at frequency positions covered by the top-left sub-block are always coded.

The coding of the levels within each sub-block is as follows. In a first scan pass, the significance flag is coded (sig_coeff_flag), which indicates whether the current absolute level is greater than zero, followed by the greater than one information (abs_level_gt1_flag) and the parity information (par_level_flag). The three syntax elements are coded for each scanning position covered by the current sub-block forming the first scanning pass. When an absolute level is equal to 0, sig_coeff_flag is coded equal to 0 and the subsequent syntax is not coded but inferred to be equal to 0 instead. Similarly, when an absolute level is equal to 1, sig_coeff_flag is equal to 1, abs_level_gt1_flag is coded equal to 0 and the subsequent syntax is not coded but inferred to be equal to 0 instead. The absolute level at scan position n after the first pass is calculated as:

AbsLevelPass1($n$)=sig_coeff_flag($n$)+par_level_flag($n$)+abs_level_$gt$1_flag($n$)

In the next scanning pass, the greater than three flag (abs_level_gt3_flag) is transmitted followed by the third scanning pass with the remainder information (abs_remainder). The absolute level at scan position n is calculated as:

AbsLevel($n$)=AbsLevelPass1($n$)+2*(abs_level_$gt$3_flag($n$)+abs_remainder($n$))

The last scanning pass transmits the sign for the significant scanning positions (coeff_sign_flag) and the level at scan position n is calculated as:

Level($n$)=(2*AbsLevel($n$)+(QState>1?1:0))*(1−2*coeff_sign_flag($n$))

Where QState is the current quantization state QState for dependent quantization, which depends on the previous state and the parity of the previously coded levels as follows:

QState=QStateTransTable(QState)(par_level_flag)

Dependent quantization was added during VVC development with the state transition table QStateTransTable( )( ) as given in Table 2 and QState being reset to 0 at the start of each transform block. In case dependent quantization is disabled by a high-level flag, e.g. at slice or tile header level, QState is equal to 0 (which can be achieved by using a state transition table with all entries being equal to zero).

TABLE 2

| Quantization state transition table QStateTrans Table(i)(j) with i = 0..3 representing the previous state and j = 0, 1 representing the parity of the previous transform coefficient level (i.e., the previous quantization index) | | | | |
|---|---|---|---|---|
| j/i | 0 | 1 | 2 | 3 |
| 0 | 0 | 2 | 1 | 3 |
| 1 | 2 | 0 | 3 | 1 |

The current VVC development includes a limitation on the number of bins which are coded using context models, denoted as context coded bins (CCB) in the following text. When all absolute levels for all sub-blocks within a transform block are ≥4, the number of CCB per level is equal to four since each of the bins related to the four flags sig_coeff_flag, abs_level_gt1_flag, par_level_flag, and abs_level_gt3_flag is using a context (i.e., an adaptive probability model). In order to restrict the worst-case complexity of entropy decoding, e.g. from four to two CCB per level, the number of CCB is tracked in the first scanning pass (sig_coeff_flag, abs_level_gt1_flag, par_level_flag). For example, this can be done by counting down the remaining bins in the first pass from 28 (remBinsPass1) and leaving 4 bins for the second pass (remBinsPass2) when abs_level_gt3_flag is parsed. When a specific number of CCBs has been reached, the level coding process skips the following CCB information (e.g. sig_coeff_flag, abs_level_gt1_flag, and par_level_flag when remBinsPass1 is equal to 0 and abs_level_gt3_flag when remBinsPass2 is equal to 0) and, instead, codes the absolute levels in bypass mode of the arithmetic coding engine, resulting in an adaptive binarization scheme. In case the maximum number of CCB has been reached and there are still scan positions remaining with levels to code, the remaining absolute levels are all coded in bypass mode using a different remainder binarization (dec_abs_level).

Table 3 illustrates a syntax table for the afore-described state-of-the-art level coding with limitation of CCB using remBinsPass1 and remBinsPass2.

TABLE 3

| Example state-of-the-art residual coding syntax independent of transform type | |
|---|---|
| residual_coding(x0, y0, log2TbWidth, log2TbHeight, cldx) { | Descriptor |
|   last_sig_coeff_x_prefix | ae(v) |
|   last_sig_coeff_y_prefix | ae(v) |
|   if(last_sig_coeff_x_prefix > 3) | |
|     last_sig_coeff_x_suffix | ae(v) |
|   if(last_sig_coeff_y_prefix > 3) | |
|     last_sig_coeff_y_suffix | ae(v) |
|   ... | |
|   /* derive lastSubBlock, lastScanPos from last_sig_coeff_x/y syntax */ | |
|   ... | |
|   /* Loop over subblocks from last significant to the top-left (DC) subblock */ | |
|   numSigCoeff = 0 | |
|   QState = 0 | |
|   for(i = lastSubBlock; i >= 0; i− −) { | |
|     startQStateSb = QState | |

TABLE 3-continued

Example state-of-the-art residual coding syntax independent of transform type

| residual_coding(x0, y0, log2TbWidth, log2TbHeight, cIdx) { | Descriptor |
|---|---|
|     xS = DiagScanOrder(log2TbWidth − log2SbSize)(log2TbHeight − log2SbSize)(lastSubBlock)(0) | |
|     yS = DiagScanOrder(log2TbWidth − log2SbSize)(log2TbHeight − log2SbSize)(lastSubBlock)(1) | |
|     inferSbDcSigCoeffFlag = 0 | |
|     if((i < lastSubBlock) && (i > 0)) { | |
|       coded_sub_block_flag(xS)(yS) | ae(v) |
|       inferSbDcSigCoeffFlag = 1 | |
|     } | |
|     firstSigScanPosSb = numSbCoeff | |
|     lastSigScanPosSb = −1 | |
|     remBinsPass1 = (log2SbSize < 2 ? 6 : 28) | |
|     remBinsPass2 = (log2SbSize < 2 ? 2 : 4) | |
|     firstPosMode0 = (i = = lastSubBlock ? lastScanPos − 1 : numSbCoeff − 1) | |
|     firstPosMode1 = −1 | |
|     firstPosMode2 = −1 | |
| /* First scan pass */ | |
|     for(n = (i = = firstPosMode0; n >= 0 && remBinsPass1 >=3; n− −) { | |
|       xC = (xS << log2SbSize) + DiagScanOrder(log2SbSize)(log2SbSize)(n)(0) | |
|       yC = (yS << log2SbSize) + DiagScanOrder(log2SbSize)(log2SbSize)(n)(1) | |
|       if(coded_sub_block_flag(xS)(yS) && (n>0 \|\| !inferSbDcSigCoeffFlag)) { | |
|         sig_coeff_flag(xC)(yC) | ae(v) |
|         remBinsPass1− − | |
|         if(sig_coeff_flag(xC)(yC)) | |
|           inferSbDcSigCoeffFlag = 0 | |
|       } | |
|       if(sig_coeff_flag(xC)(yC)) { | |
|         numSigCoeff++ | |
|         abs_level_gt1_flag(n) | ae(v) |
|         remBinsPass1− − | |
|         if(abs_level_gt1_flag(n)) { | |
|           par_level_flag(n) | ae(v) |
|           remBinsPass1− − | |
|           if(remBinsPass2 > 0) { | |
|             remBinsPass2− − | |
|             if(remBinsPass2 = = 0) | |
|               firstPosMode1 = n − 1 | |
|           } | |
|         } | |
|         if(lastSigScanPosSb = = −1) | |
|           lastSigScanPosSb = n | |
|         firstSigScanPosSb = n | |
|       } | |
|       AbsLevelPass1(xC)(yC) = | |
|         sig_coeff_flag(xC)(yC) + par_level_flag(n) + abs_level_gt1_flag(n) | |
|       if(dep_quant_enabled_flag) | |
|         QState = QStateTransTable(QState)(AbsLevelPass1(xC)(yC) & 1) | |
|       if(remBinsPass1 < 3) | |
|         firstPosMode2 = n − 1 | |
|     } | |
|     if(firstPosMode1 < firstPosMode2) | |
|       firstPosMode1 = firstPosMode2 | |
| /* Second scan pass */ | |
|     for(n = numSbCoeff − 1; n >= firstPosMode2; n− −) | |
|       if(abs_level_gt1_flag(n)) | |
|         abs_level_gt3_flag(n) | ae(v) |
| /* remainder scan pass */ | |
|     for(n = numSbCoeff − 1; n >= firstPosMode1; n− −) { | |
|       xC = (xS << log2SbSize) + DiagScanOrder(log2SbSize)(log2SbSize)(n)(0) | |
|       yC = (yS << log2SbSize) + DiagScanOrder(log2SbSize)(log2SbSize)(n)(1) | |
|       if(abs_level_gt3_flag(n)) | |
|         abs_remainder(n) | ae(v) |
|       AbsLevel(xC)(yC) = AbsLevelPass1(xC)(yC) + | |
|           2 * (abs_level_gt3_flag(n) + abs_remainder(n)) | |
|     } | |
|     for(n = firstPosMode1; n > firstPosMode2; n− −) { | |
|       xC = (xS << log2SbSize) + DiagScanOrder(log2SbSize)(log2SbSize)(n)(0) | |
|       yC = (yS << log2SbSize) + DiagScanOrder(log2SbSize)(log2SbSize)(n)(1) | |
|       if(abs_level_gt1_flag(n)) | |
|         abs_remainder(n) | ae(v) |
|       AbsLevel(xC)(yC) = AbsLevelPass1 (xC)(yC) + 2 * abs_remainder(n) | |
|     } | |
|     for(n = firstPosMode2; n >= 0; n− −) { | |
|       xC = (xS << log2SbSize) + DiagScanOrder(log2SbSize)(log2SbSize)(n)(0) | |
|       yC = (yS << log2SbSize) + DiagScanOrder(log2SbSize)(log2SbSize)(n)(1) | |
|       dec_abs_level (n) | ae(v) |
|       if(AbsLevel(xC)(yC) > 0) | |
|         firstSigScanPosSb = n | |

TABLE 3-continued

Example state-of-the-art residual coding syntax independent of transform type

| residual_coding(x0, y0, log2TbWidth, log2TbHeight, cldx) { | Descriptor |
|---|---|
|     if(dep_quant_enabled_flag) | |
|         QState = QStateTransTable(QState)(AbsLevel(xC)(yC) & 1) | |
|     } | |
|   /* sign scan pass */ | |
|   for(n = numSbCoeff − 1; n >= 0; n− −) { | |
|     xC = (xS << log2SbSize) + DiagScanOrder(log2SbSize)(log2SbSize)(n)(0) | |
|     yC = (yS << log2SbSize) + DiagScanOrder(log2SbSize)(log2SbSize)(n)(1) | |
|     if(sig_coeff_flag(xC)(yC) && (n != firstSigScanPosSb)) | |
|         coeff_sign_flag(n) | ae(v) |
|   } | |
|   if(dep_quant_enabled_flag) { | |
|     QState = startQStateSb | |
|     for(n = numSbCoeff − 1; n >= 0; n− −) { | |
|         xC = (xS << log2SbSize) + DiagScanOrder(log2SbSize)(log2SbSize)(n)(0) | |
|         yC = (yS << log2SbSize) + DiagScanOrder(log2SbSize)(log2SbSize)(n)(1) | |
|         if(sig_coeff_flag(xC)(yC)) | |
|             TransCoeffLevel(x0)(y0)(cldx)(xC)(yC) = | |
|                 (2 * AbsLevel(xC)(yC) − (QState > 1 ? 1 : 0))* | |
|                 (1 − 2 * coeff_sign_flag(n)) | |
|         QState = QState TransTable(QState)(par_level_flag(n)) | |
|   } else { | |
|     sumAbsLevel = 0 | |
|     for(n = numSbCoeff − 1; n >= 0; n− −) { | |
|         xC = (xS << log2SbSize) + DiagScanOrder(log2SbSize)(log2SbSize)(n)(0) | |
|         yC= (yS << log2SbSize) + DiagScanOrder(log2SbSize)(log2SbSize)(n)(1) | |
|         if(sig_coeff_flag(xC)(yC)) { | |
|             TransCoeffLevel(x0)(y0)(cldx)(xC)(yC) = | |
|                 AbsLevel(xC)(yC) * (1 − 2 * coeff_sign_flag(n)) | |
|         } | |
|     } | |
|   } | |
|   } | |
| } | |

For the context model selection of the sig_coeff_flag, abs_level_gt1_flag, par_level_flag, and abs_level_gt3_flag syntax, a local template evaluates the activity around the current scanning position n. Five already processed neighbors are considered: right ($NB_0$), below ($NB_1$), right plus one ($NB_2$), below plus one ($NB_3$), and below-right ($NB_4$).

| 0\0 | ... | xC | xC + 1 | xC + 2 | ... |
|---|---|---|---|---|---|
| ... | ... | ... | ... | ... | |
| yC | ... | n | $NB_0$ | $NB_2$ | |
| yC + 1 | ... | $NB_1$ | $NB_4$ | | |
| yC + 2 | ... | $NB_3$ | | | |
| ... | | | | | |

For a current scan position n at (xC, yC) with xC and yC being the horizontal and vertical offset relative to the top-left corner of the current transform block, three values are used: the current diagonal within the transform block d, the number of significant neighbors locNumSig and their sum of absolute values after the first pass locSumAbsPass1. Note that the latter may only contain partial information since the whole absolute level information is only known after the scanning pass for the remainder information. The values can be calculated as follows:

$$d = xC + yC$$

$$locNumSig = \sum_{i=0}^{4} sig\_coeff\_flag(NB_i)$$

$$locSumAbsPass1 = \sum_{i=0}^{4} AbsLevelPass1(NB_i)$$

The context models for sig_coeff_flag, abs_level_gt1 flag, par_level_flag, and abs_level_gt3_flag syntax are selected by an index or offset into a context set which is derived from the diagonal d and, additionally for sig_coeff_flag, also from the quantization state QState. For the sig_coeff_flag syntax, the context offset within the context set is derived by the absolute sum locSumAbsPass1. The context offset derivation for abs_level_gt1_flag, par_level_flag, and abs_level_gt3_flag is the same: the number of significance positions locNumSig is subtracted from the absolute sum locSumAbsPass1. As a special feature, a dedicated context model is used for the syntax elements of the last significant scanning position.

The remainder is coded in the bypass mode of the entropy coder using a combination of Golomb-Rice (Rm) and Exponential-Golomb (EGk) codes. The order m for the Rice and k for the EG codes are derived based on the already coded remainder values inside a subblock (similar to HEVC).

Due to the limitation on the number of CCBs, there are two additional remainder scanning passes. In the first additional scanning pass after the regular remainder scanning pass, the remainder for the scanning positions with only the sig_coeff_flag, abs_level_gt1 flag, and par_level_flag syntax elements is transmitted, i.e., the abs_level_gt3_flag syntax has been skipped for these positions. In the second additional scanning pass, the remainder for the scanning positions without any syntax elements are coded. Note that the scanning pass also means that the absolute levels are coded in bypass mode completely. For this last remainder pass, the binarization parameters m and k are derived using another local template having the same shape as the used one for the sig_coeff_flag syntax. The absolute sum inside the template is taken and mapped to a Rice parameter n which directly leads to the order of the EG codes with the relationship k=m+1.

SUMMARY

An embodiment according to this invention is an apparatus for decoding a picture using predictive coding and block-based transform residual coding, configured to subdivide the picture into transform bocks of different sizes. The apparatus is configured to select, for a predetermined transform block, a selected transformation by checking whether a size of the predetermined transform block exceeds a predetermined threshold size. If the size of the predetermined transform block exceeds the predetermined threshold size, the apparatus is configured to use a default way for selecting the selected transformation. If the size of the predetermined transform block does not exceed the predetermined threshold size, the apparatus is configured to use a transformation which is pointed to out of a predetermined list of transformations by an index transmitted in the data stream for the predetermined transform block as the selected transformation, the predetermined list of transformations comprising an identity transformation and non-identity transformations. Furthermore the apparatus is configured to decode, for the predetermined transform block, a block of coefficients from the data stream, if the selected transformation is the identity transformation, use the block of coefficients as residual sample array for the predetermined transform block, and if the selected transformation is not the identity transformation, subject the block of coefficients to an inverse transformation corresponding to the selected transformation to obtain the residual sample array for the predetermined transform block. Additionally the apparatus is configured to correct a prediction for the predetermined transform block (this might be spatial or temporal prediction with this not being valid for all following occurrences) using the residual sample array to reconstruct the predetermined transform block.

An embodiment according to this invention is an apparatus for decoding a picture using predictive coding and block-based transform residual coding, configured to select, for a predetermined transform block, a selected transformation by decoding an index from the data stream for the predetermined transform block, and by using as the selected transformation, one transformation out of a predetermined list of transformations onto which the index points. Furthermore the apparatus is configured to decode, for the predetermined transform block, a block of coefficients from the data stream, derive from the block of coefficients a residual sample array for the predetermined transform block so that the block of coefficients is related to the residual sample array according to the selected transformation and correct a prediction for the predetermined transform block using the residual sample array to reconstruct the predetermined transform block. Additionally the apparatus is configured to, in decoding, for the predetermined transform block, the block of coefficients from the data stream depending on whether the selected transformation for the predetermined block is contained in a predefined set of one or more transformations, decode a coded block flag from the data stream signaling whether the block of coefficients has at least one non-zero coefficient, if the selected transformation for the predetermined block is contained in the predefined set of one or more transformations, and infer that the block of coefficients has at least one non-zero coefficient, if the selected transformation for the predetermined block is not contained in the predefined set of one or more transformations (in other words, then not decoding the CBF from the data stream, or in even other words, decode a syntax element different from a current portion of the data stream from which the CBF is decoded if the selected transformation for the predetermined block is contained in the predefined set of one or more transformations).

An embodiment according to this invention is an apparatus for decoding a picture using predictive coding and block-based transform residual coding, configured to decode, for the predetermined transform block, a block of coefficients from the data stream, including decoding a coded block flag from the data stream signaling whether the block of coefficients has at least one non-zero coefficient. The apparatus is configured to, if the coded block flag signals that the block of coefficients has at least one non-zero coefficient, select, for a predetermined transform block, a selected transformation by decoding an index from the data stream for the predetermined transform block, and use as the selected transformation, one transformation out of a predetermined list of transformations onto which the index points, derive from the block of coefficients a residual sample array for the predetermined transform block so that the block of coefficients is related to the residual sample array according to the selected transformation and correct a prediction for the predetermined transform block using the residual sample array to reconstruct the predetermined transform block. If the coded block flag signals that the block of coefficients does not have at least one non-zero coefficient, the apparatus is configured to reconstruct the predetermined transform block without prediction correction (in other words, then not decoding the index from the data stream, such as by decoding a syntax element different from the index from a current portion of the data stream from which the index is decoded if the coded block flag signals that the block of coefficients does not have at least one non-zero coefficient).

An embodiment according to this invention is an apparatus for decoding a picture using predictive coding and block-based transform residual coding, configured to populate, or populate and sort, a predetermined list of transformations depending on the data stream. The apparatus is configured to select, for a predetermined transform block, a selected transformation by decoding an index from the data stream using a variable length code, so that each transformation in the predetermined list of transformations has assigned one codeword of the variable length code and a code word length of the codewords of the variable length code monotonically increases with a rank of the transformation in the predetermined list of transformations to which the codewords are assigned, and by using as the selected transformation, one transformation out of a predetermined list of transformations onto which the index points. Furthermore the apparatus is configured to decode, for the predetermined transform block, a block of coefficients from the data stream, derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation by decoding an index into a predetermined list of transformations from the data stream using a composed variable length code codewords of which are composed of a first codeword of a variable length code followed by, if the first codeword is a longest codeword of the variable length code, a second codeword of a fixed length code. The codewords of the composed variable length code merely composed of one of two non-longest codewords of the variable length code are assigned to, and discriminate, an identity transformation and a predefined non-identity transformation contained in the predetermined list of transformations and further codewords of the composed variable length code are assigned to, and discriminate, further non-identity transformations of the predetermined list of transformations. The apparatus is configured to select, for a predetermined transform block, a selected transformation by using as the selected transformation, one transformation out of a predetermined list of transformations onto which the index points. Furthermore the apparatus is configured to decode, for the predetermined transform block, a block of coefficients from the data stream, derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by checking whether the selected transform is a non-identity transformation. If the selected transform is a non-identity transformation, the apparatus is configured to decode, for the predetermined transform block, a block of coefficients from the data stream by decoding a position information from the data stream on where along a scanning order which traverses all coefficients of the block of coefficients, a non-zero coefficient is encountered first or where along a scanning order which traverses all coefficients of the block of coefficients, a non-zero coefficient is encountered last, so as to obtain predetermined coefficient position (Note the following. In the above embodiments, this position is called last position measured along a scan order leading from upper left corner to bottom right, although the actual scanning started coding started there according to these embodiments. That is the actual coding took place in a reverse scan order leading from bottom-right to top-left corner. Here, the scanning order is the coding order), and by decoding first coefficients of the block of coefficients from the data stream, which include all non-zero coefficients of the block of coefficients and are traversed by the scanning order starting from or up to the predetermined coefficient position, and inferring second coefficients of the block of coefficients, different from the first coefficients, to be zero. If the selected transform is the identity transformation, the apparatus is configured to decode, for the predetermined transform block, a block of coefficients from the data stream by decoding all coefficients of the block of coefficients from the data stream. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding the coefficients of the block of coefficients from the data stream in sub-blocks into which the block of coefficients is partitioned, by inferring coefficients within sub-blocks for which a sub-block flag in the data stream signals zeroness, to be zero, and decoding coefficients within sub-blocks for which a sub-block flag in the data stream signals non-zeroness from the data stream. If the selected transformation is one of the at least one non-identity transformation, the apparatus is configured to decode, for the predetermined transform block, a block of coefficients from the data stream by sequentially decoding the sub-block flags from the data stream except at least one of a first sub-block flag, and a last sub-block flag, and inferring the at least one of the first and last sub-block flags to signal non-zeroness. If the selected transformation is the identity transformation, the apparatus is configured to decode, for the predetermined transform block, a block of coefficients from the data stream by decoding the sub-block flags from the data stream for all sub-blocks. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding the coefficients of the block of coefficients from the data stream in sub-blocks into which the block of coefficients is partitioned, by inferring coefficients within sub-blocks for which a sub-block flag in the data stream signals zeroness, to be zero, and decoding coefficients within sub-blocks for which a sub-block flag in the data stream signals non-zeroness from the data stream, with decoding a currently decoded sub-block flag from the data stream by context adaptive entropy decoding and using a context. The context depends on a logical disjunction of sub-block flags relating to sub-blocks neighboring the currently decoded sub-block flag if the selected transformation is one of the at least one non-identity transformation, and the context depends on an arithmetic sum of sub-block flags relating to sub-blocks neighboring the currently decoded sub-block flag if the selected transformation is the identity transformation. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding for a current coefficient a significance flag indicative of whether the current coefficient is zero or not using a context. The context depends on a number of coefficients being non-zero among a first set of coefficients immediately neighboring the current coefficient if the selected transformation is the identity transformation, and the context depends on a number of coefficients being non-zero among a second set of coefficients which comprises the first set of coefficients and coefficients positioned farther away from the current coefficient than the first set of coefficients, values of the second set of coefficients and a position of the current coefficient if the selected transformation is one of the at least one non-identity transformation. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding a predetermined coefficient by context adaptively entropy decoding N greater-than-X flags indicative of whether an absolute of the predetermined coefficient is greater than X or not, and by decoding, using a variable length code, a remainder indicative of an amount at which the absolute of the predetermined coefficient exceeds an absolute threshold which depends on N, with N being larger if the selected transformation is the identity transformation, than compared to if the selected transformation is one of the at least one non-identity transformation. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding a sign of a predetermined coefficient by context adaptive entropy decoding using a predetermined context (e.g. selecting a context depending on signs of coefficients of the block of coefficients in a neighborhood of the predetermined coefficient) and updating a probability associated with the predetermined context if the selected transformation is the identity transformation, and the apparatus is configured to decode, for the predetermined transform block, a block of coefficients from the data stream by decoding a sign of a predetermined coefficient by bypass decoding (e.g. context adaptive entropy decoding with fixed equi-probability) if the selected transformation is one of the at least one non-identity transformation. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding a predetermined coefficient by context adaptively entropy decoding N greater-than-X flags indicative of whether an absolute of the predetermined coefficient is greater than X or not, and by decoding, using a variable length code, a remainder indicative of an amount at which the absolute of the predetermined coefficient exceeds an absolute threshold which depends on N. If the selected transformation is one of the at least one non-identity transformation, the apparatus is configured to perform the context adaptively entropy decoding of the N greater-than-X flags in a sequence of passes by context adaptively entropy decoding the N greater-than-X flags sequentially with increasing X with one or more of the N greater-than-X flags per pass, and log a number of flags coded using context adaptively entropy decoding during the sequence of passes and to cease the context adaptively entropy decoding of the N greater-than-X flags if the number exceeds a predetermined flag threshold. If the selected transformation is the identity transformation, the apparatus is configured to perform the context adaptively entropy decoding of the N greater-than-X flags sequentially and decode, after decoding a significance flag (X=0) among the N greater-than-X flags and prior to further N greater-than-X flags among the N greater-than-X flags, a greater-than-X-flags-bypass flag indicative of whether the predetermined coefficient is greater than the absolute threshold and cease the context adaptively entropy decoding of the N greater-than-X flags with respect to the further greater-than-X flags in case of the greater-than-X-flags-bypass flag indicating that the predetermined coefficient is greater than the absolute threshold (e.g. and resume the context adaptively entropy decoding of the N greater-than-X flags with respect to the further greater-than-X flags except a last one of the N greater-than-X flags in case of the greater-than-X-flags-bypass flag indicating that the predetermined coefficient is not greater than the absolute threshold). Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream, in a sequence of passes which traverse the coefficients of the block of coefficients in a predetermined scan order, by, for a predetermined coefficient, context adaptively entropy decoding N greater-than-X flags indicative of whether an absolute of the predetermined coefficient is greater than X or not, by decoding, using a variable length code, a remainder indicative of an amount at which the absolute of the predetermined coefficient exceeds an absolute threshold which depends on N, and by decoding a sign of the predetermined coefficient. The apparatus is configured to differently distribute the decoding of the N greater-than-X flags, the remainder and the sign over the sequence of passes depending on the selected transformation being the identity transformation or being one of the at least one non-identity transformation. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding, in a sequence of passes which traverse the coefficients of the block, one or more predetermined flags for each coefficient (e.g. parity flag and/or greater than X flag, sig flag) from the data stream using context adaptively binary entropy decoding, each predetermined flag reducing an absolute value domain of the respective coefficient (e.g. parity bit reduces the absolute value domain to one half by excluding every even or uneven absolute value, and greater than X flags reduce the domain of possible absolute values by either excluding one of the possible absolute values or leaving only this one of the possible absolute values and excluding all others) within which an absolute value of the respective coefficient is positioned (e.g. the absolute value domain starts at the beginning of the one or more passes, for instance, from a general absolute value domain of the coefficients $0 \ldots 2^{X-1}$ in case of X bit representation). The apparatus is configured to decode, for the predetermined transform block, a block of coefficients from the data stream by decoding, in a sequence of passes which traverse the coefficients of the block, for each coefficient for which a cardinality of the absolute value domain is not reduced down to one by the one or more predetermined flags decoded for the respective coefficient, a variable length code codeword (e.g. Rice/Exp-Golomb code) indicating the absolute value of the respective coefficient within the absolute value domain of the respective coefficient (e.g. the code length of the variable length code may monotonically increase with increasing absolute value). Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block. The apparatus is configured to, in decoding, in the sequence of passes, the one or more predetermined flags, cease the decoding the one or more predetermined flags as soon as a predetermined number of predetermined flags has been reached (i.e. the overall number of predetermined flags having been decoded so far for all coefficients reaches a limit) so that the cardinality of the absolute value domain within which the pointer points to the absolute value is smaller for a first set of non-zero coefficients compared a second set of non-zero coefficients (namely smaller for coefficients preceding the reaching of the limit within the last pass than compared to coefficients following the reaching of the limit), and the apparatus is configured to, in decoding, in the sequence of passes, the one or more predetermined flags, use different variable length codes for the variable length code codeword of the first and second sets of non-zero coefficients.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by if the selected transform is a non-identity transformation, decoding the coefficients of the block of coefficients from the data stream along a (possibly following this order several times in several passes) first scan order leading towards a DC coefficient of the non-identity transformation (e.g. from the highest frequency coefficient onwards, possibly starting from the "last" significant coefficient position). The apparatus is configured to decode, for the predetermined transform block, a block of coefficients from the data stream by if the selected transform is the identity transformation, decoding the coefficients of the block of coefficients from the data stream along a second scan order leading from an upper left sample position to a lower right sample position. Furthermore the apparatus is configured to derive from the block of coefficients a residual sample array for the predetermined transform block so that the block of coefficients is related to the residual sample array according to the selected transformation (this step may include in case of the identity transformation adding to each coefficient the coefficients residing in the block on a predetermined side such as the left hand side in case of horizontal DPCM or to the top of the respective coefficient in case of vertical DPCM so as to perform DPCM reversal) and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by if the selected transformation is one of the at least one non-identity transformation, decoding a syntax element from the data stream, deriving therefrom whether signs of non-zero coefficients within a predetermined group of non-zero coefficients are equal to each other or not and, if so, the signs of the non-zero coefficients within the predetermined group of non-zero coefficients and, if the signs of the non-zero coefficients within the predetermined group of non-zero coefficients are not equal to each other, decoding the signs of the non-zero coefficients within the predetermined group of non-zero coefficients by decoding sign bits on a per non-zero-coefficient basis. The apparatus is configured to decode, for the predetermined transform block, a block of coefficients from the data stream by if the selected transformation is the identity transformation, decoding the signs of the non-zero coefficients within the predetermined group of non-zero coefficients by decoding sign bits on a per non-zero-coefficient basis irrespective of the signs of the non-zero coefficients within the predetermined group of non-zero coefficients being equal to each other or not. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding signs of non-zero coefficients of the predetermined block of coefficients by deriving a sign probability tendency index from the data stream and entropy decoding the sign of a predetermined non-zero coefficient (such as the first in decoding order or one within a certain sub-block of the coefficient block to which the index applies) using a context model (a context model which defines a certain sign probability such as the probability to be positive) associated with the sign probability tendency index if the selected transformation is the identity transformation. Additionally the apparatus is configured to decode, for the predetermined transform block, a block of coefficients from the data stream by decoding signs of non-zero coefficients of the predetermined block of coefficients by bypass decoding (e.g. context adaptive entropy decoding with fixed equi-probability) the sign of the predetermined non-zero coefficient if the selected transformation is one of the at least one non-identity transformation. Furthermore the Apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding signs of non-zero coefficients of the predetermined block of coefficients by decoding the sign of a predetermined non-zero coefficient using a predetermined context model among a plurality of context models and select the predetermined context model among the plurality of context models depending on a statistic of signs of previously decoded coefficients if the selected transformation is the identity transformation. Additionally the apparatus is configured to decode, for the predetermined transform block, a block of coefficients from the data stream by decoding signs of non-zero coefficients of the predetermined block of coefficients by bypass decoding (e.g. context adaptive entropy decoding with fixed equi-probability) the sign of the predetermined non-zero coefficient if the selected transformation is one of the at least one non-identity transformation. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block.

An embodiment according to this invention is an apparatus for decoding a picture using predictive coding and block-based transform residual coding, configured to select, for a predetermined transform block, a selected transformation out of a predetermined list of transformations, the selected transformation comprising the identity transformation and at least one non-identity transformation. The apparatus is configured to decode, for the predetermined transform block, a block of coefficients from the data stream by decoding, in a sequence of passes which traverse the coefficients of the block, one or more predetermined flags for each coefficient (e.g. parity flag and/or greater than X flag, sig flag) from the data stream using context adaptively binary entropy decoding, each predetermined flag reducing an absolute value domain of the respective coefficient (e.g. parity bit reduces the absolute value domain to one half by excluding every even or uneven absolute value, and greater than X flags reduce the domain of possible absolute values by either excluding one of the possible absolute values or leaving only this one of the possible absolute values and excluding all others) within which an absolute value of the respective coefficient is positioned (e.g. the absolute value domain starts at the beginning of the one or more passes, for instance, from a general absolute value domain of the coefficients $0 \ldots 2^{X-1}$ in case of X bit representation). Additionally the apparatus is configured to decode, for the predetermined transform block, a block of coefficients from the data stream by decoding, in a sequence of passes which traverse the coefficients of the block, for each coefficient for which a cardinality of the absolute value domain is not reduced down to one by the one or more predetermined flags decoded for the respective coefficient, a variable length code codeword (e.g. Rice/Exp-Golomb code)_for identifying the absolute value of the respective coefficient out of the absolute value domain of the respective coefficient (e.g. the code length of the variable length code may monotonically increase with increasing absolute value; here the codeword is free to refer only to the reduced absolute value domain or the general one or some other being inevitably a proper superset of the reduced absolute value domain)_. Furthermore the apparatus is configured to derive from the block of coefficients a residual sample array for the predetermined transform block so that the block of coefficients is related to the residual sample array according to the selected transformation and correct a prediction for the predetermined transform block using the residual sample array to reconstruct the predetermined transform block. The apparatus is configured to, in decoding, in the sequence of passes, the one or more predetermined flags, cease the decoding the one or more predetermined flags as soon as a predetermined number of predetermined flags has been reached (i.e. the overall number of predetermined flags having been decoded so far for all coefficients reaches a limit) so that the cardinality of the absolute value domain is smaller for a first set of non-zero coefficients compared a second set of non-zero coefficients (namely smaller for coefficients preceding the reaching of the limit within the last pass than compared to coefficients following the reaching of the limit), except with respect to a significance flag among the one or more predetermined flags (which are, thus, decoded using context adaptively binary entropy decoding inevitably), which indicates whether the coefficient for which it is decoded is zero or not, wherein the predetermined number corresponds to an upper limit minus a number of coefficients for which the significance flag has not yet been decoded.

According to an embodiment, an apparatus for encoding a picture using predictive coding and block-based transform residual coding, is configured to subdivide the picture into transform bocks of different sizes Furthermore the apparatus is configured to select, for a predetermined transform block, a selected transformation by checking whether a size of the predetermined transform block exceeds a predetermined threshold size. If the size of the predetermined transform block exceeds the predetermined threshold size, the apparatus is configured to use for the selection of the selected transformation a default way for selecting the selected transformation. If the size of the predetermined transform block does not exceed the predetermined threshold size, the apparatus is configured to choose for the selection of the selected transformation a transformation out of a predetermined list of transformations and transmit in the data stream an index which points to the chosen transform out of the predetermined list of transformations so as to be used for the predetermined transform block as the selected transformation, the predetermined list of transformations comprising an identity transformation and non-identity transformations. Additionally the apparatus is configured to predict the predetermined transform block and encode, for the predetermined transform block, a block of coefficients into the data stream, so that if the selected transformation is the identity transformation, the block of coefficients is to be used as residual sample array for correcting the prediction to reconstruct the predetermined transform block, and so that if the selected transformation is not the identity transformation, the block of coefficients is to be subject to an inverse transformation corresponding to the selected transformation to obtain the residual sample array for the predetermined transform block.

According to an embodiment, an apparatus for encoding a picture using predictive coding and block-based transform residual coding, is configured to select, for a predetermined transform block, a selected transformation out of a predetermined list of transformations onto and encoding an index into the data stream for the predetermined transform block, which points in the predetermined list of transformations onto the selected transformation. Furthermore the apparatus is configured to predict the predetermined transform block and encode, for the predetermined transform block, a block of coefficients into the data stream, so that from the block of coefficients a residual sample array for the predetermined transform block is derivable so that the block of coefficients is related to the residual sample array according to the selected transformation, and so that the prediction for the predetermined transform block is correctable using the residual sample array to reconstruct the predetermined transform block. The apparatus is configured to, in encoding, for the predetermined transform block, the block of coefficients into the data stream depending on whether the selected transformation for the predetermined block is contained in a predefined set of one or more transformations, encode a coded block flag into the data stream signaling whether the block of coefficients has at least one non-zero coefficient, if the selected transformation for the predetermined block is contained in the predefined set of one or more transformations. Additionally the apparatus is configured to, in encoding, for the predetermined transform block, the block of coefficients into the data stream depending on whether the selected transformation for the predetermined block is contained in a predefined set of one or more transformations, refrain from encoding the coded block flag into the data stream with the coded block flag having to be inferred at encoder side as signaling that the block of coefficients has at least one non-zero coefficient, if the selected transformation for the predetermined block is not contained in the predefined set of one or more transformations (in other words, then not encoding the CBF into the data stream, or in even other words, encode a syntax element different from a current portion of the data stream into which the CBF is encoded if the selected transformation for the predetermined block is contained in the predefined set of one or more transformations).

According to an embodiment, an apparatus for encoding a picture using predictive coding and block-based transform residual coding, is configured to predict a predetermined transform block and encode, for the predetermined transform block, a block of coefficients into the data stream, including encoding a coded block flag into the data stream signaling whether the block of coefficients has at least one non-zero coefficient. The apparatus is configured to, if the coded block flag signals that the block of coefficients has at least one non-zero coefficient, select, for a predetermined transform block, a selected transformation out of a predetermined list of transformations and encoding an index into the data stream for the predetermined transform block which points in the predetermined list of transformations onto the selected transformation. From the block of coefficients a residual sample array for the predetermined transform block is derivable so that the block of coefficients is related to the residual sample array according to the selected transformation, and so that the prediction for the predetermined transform block is correctable using the residual sample array to reconstruct the predetermined transform block. The apparatus is configured to, if the coded block flag signals that the block of coefficients does not have at least one non-zero coefficient, reconstruct the predetermined transform block without prediction correction (in other words, then not encoding the index into the data stream, such as by encoding a syntax element different from the index from a current portion of the data stream into which the index is encoded if the coded block flag signals that the block of coefficients does not have at least one non-zero coefficient).

According to an embodiment an apparatus for encoding a picture using predictive coding and block-based transform residual coding, is configured to populate, or populate and sort, a predetermined list of transformations depending on the data stream, and select, for a predetermined transform block, a selected transformation out of the predetermined list of transformations. Furthermore the apparatus is configured to encode an index into the data stream which points onto the selected transformation in the predetermined list of transformations using a variable length code, so that each transformation in the predetermined list of transformations has assigned one codeword of the variable length code and a code word length of the codewords of the variable length code monotonically increases with a rank of the transformation in the predetermined list of transformations to which the codewords are assigned. Additionally the apparatus is configured to derive a prediction for the predetermined transform block and encode, for the predetermined transform block, a block of coefficients into the data stream, so that from the block of coefficients a residual sample array for the predetermined transform block is derivable so that the block of coefficients is related to the residual sample array according to the selected transformation, and so that the predetermined transform block is reconstructible by prediction for the predetermined transform block is correctable using the residual sample array to reconstruct the predetermined transform block.

According to an embodiment, an apparatus for encoding a picture using predictive coding and block-based transform residual coding, is configured to derive a prediction for a predetermined transform block. Furthermore the apparatus is configured to select, for a predetermined transform block, a selected transformation from a predetermined list of transformations and encoding an index into a predetermined list of transformations into the data stream which points onto the selected transformation using a composed variable length code codewords of which are composed of a first codeword of a variable length code followed by, if the first codeword is a longest codeword of the variable length code, a second codeword of a fixed length code. The codewords of the composed variable length code merely composed of one of two non-longest codewords of the variable length code are assigned to, and discriminate, an identity transformation and a predefined non-identity transformation contained in the predetermined list of transformations and further codewords of the composed variable length code are assigned to, and discriminate, further non-identity transformations of the predetermined list of transformations. Additionally the apparatus is configured to encode, for the predetermined transform block, a block of coefficients into the data stream, so that the block of coefficients is related to the residual sample array according to the selected transformation, and so that the predetermined transform block is reconstructible by correcting the prediction of the predetermined transform block using the residual sample array.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to derive a prediction for the predetermined transform block and encode, for the predetermined transform block, a block of coefficients into the data stream by checking whether the selected transform is a non-identity transformation. If the selected transform is a non-identity transformation, the apparatus is configured to encode a position information into the data stream on where along a scanning order which traverses all coefficients of the block of coefficients, a non-zero coefficient is encountered first or where along a scanning order which traverses all coefficients of the block of coefficients, a non-zero coefficient is encountered last, so as to obtain predetermined coefficient position to encode, for the predetermined transform block, a block of coefficients into the data stream (Note the following. In the above embodiments, this position is called last position measured along a scan order leading from upper left corner to bottom right, although the actual scanning started coding started there according to these embodiments. That is the actual coding took place in a reverse scan order leading from bottom-right to top-left corner. Here, the scanning order is the coding order.) and encoding first coefficients of the block of coefficients into the data stream, which include all non-zero coefficients of the block of coefficients and are traversed by the scanning order starting from or up to the predetermined coefficient position, and inferring second coefficients of the block of coefficients, different from the first coefficients, to be zero, to encode, for the predetermined transform block, a block of coefficients into the data stream. If the selected transform is the identity transformation, the apparatus is configured to encode all coefficients of the block of coefficients into the data stream to encode, for the predetermined transform block, a block of coefficients into the data stream. The block of coefficients is related to the residual sample array according to the selected transformation and the predetermined transform block is reconstructable by correcting the prediction thereof using the residual sample array.

According to an embodiment an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding the coefficients of the block of coefficients into the data stream in sub-blocks into which the block of coefficients is partitioned, wherein coefficients within sub-blocks for which a sub-block flag in the data stream signals zeroness, are inferred to be zero, and coefficients within sub-blocks for which a sub-block flag in the data stream signals non-zeroness are encoded into the data stream. The inferring of coefficients to be zero and the encoding non-zeroness coefficients is performed with if the selected transformation is one of the at least one non-identity transformation, sequentially encoding the sub-block flags into the data stream except at least one of a first sub-block flag, and a last sub-block flag, wherein the at least one of the first and last sub-block flags are to be inferred to signal non-zeroness, and if the selected transformation is the identity transformation, encoding the sub-block flags into the data stream for all sub-blocks. The block of coefficients is related to the residual sample array according to the selected transformation, and the predetermined transform block is reconstructible by correcting the prediction for the predetermined transform block using the residual sample array.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding the coefficients of the block of coefficients into the data stream in sub-blocks into which the block of coefficients is partitioned, by inferring coefficients within sub-blocks for which a sub-block flag in the data stream signals zeroness, to be zero, and encoding coefficients within sub-blocks for which a sub-block flag in the data stream signals non-zeroness into the data stream, with encoding a currently encoded sub-block flag into the data stream by context adaptive entropy encoding and using a context. The context depends on a logical disjunction of sub-block flags relating to sub-blocks neighboring the currently encoded sub-block flag if the selected transformation is one of the at least one non-identity transformation, and an arithmetic sum of sub-block flags relating to sub-blocks neighboring the currently encoded sub-block flag if the selected transformation is the identity transformation. The block of coefficients is related to the residual sample array according to the selected transformation, and the predetermined transform block is reconstructable by correcting the prediction for the predetermined transform block using the residual sample array.

According to an embodiment an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding for a current coefficient a significance flag indicative of whether the current coefficient is zero or not using a context. The context depends on a number of coefficients being non-zero among a first set of coefficients immediately neighboring the current coefficient if the selected transformation is the identity transformation, and depends on a number of coefficients being non-zero among a second set of coefficients which comprises the first set of coefficients and coefficients positioned farther away from the current coefficient than the first set of coefficients, values of the second set of coefficients and a position of the current coefficient if the selected transformation is one of the at least one non-identity transformation. The block of coefficients is related to the residual sample array according to the selected transformation, and the predetermined transform block is reconstructible by correcting the prediction for the predetermined transform block using the residual sample array.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding a predetermined coefficient by context adaptively entropy encoding N greater-than-X flags indicative of whether an absolute of the predetermined coefficient is greater than X or not, and by encoding, using a variable length code, a remainder indicative of an amount at which the absolute of the predetermined coefficient exceeds an absolute threshold which depends on N, with N being larger if the selected transformation is the identity transformation, than compared to if the selected transformation is one of the at least one non-identity transformation. The block of coefficients is related to the residual sample array according to the selected transformation, and the predetermined transform block is reconstructible by correcting the prediction of the predetermined transform block using the residual sample array.

According to an embodiment an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding a sign of a predetermined coefficient by context adaptive entropy encoding using a predetermined context and updating a probability associated with the predetermined context if the selected transformation is the identity transformation, and by bypass encoding (e.g. context adaptive entropy encoding with fixed equi-probability) if the selected transformation is one of the at least one non-identity transformation. The block of coefficients is related to the residual sample array according to the selected transformation, and the predetermined transform block is reconstructible by correcting the prediction of the predetermined transform block using the residual sample array.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding a predetermined coefficient by context adaptively entropy encoding N greater-than-X flags indicative of whether an absolute of the predetermined coefficient is greater than X or not, and by encoding, using a variable length code, a remainder indicative of an amount at which the absolute of the predetermined coefficient exceeds an absolute threshold which depends on N. The apparatus is configured to if the selected transformation is one of the at least one non-identity transformation, perform the context adaptively entropy encoding of the N greater-than-X flags in a sequence of passes by context adaptively entropy encoding the N greater-than-X flags sequentially with increasing X with one or more of the N greater-than-X flags per pass, and log a number of flags coded using context adaptively entropy encoding during the sequence of passes and to cease the context adaptively entropy encoding of the N greater-than-X flags if the number exceeds a predetermined flag threshold. Additionally the apparatus is configured to if the selected transformation is the identity transformation, perform the context adaptively entropy encoding of the N greater-than-X flags sequentially and encode, after encoding a significance flag (X=0) among the N greater-than-X flags and prior to further N greater-than-X flags among the N greater-than-X flags, a greater-than-X-flags-bypass flag indicative of whether the predetermined coefficient is greater than the absolute threshold and cease the context adaptively entropy encoding the N greater-than-X flags with respect to the further greater-than-X flags in case of the greater-than-X-flags-bypass flag indicating that the predetermined coefficient is greater than the absolute threshold (e.g. and resume the context adaptively entropy encoding the N greater-than-X flags with respect to the further greater-than-X flags except a last one of the N greater-than-X flags in case of the greater-than-X-flags-bypass flag indicating that the predetermined coefficient is not greater than the absolute threshold). The block of coefficients is related to the residual sample array according to the selected transformation, and the predetermined transform block is reconstructable by correcting the prediction of the predetermined transform block using the residual sample array.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream, in a sequence of passes which traverse the coefficients of the block of coefficients in a predetermined scan order, by, for a predetermined coefficient, context adaptively entropy encoding N greater-than-X flags indicative of whether an absolute of the predetermined coefficient is greater than X or not, by encoding, using a variable length code, a remainder indicative of an amount at which the absolute of the predetermined coefficient exceeds an absolute threshold which depends on N, and by encoding a sign of the predetermined coefficient. The apparatus is configured to differently distribute the encoding of the N greater-than-X flags, the remainder and the sign over the sequence of passes depending on the selected transformation being the identity transformation or being one of the at least one non-identity transformation. The block of coefficients is related to the residual sample array according to the selected transformation, and the predetermined transform block is reconstructible by correcting the prediction of the predetermined transform block using the residual sample array.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by encoding, in a sequence of passes which traverse the coefficients of the block, one or more predetermined flags for each coefficient (e.g. parity flag and/or greater than X flag, sig flag) into the data stream using context adaptively binary entropy encoding, each predetermined flag reducing an absolute value domain of the respective coefficient (e.g. parity bit reduces the absolute value domain to one half by excluding every even or uneven absolute value, and greater than X flags reduce the domain of possible absolute values by either excluding one of the possible absolute values or leaving only this one of the possible absolute values and excluding all others) within which an absolute value of the respective coefficient is positioned (e.g. the absolute value domain starts at the beginning of the one or more passes, for instance, from a general absolute value domain of the coefficients $0 \ldots 2^{X-1}$ in case of X bit representation). Furthermore the apparatus is configured to encode, for the predetermined transform block, a block of coefficients into the data stream by encoding, in a sequence of passes which traverse the coefficients of the block, for each coefficient for which a cardinality of the absolute value domain is not reduced down to one by the one or more predetermined flags encoded for the respective coefficient, a variable length code codeword (e.g. Rice/Exp-Golomb code)_indicating the absolute value of the respective coefficient within the absolute value domain of the respective coefficient (e.g. the code length of the variable length code may monotonically increase with increasing absolute value). The apparatus is configured to encode, for the predetermined transform block, a block of coefficients into the data stream so that the block of coefficients is related to a residual sample array for the predetermined transform block according to the selected transformation, the residual sample array allowing for correcting a prediction for the predetermined transform block to reconstruct the predetermined transform block. The apparatus is configured to, in encoding, in the sequence of passes, the one or more predetermined flags, cease the encoding the one or more predetermined flags as soon as a predetermined number of predetermined flags has been reached (i.e. the overall number of predetermined flags having been encoded so far for all coefficients reaches a limit) so that the cardinality of the absolute value domain within which the pointer points to the absolute value is smaller for a first set of non-zero coefficients compared a second set of non-zero coefficients (namely smaller for coefficients preceding the reaching of the limit within the last pass than compared to coefficients following the reaching of the limit) and use different variable length codes for the variable length code codeword of the first and second sets of non-zero coefficients.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by if the selected transform is a non-identity transformation, encoding the coefficients of the block of coefficients into the data stream along a (possibly following this order several times in several passes) first scan order leading towards a DC coefficient of the non-identity transformation (e.g. from the highest frequency coefficient onwards, possibly starting from the "last" significant coefficient position). Furthermore the apparatus is configured to encode, for the predetermined transform block, a block of coefficients into the data stream by if the selected transform is the identity transformation, encoding the coefficients of the block of coefficients into the data stream along a second scan order leading from an upper left sample position to a lower right sample position. Furthermore the apparatus is configured to encode, for the predetermined transform block, a block of coefficients into the data stream so that the block of coefficients is related to a residual sample array for the predetermined transform block according to the selected transformation (this step may include in case of the identity transformation adding to each coefficient the coefficients residing in the block on a predetermined side such as the left hand side in case of horizontal DPCM or to the top of the respective coefficient in case of vertical DPCM so as to perform DPCM reversal) which allows for correcting a prediction for the predetermined transform block to reconstruct the predetermined transform block.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by if the selected transformation is one of the at least one non-identity transformation, encoding a syntax element into the data stream, deriving therefrom whether signs of non-zero coefficients within a predetermined group of non-zero coefficients are equal to each other or not and, if so, the signs of the non-zero coefficients within the predetermined group of non-zero coefficients and, if the signs of the non-zero coefficients within the predetermined group of non-zero coefficients are not equal to each other, encoding the signs of the non-zero coefficients within the predetermined group of non-zero coefficients by encoding sign bits on a per non-zero-coefficient basis. Furthermore the apparatus is configured to encode, for the predetermined transform block, a block of coefficients into the data stream by if the selected transformation is the identity transformation, encoding the signs of the non-zero coefficients within the predetermined group of non-zero coefficients by encoding sign bits on a per non-zero-coefficient basis irrespective of the signs of the non-zero coefficients within the predetermined group of non-zero coefficients being equal to each other or not. Additionally the apparatus is configured to encode, for the predetermined transform block, a block of coefficients into the data stream so that the block of coefficients is related to a residual sample array for the predetermined transform block according to the selected transformation, wherein the residual sample array allows to correct a prediction for the predetermined transform block to reconstruct the predetermined transform block.

According to an embodiment, an apparatus for encoding a picture using predictive coding and block-based transform residual coding, configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by encoding signs of non-zero coefficients of the predetermined block of coefficients by encoding a sign probability tendency index into the data stream and entropy encoding the sign of a predetermined non-zero coefficient (such as the first in encoding order or one within a certain sub-block of the coefficient block to which the index applies) using context model (a context model which defines a certain sign probability such as the probability to be positive) associated with the sign probability tendency index if the selected transformation is the identity transformation. Furthermore the apparatus is configured to encode, for the predetermined transform block, a block of coefficients into the data stream by encoding signs of non-zero coefficients of the predetermined block of coefficients by bypass encoding (e.g. context adaptive entropy encoding with fixed equi-probability) the sign of the predetermined non-zero coefficient if the selected transformation is one of the at least one non-identity transformation Additionally the apparatus is configured to encode, for the predetermined transform block, a block of coefficients into the data stream by encoding signs of non-zero coefficients of the predetermined block of coefficients so that the block of coefficients is related to a residual sample array for the predetermined transform block according to the selected transformation, wherein a prediction for the predetermined transform block is correctible using the residual sample array to reconstruct the predetermined transform block.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by encoding signs of non-zero coefficients of the predetermined block of coefficients by encoding the sign of a predetermined non-zero coefficient using a predetermined context model among a plurality of context models and select the predetermined context model among the plurality of context models depending on a statistic of signs of previously encoded coefficients if the selected transformation is the identity transformation, and bypass encoding (e.g. context adaptive entropy encoding with fixed equi-probability) the sign of the predetermined non-zero coefficient if the selected transformation is one of the at least one non-identity transformation. Additionally the apparatus is configured to encode, for the predetermined transform block, a block of coefficients into the data stream so that the block of coefficients is related to a residual sample array for the predetermined transform block according to the selected transformation, so that a prediction for the predetermined transform block is correctible using the residual sample array to reconstruct the predetermined transform block.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by encoding, in a sequence of passes which traverse the coefficients of the block, one or more predetermined flags for each coefficient (e.g. parity flag and/or greater than X flag, sig flag) from the data stream using context adaptively binary entropy encoding, each predetermined flag reducing an absolute value domain of the respective coefficient (e.g. parity bit reduces the absolute value domain to one half by excluding every even or uneven absolute value, and greater than X flags reduce the domain of possible absolute values by either excluding one of the possible absolute values or leaving only this one of the possible absolute values and excluding all others) within which an absolute value of the respective coefficient is positioned (e.g. the absolute value domain starts at the beginning of the one or more passes, for instance, from a general absolute value domain of the coefficients $0 \ldots 2^{X-1}$ in case of X bit representation). Furthermore the apparatus is configured to encode, for the predetermined transform block, a block of coefficients into the data stream by encoding, in a sequence of passes which traverse the coefficients of the block, for each coefficient for which a cardinality of the absolute value domain is not reduced down to one by the one or more predetermined flags encoded for the respective coefficient, a variable length code codeword (e.g. Rice/Exp-Golomb code) for identifying the absolute value of the respective coefficient out of the absolute value domain of the respective coefficient (e.g. the code length of the variable length code may monotonically increase with increasing absolute value; here the codeword is free to refer only to the reduced absolute value domain or the general one or some other being inevitably a proper superset of the reduced absolute value domain)_. Additionally the apparatus is configured to encode, for the predetermined transform block, a block of coefficients into the data stream so that the block of coefficients is related to a residual sample array for the predetermined transform block according to the selected transformation, so that a prediction for the predetermined transform block is correctible using the residual sample array to reconstruct the predetermined transform block. The apparatus is configured to, in encoding, in the sequence of passes, the one or more predetermined flags, cease the encoding the one or more predetermined flags as soon as a predetermined number of predetermined flags has been reached (i.e. the overall number of predetermined flags having been encoded so far for all coefficients reaches a limit) so that the cardinality of the absolute value domain is smaller for a first set of non-zero coefficients compared a second set of non-zero coefficients (namely smaller for coefficients preceding the reaching of the limit within the last pass than compared to coefficients following the reaching of the limit), except with respect to a significance flag among the one or more predetermined flags (which are, thus, encoded using context adaptively binary entropy encoded inevitably), which indicates whether the coefficient for which it is encoded is zero or not, wherein the predetermined number corresponds to an upper limit minus a number of coefficients for which the significance flag has not yet been encoded.

According to an embodiment, a method for decoding a picture using predictive coding and block-based transform residual coding, comprises subdividing the picture into transform bocks of different sizes. Furthermore the method comprises selecting, for a predetermined transform block, a selected transformation by checking whether a size of the predetermined transform block exceeds a predetermined threshold size. If the size of the predetermined transform block exceeds the predetermined threshold size, a default way for selecting the selected transformation is used. If the size of the predetermined transform block does not exceed the predetermined threshold size, a transformation which is pointed to out of a predetermined list of transformations by an index transmitted in the data stream for the predetermined transform block as the selected transformation is used, the predetermined list of transformations comprising an identity transformation and non-identity transformations. Additionally the method comprises decoding, for the predetermined transform block, a block of coefficients from the data stream, if the selected transformation is the identity transformation, using the block of coefficients as residual sample array for the predetermined transform block, and if the selected transformation is not the identity transformation, subjecting the block of coefficients to an inverse transformation corresponding to the selected transformation to obtain the residual sample array for the predetermined transform block. Furthermore the method comprises correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation by decoding an index from the data stream for the predetermined transform block, and by using as the selected transformation, one transformation out of a predetermined list of transformations onto which the index points. Furthermore the method comprises decoding, for the predetermined transform block, a block of coefficients from the data stream, deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block. The method comprises, in decoding, for the predetermined transform block, the block of coefficients from the data stream depending on whether the selected transformation for the predetermined block is contained in a predefined set of one or more transformations. The method comprises, in decoding, for the predetermined transform block, the block of coefficients from the data stream decoding a coded block flag from the data stream signaling whether the block of coefficients has at least one non-zero coefficient, if the selected transformation for the predetermined block is contained in the predefined set of one or more transformations, and inferring that the block of coefficients has at least one non-zero coefficient, if the selected transformation for the predetermined block is not contained in the predefined set of one or more transformations (in other words, then not decoding the CBF from the data stream, or in even other words, decode a syntax element different from a current portion of the data stream from which the CBF is decoded if the selected transformation for the predetermined block is contained in the predefined set of one or more transformations).

According to an embodiment, a method for decoding a picture using predictive coding and block-based transform residual coding, comprises decoding, for the predetermined transform block, a block of coefficients from the data stream, including decoding a coded block flag from the data stream signaling whether the block of coefficients has at least one non-zero coefficient. The method comprises, if the coded block flag signals that the block of coefficients has at least one non-zero coefficient, selecting, for a predetermined transform block, a selected transformation by decoding an index from the data stream for the predetermined transform block, and use as the selected transformation, one transformation out of a predetermined list of transformations onto which the index points, deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block. Furthermore the method comprises, if the coded block flag signals that the block of coefficients does not have at least one non-zero coefficient, reconstructing the predetermined transform block without prediction correction (in other words, then not decoding the index from the data stream, such as by decoding a syntax element different from the index from a current portion of the data stream from which the index is decoded if the coded block flag signals that the block of coefficients does not have at least one non-zero coefficient).

According to an embodiment, a method for decoding a picture using predictive coding and block-based transform residual coding, comprises populating, or populating and sorting, a predetermined list of transformations depending on the data stream. The method comprises selecting, for a predetermined transform block, a selected transformation by decoding an index from the data stream using a variable length code, so that each transformation in the predetermined list of transformations has assigned one codeword of the variable length code and a code word length of the codewords of the variable length code monotonically increases with a rank of the transformation in the predetermined list of transformations to which the codewords are assigned, and by using as the selected transformation, one transformation out of a predetermined list of transformations onto which the index points. Furthermore the method comprises decoding, for the predetermined transform block, a block of coefficients from the data stream, deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation by decoding an index into a predetermined list of transformations from the data stream using a composed variable length code codewords of which are composed of a first codeword of a variable length code followed by, if the first codeword is a longest codeword of the variable length code, a second codeword of a fixed length code. The codewords of the composed variable length code merely composed of one of two non-longest codewords of the variable length code are assigned to, and discriminate, an identity transformation and a predefined non-identity transformation contained in the predetermined list of transformations and further codewords of the composed variable length code are assigned to, and discriminate, further non-identity transformations of the predetermined list of transformations. The method comprises selecting, for a predetermined transform block, a selected transformation by using as the selected transformation, one transformation out of a predetermined list of transformations onto which the index points. Furthermore the method comprises decoding, for the predetermined transform block, a block of coefficients from the data stream, deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by checking whether the selected transform is a non-identity transformation. If the selected transform is a non-identity transformation, the method comprises decoding a position information from the data stream on where along a scanning order which traverses all coefficients of the block of coefficients, a non-zero coefficient is encountered first or where along a scanning order which traverses all coefficients of the block of coefficients, a non-zero coefficient is encountered last, so as to obtain predetermined coefficient position (Note the following. In the above embodiments, this position is called last position measured along a scan order leading from upper left corner to bottom right, although the actual scanning started coding started there according to these embodiments. That is the actual coding took place in a reverse scan order leading from bottom-right to top-left corner. Here, the scanning order is the coding order. See embodiments where both scanning directions are anticipated), and the method comprises decoding first coefficients of the block of coefficients from the data stream, which include all non-zero coefficients of the block of coefficients and are traversed by the scanning order starting from or up to the predetermined coefficient position, and inferring second coefficients of the block of coefficients, different from the first coefficients, to be zero. If the selected transform is the identity transformation, the method comprises decoding all coefficients of the block of coefficients from the data stream. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding the coefficients of the block of coefficients from the data stream in sub-blocks into which the block of coefficients is partitioned, by inferring coefficients within sub-blocks for which a sub-block flag in the data stream signals zeroness, to be zero, and decoding coefficients within sub-blocks for which a sub-block flag in the data stream signals non-zeroness from the data stream. If the selected transformation is one of the at least one non-identity transformation, sequentially decoding the sub-block flags from the data stream except at least one of a first sub-block flag, and a last sub-block flag, and inferring the at least one of the first and last sub-block flags to signal non-zeroness, and if the selected transformation is the identity transformation, decoding the sub-block flags from the data stream for all sub-blocks. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding the coefficients of the block of coefficients from the data stream in sub-blocks into which the block of coefficients is partitioned, by inferring coefficients within sub-blocks for which a sub-block flag in the data stream signals zeroness, to be zero, and decoding coefficients within sub-blocks for which a sub-block flag in the data stream signals non-zeroness from the data stream, with decoding a currently decoded sub-block flag from the data stream by context adaptive entropy decoding and using a context. The context depends on a logical disjunction of sub-block flags relating to sub-blocks neighboring the currently decoded sub-block flag if the selected transformation is one of the at least one non-identity transformation, and the context depends on an arithmetic sum of sub-block flags relating to sub-blocks neighboring the currently decoded sub-block flag if the selected transformation is the identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding for a current coefficient a significance flag indicative of whether the current coefficient is zero or not using a context. The context depends on a number of coefficients being non-zero among a first set of coefficients immediately neighboring the current coefficient if the selected transformation is the identity transformation, and the context depends on a number of coefficients being non-zero among a second set of coefficients which comprises the first set of coefficients and coefficients positioned farther away from the current coefficient than the first set of coefficients, values of the second set of coefficients and a position of the current coefficient if the selected transformation is one of the at least one non-identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding a predetermined coefficient by context adaptively entropy decoding N greater-than-X flags indicative of whether an absolute of the predetermined coefficient is greater than X or not. Furthermore the method comprises decoding, for the predetermined transform block, a block of coefficients from the data stream by decoding a predetermined coefficient by decoding, using a variable length code, a remainder indicative of an amount at which the absolute of the predetermined coefficient exceeds an absolute threshold which depends on N, with N being larger if the selected transformation is the identity transformation, than compared to if the selected transformation is one of the at least one non-identity transformation. Additionally the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding a sign of a predetermined coefficient by context adaptive entropy decoding using a predetermined context and updating a probability associated with the predetermined context if the selected transformation is the identity transformation, and by bypass decoding (e.g. context adaptive entropy decoding with fixed equi-probability) if the selected transformation is one of the at least one non-identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding a predetermined coefficient by context adaptively entropy decoding N greater-than-X flags indicative of whether an absolute of the predetermined coefficient is greater than X or not. Additionally the method comprises decoding, for the predetermined transform block, a block of coefficients from the data stream by decoding a predetermined coefficient by decoding, using a variable length code, a remainder indicative of an amount at which the absolute of the predetermined coefficient exceeds an absolute threshold which depends on N. If the selected transformation is one of the at least one non-identity transformation, performing the context adaptively entropy decoding of the N greater-than-X flags in a sequence of passes by context adaptively entropy decoding the N greater-than-X flags sequentially with increasing X with one or more of the N greater-than-X flags per pass, and logging a number of flags coded using context adaptively entropy decoding during the sequence of passes and ceasing the context adaptively entropy decoding of the N greater-than-X flags if the number exceeds a predetermined flag threshold. If the selected transformation is the identity transformation, performing the context adaptively entropy decoding of the N greater-than-X flags sequentially and decoding, after decoding a significance flag (X=0) among the N greater-than-X flags and prior to further N greater-than-X flags among the N greater-than-X flags, a greater-than-X-flags-bypass flag indicative of whether the predetermined coefficient is greater than the absolute threshold and cease the context adaptively entropy decoding of the N greater-than-X flags with respect to the further greater-than-X flags in case of the greater-than-X-flags-bypass flag indicating that the predetermined coefficient is greater than the absolute threshold (e.g. and resume the context adaptively entropy decoding of the N greater-than-X flags with respect to the further greater-than-X flags except a last one of the N greater-than-X flags in case of the greater-than-X-flags-bypass flag indicating that the predetermined coefficient is not greater than the absolute threshold). Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream, in a sequence of passes which traverse the coefficients of the block of coefficients in a predetermined scan order, by, for a predetermined coefficient, context adaptively entropy decoding N greater-than-X flags indicative of whether an absolute of the predetermined coefficient is greater than X or not, decoding, using a variable length code, a remainder indicative of an amount at which the absolute of the predetermined coefficient exceeds an absolute threshold which depends on N, and decoding a sign of the predetermined coefficient, wherein the method comprises differently distributing the decoding of the N greater-than-X flags, the remainder and the sign over the sequence of passes depending on the selected transformation being the identity transformation or being one of the at least one non-identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

The apparatuses for encoding a picture and the methods as described above are based on the same considerations as the above-described apparatuses for decoding a picture. The apparatuses for encoding a picture and the methods can, by the way, be completed with all features and/or functionalities, which are also described with regard to the apparatuses for decoding a picture.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
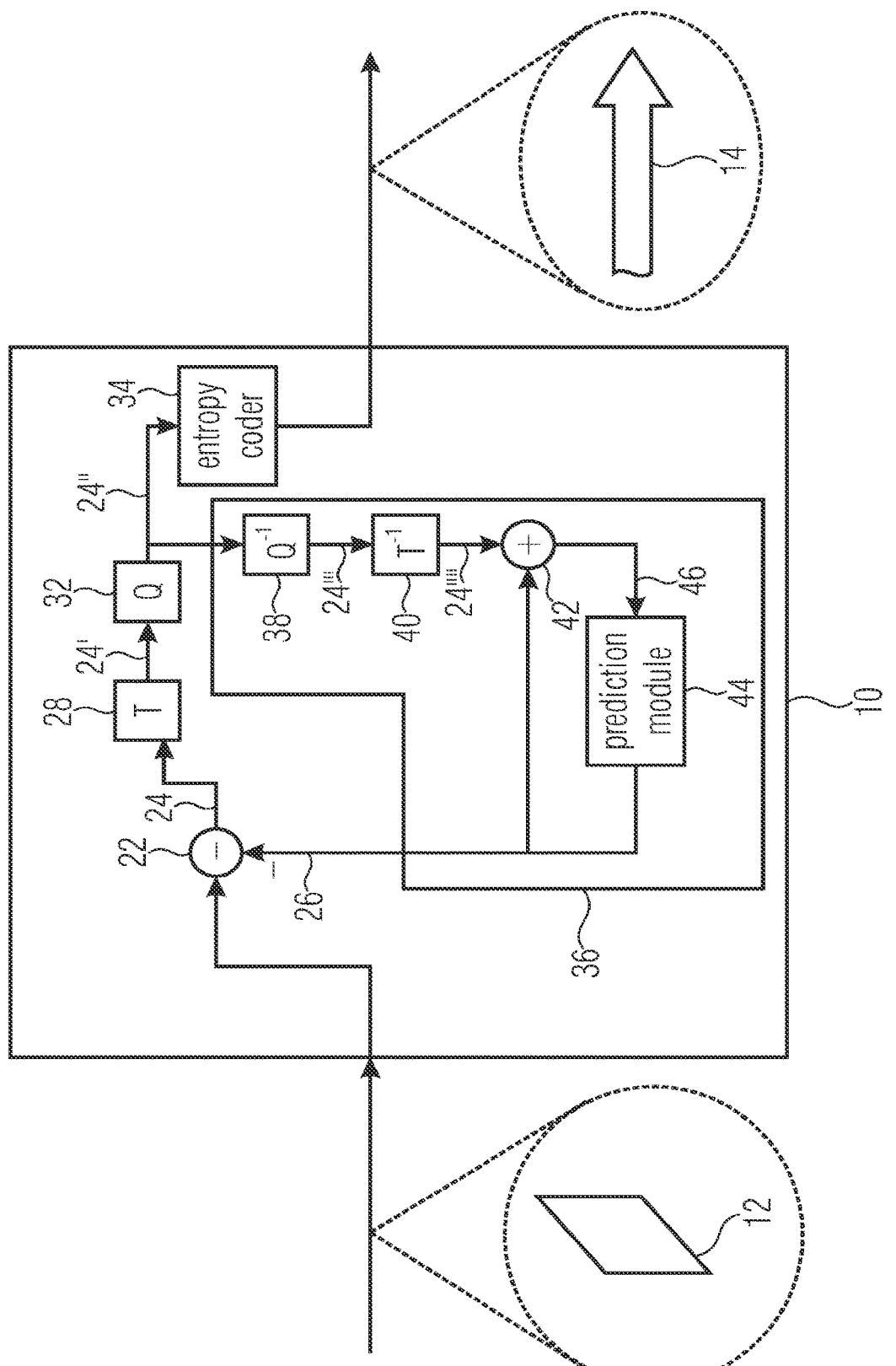
FIG. 1 shows a schematic view of a video encoder for predictively coding a picture into a data stream according to an embodiment of the present invention.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 2:
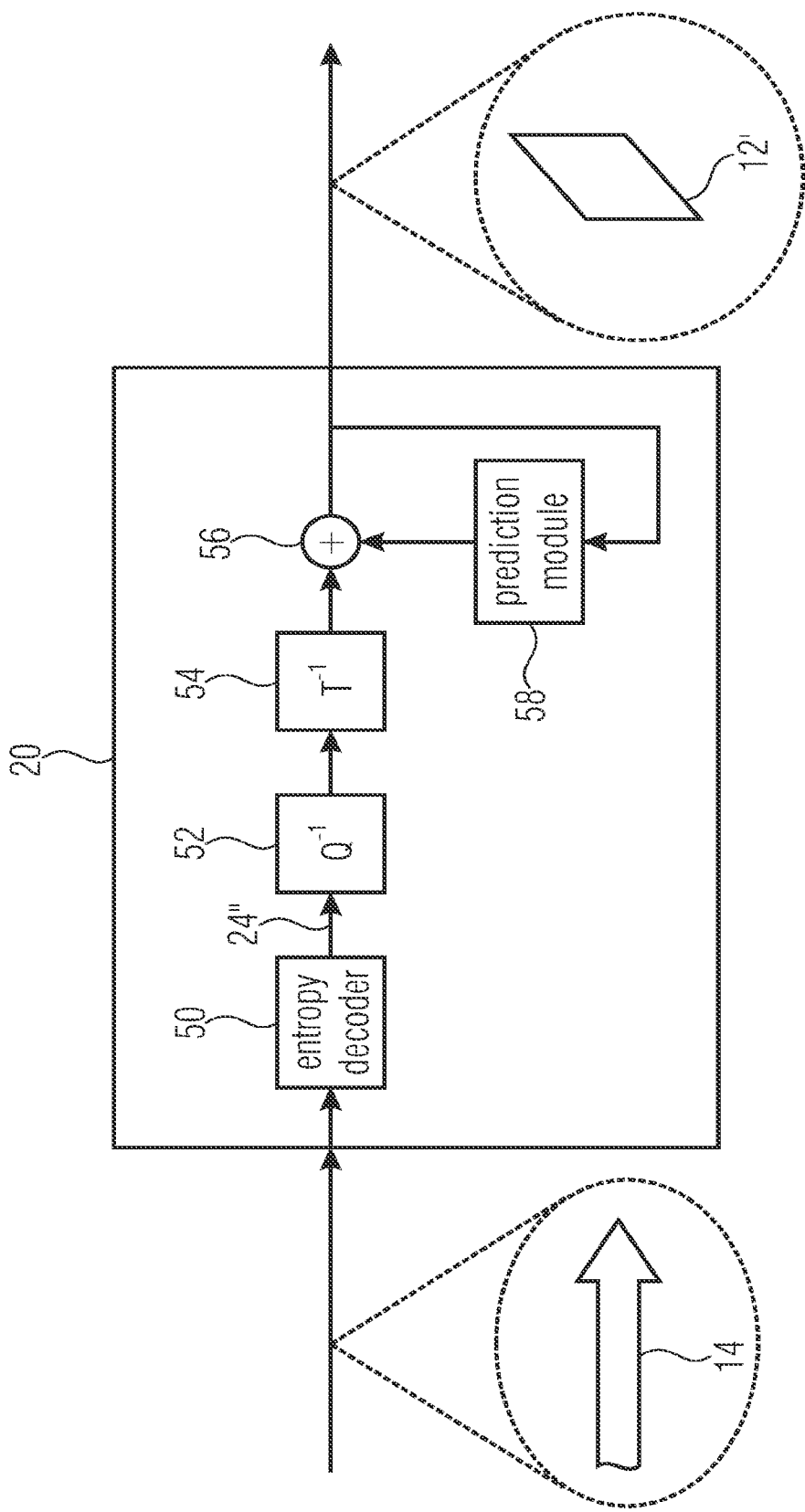
FIG. 2 shows a schematic view of a video decoder configured to predictively decode a picture from a data stream according to an embodiment of the present invention.

FIG. 1 shows an apparatus (e.g. a video encoder) for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal, thus obtained, to spectral-to-spatial transformation. The transform type for the spatial-to-spectral transformation can be signaled in the data stream 14 by the encoder 10 according to embodiments described with the subsequent FIG. 4 and following. Likewise, the transform type for the spectral-to-spatial transformation can be read from the data stream 14 by the decoder 20 according to embodiments described with the subsequent FIG. 4 and following.

Internally, the encoder 10 may comprise a prediction residual signal former 22 which generates a prediction residual 24 so as to measure a deviation of a prediction signal 26 from the original signal, i.e. from the picture 12, wherein the prediction signal 26 can be interpreted as a linear combination of a set of one or more predictor blocks, according to an embodiment of the present invention. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. This can be performed by a transform type dependent transform coefficient level coding according to embodiments described with the subsequent FIG. 4 and following. To this end, encoder 10 may optionally comprise an entropy coder 34 which entropy codes the prediction residual signal as transformed and quantized into data stream 14.

The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24''', which corresponds to the original prediction residual signal 24 except for quantization loss. A combiner 42 of the prediction stage 36 then recombines, such as by addition, the prediction signal 26 and the prediction residual signal 24''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'. The decoding performed by the decoder 20 can be a transform type dependent transform coefficient level decoding according to embodiments described with the subsequent FIG. 4 and following.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded.

Intra-coded blocks are predicted on the basis of a spatial, already coded/decoded neighborhood (e.g. a current template) of the respective block (e.g. a current block) as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples.

Compared thereto, inter-coded blocks may be predicted, for instance, temporally. For inter-coded blocks, motion vectors may be signaled within the data stream 14, the motion vectors indicating the spatial displacement of the portion of a previously coded picture (e.g. a reference picture) of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
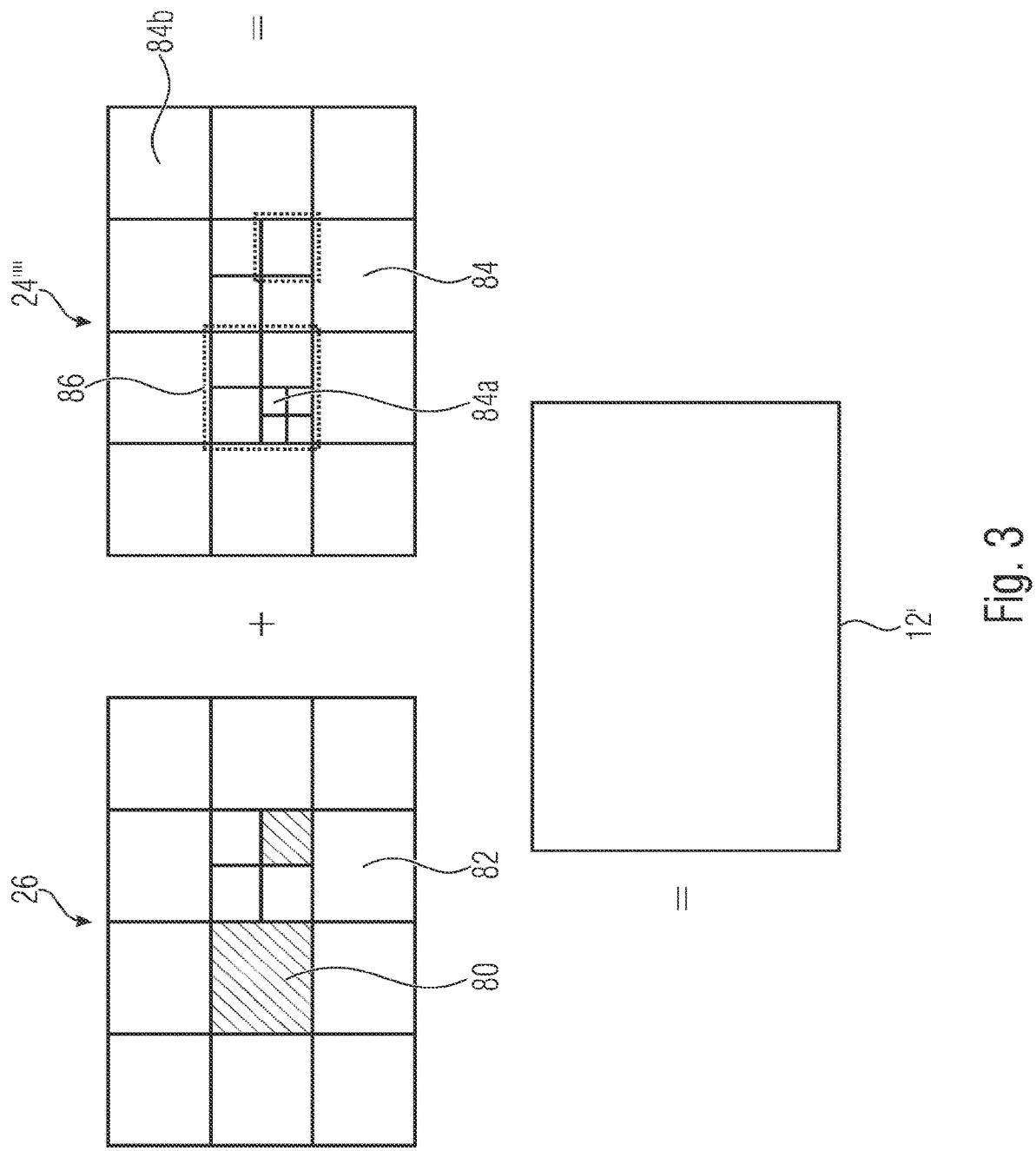
FIG. 3 shows a schematic view of a relationship between a reconstructed signal, on the one hand, and a combination of a prediction residual signal as signaled in a data stream, and a prediction signal, on the other hand, according to an embodiment of the present invention.

FIG. 3 illustrates the relationship between the reconstructed signal, i.e. the reconstructed picture 12', on the one hand, and the combination of the prediction residual signal 24"" as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24"" in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST (discrete sine transform) or DCT (discrete cosine transform) for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

Figure 4:
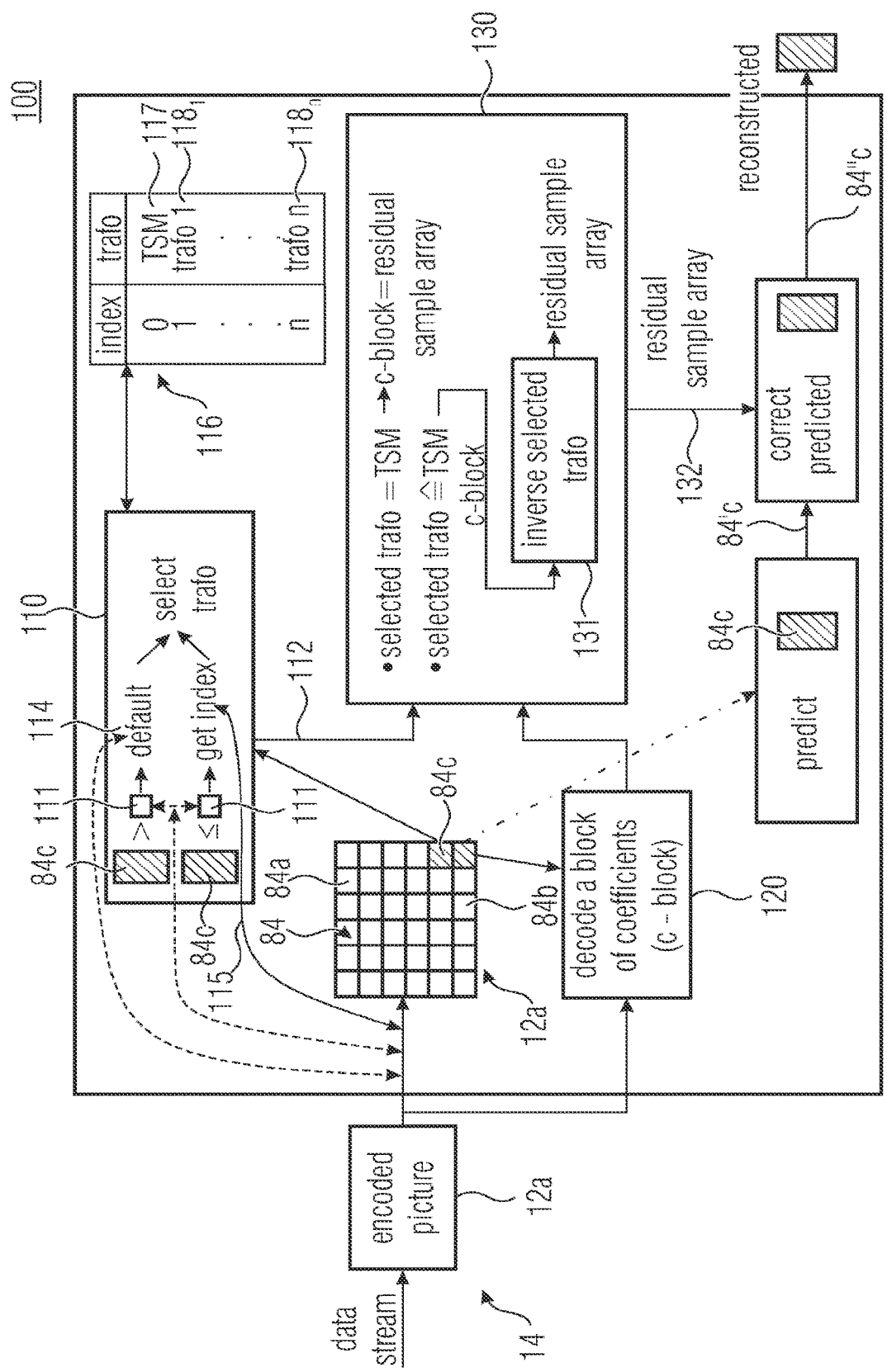
FIG. 4 shows a schematic view of an apparatus for decoding a picture, configured to select a selected transformation dependent on a size of the predetermined transform block, according to an embodiment of the invention.

According to embodiments described with the subsequent FIG. 4 and following a transform type dependent transform coefficient level coding or decoding can be used by an encoder or decoder.

The subsequent description provides more details on which transforms could be supported by encoder 10 and decoder 20. In any case, it should be noted that the set of supported transforms may comprise merely one transform such as one spectral-to-spatial or spatial-to-spectral transform, but it is also possible, that no transform is used by the encoder or decoder at all or for single blocks 80, 82, 84.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using a different concept and being different from the encoder of FIG. 1 such as, for instance, in that the sub-division into blocks 80 is performed in a manner different than exemplified in FIG. 3 and/or in that no transform is used at all or for single blocks. Likewise, decoders according to embodiments of the present application may perform block-based decoding of picture 12' from data stream 14 using the coding concept further outlined below, but may differ, for instance, from the decoder 20 of FIG. 2 in that same sub-divides picture 12' into blocks in a manner different than described with respect to FIG. 3 and/or in that same does not derive the prediction residual from the data stream 14 in transform domain, but in spatial domain, for instance and/or in that same does not use any transform at all or for single blocks.

The presented invention describes a unified signaling concept for the selection of multiple transform types together with a dedicated transform coefficient level coding stage for the selected transform type. Such a design leads to improved compression efficiency depending on the input signal characteristics for hybrid video compression applications.

The presented invention unifies the different transform type configurations together with the signaling. Furthermore, a transform type dependent level coding is presented enabling higher compression efficiency.

Unification of Transform Type Signaling
Summary of the aspects (informative notes):
1. Combined MTS syntax including DCT-II and TSM with:
   Combining max. allowed TSM and MTS size using a single value
   Combining applicable color component for TSM and MTS
   Signaling level
2. Interaction of unified MTS syntax with CBF
   Signal MTS mode for each significant transform block per component, e.g. for luma only when restricted to luma
   CBF after MTS mode instead of before
3. Semantics of unified MTS syntax
   Position of TS/DCT-II within the regular MTS modes MPM list, adaptive order of the indices, similar to intra mode
4. Binarization and context modeling of unified MTS syntax
   Unary or fixed-length code for the modes
   Dedicated context models or separate context models
   Other context modelling for TS/DCT-2 mode
1. Instead of considering TSM and MTS as different approaches, the presented invention combines the two elements into a unified MTS syntax. One aspect consists of using the same maximum allowed size for both MTS and TSM (compare FIG. 4). This maximum size may be fixed, or it could be signaled in a high-level syntax structure inside the bitstream, e.g. at sequence, picture, slice or tile level.

FIG. 4 shows an apparatus 100 for decoding a picture 12a using predictive coding and block-based transform residual coding. The apparatus is configured to subdivide the picture 12a into transform bocks 84 of different sizes and to select 110, for a predetermined transform block 84c, a selected transformation 112 by checking whether a size of the predetermined transform block exceeds a predetermined threshold size 111. If the size of the predetermined transform block 84c exceeds the predetermined threshold size 110, a default way 114 is used for selecting the selected transformation 112. If the size of the predetermined transform block 84c does not exceed the predetermined threshold size 111, a transformation which is pointed to out of a predetermined list 116 of transformations by an index transmitted in the data stream 14 for the predetermined transform block 84c is used as the selected transformation 112. The predetermined list 116 of transformations comprising an identity transformation 117 and non-identity transformations 118. Furthermore the apparatus 100 is configured to decode 120, for the predetermined transform block 84c, a block of coefficients (c-block) from the data stream 14. Based on the c-block and the selected transformation 112 the apparatus is, for example, configured to determine or identify 130 a residual sample array 132. If the selected transformation 112 is the identity transformation 117, the apparatus is configured to use the block of coefficients as residual sample array 132 for the predetermined transform block 84c, and if the selected transformation 112 is not the identity transformation 117, the apparatus is configured to subject the block of coefficients to an inverse transformation 131 corresponding to the selected transformation 112 to obtain the residual sample array 132 for the predetermined transform block 84c. A prediction 84'c for the predetermined transform block, e.g., this might be spatial or temporal prediction with this not being valid for all following occurrences, is corrected by the apparatus using the residual sample array 132 to reconstruct 84"c the predetermined transform block 84c.

According to an embodiment, the default way 114 of selecting 110 a transformation can comprise decoding a default index from the data stream pointing to a transformation in the predetermined list 116 or decoding a default transformation from the data stream. Alternatively a default transformation known by the apparatus 100 can be selected 110 as the default way 114.

According to an embodiment, the apparatus 100 is configured to use a default non-identity transformation for the selected transformation, if the size of the predetermined transform block 84c exceeds the predetermined threshold size 111. The default non-identity transformation is, for example, contained in the predetermined list 116 of transformations, e.g., one of the non-identity transformations 118.

According to an embodiment, the apparatus 100 is configured to derive the predetermined threshold size 111 from the data stream 14.

According to an embodiment, the apparatus 100 is configured to decode 115 the index from a current position in the data stream 14 for the predetermined transform block 84c, if the size of the predetermined transform block 84c does not exceed the predetermined threshold size 111, and decode from the current position of the data stream 14 a syntax element other than the index, if the size of the predetermined transform block exceeds the predetermined threshold size. As the syntax element other than the index is, e.g. instead of the index another element read out of the data stream 14, but not in the sense of skipping and not reading, but in that the data stream 14 really does not contain the index although up to that position in the data stream the syntax might be the same.

In an advantageous embodiment of the invention, TSM and MTS apply to the same color component. In one version, both TSM and MTS only apply to the luma component (i.e., for the chroma blocks, the standard DCT-II transform is used). In other words the transform blocks 84 are luma transform blocks and the apparatus 100 is configured to use a fixed default transformation for chroma transform blocks.

In another version, both TSM and MTS apply to all color components of a block. In other words, the apparatus 100 is, for example, configured to apply the selected transformation 112 to luma and chroma components of the picture within the predetermined transform block 84c. Additionally or alternatively the apparatus 100 is configured to decode 115 the index from the data stream 14 for the predetermined transform block per component of luma and chroma components of the picture 12a. The used version (only luma component or all components) could also be signaled in the bitstream. In other words, the apparatus 100 is, for example, configured to derive from a signal in the data stream 14 whether the transform blocks 84 are luma transform blocks and a fixed default transformation is to be used for chroma transform blocks, whether the selected transformation 112 is to be applied to luma and chroma components of the picture within the predetermined transform block, or whether the index from the data stream is to be decoded 115 for the predetermined transform block per component of luma and chroma components of the picture. Having the same conditions for all transform types, a single syntax can be transmitted in the bitstream specifying the transform type used for each transform block. One example of such a unified syntax using a TU MTS index is depicted in the following table.

TABLE 4

Example of a unified MTS signaling using one TU MTS index

| TU MTS index | transform type | |
| --- | --- | --- |
| | horizontal | vertical |
| 0 | DCT-II | DCT-II |
| 1 | SKIP | SKIP |
| 2 | DST-VII | DST-VII |
| 3 | DCT-VIII | DST-VII |
| 4 | DST-VII | DCT-VIII |
| 5 | DCT-VIII | DCT-VIII |

In the previous example, the unified MTS syntax is signaled at TU level. However, in case of a CU being split into multiple TUs, the unified MTS syntax can also be signaled at CU level, i.e. a CU MTS index. In other words the apparatus 100 is, for example, configured to decode 115 the index from the data stream 14 for a coding block of the picture which is partitioned into a plurality of transform bocks including the predetermined transform block. Note that possibly, the unified MTS syntax might be signaled a disjoint set of CUs at a higher level, i.e. the index might be valid for a set of coding blocks. Another variant would be to signal the unified MTS syntax for a disjoint set of CUs at a higher level, e.g., with the "coding block" being one of the disjoint set.

Figure 5:
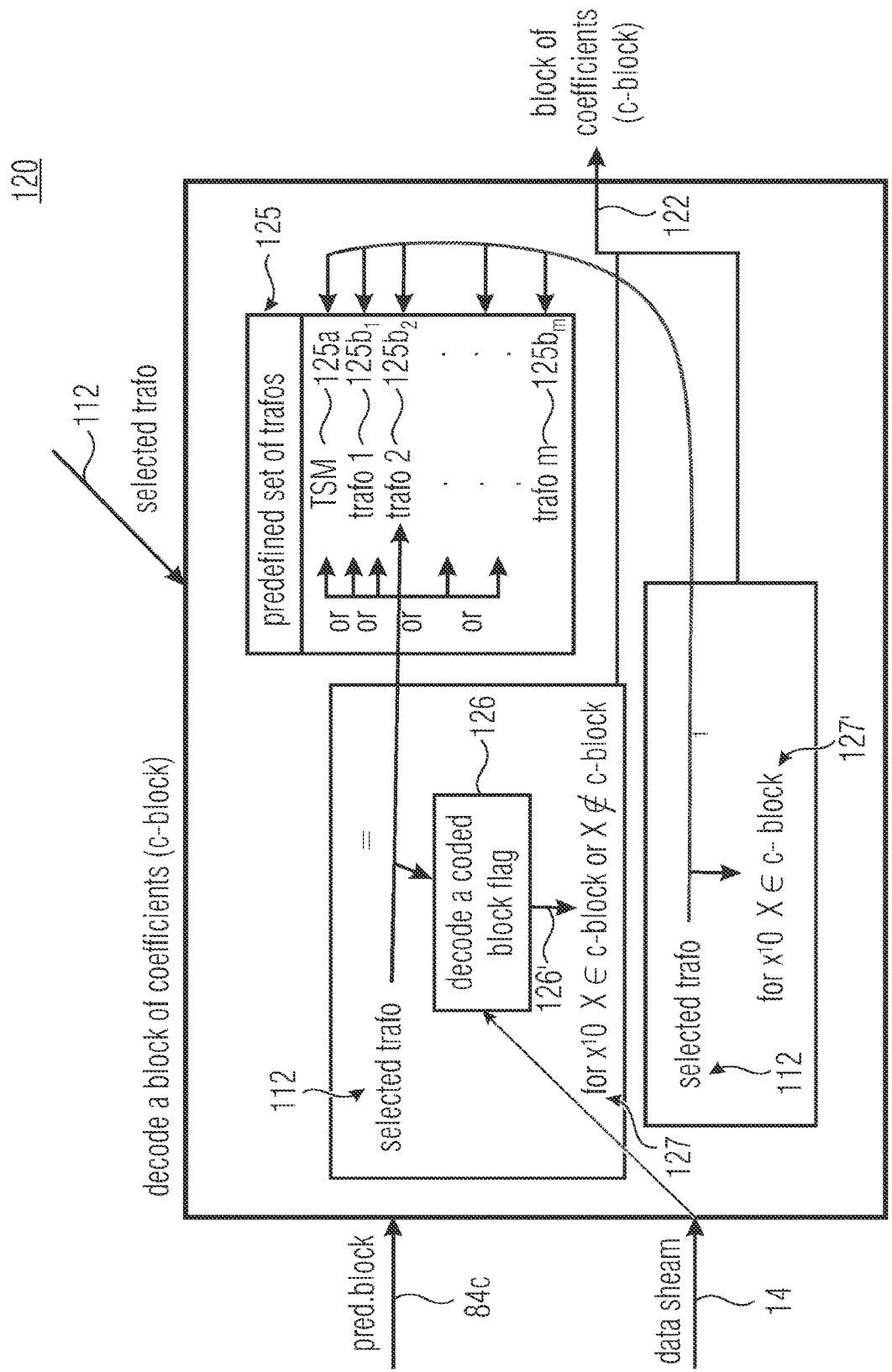
FIG. 5 shows a schematic view of an apparatus for decoding a picture, configured to decode a block of coefficients dependent on the selected transformation, according to an embodiment of the invention.

According to an embodiment the apparatus 100 can perform the decoding 120 of a block of coefficients as described in FIG. 5. In other words FIG. 5 shows a decoding 120, for the predetermined transform block 84c, a block of coefficients 122 from the data stream 14. Depending on whether the selected transformation 112 for the predetermined block 84c is contained in a predefined set 125 of one or more transformations, the apparatus is configured to decode 126 a coded block flag 126' from the data stream 14 signaling whether the block of coefficients 122 has at least one non-zero coefficient (see 127), if the selected transformation 112 for the predetermined block is contained in the predefined set 125 of one or more transformations. Alternatively, if the selected transformation 112 for the predetermined block 84c is not contained in the predefined set 125 of one or more transformations, infer that the block of coefficients 122 has at least one non-zero coefficient (see 127'). In other words, then not decoding the CBF from the data stream, or in even other words, decode a syntax element different from a current portion of the data stream from which the CBF is decoded if the selected transformation for the predetermined block is contained in the predefined set of one or more transformations.

According to an embodiment, the predefined set 125 of one or more transformations comprises the identity transformation 125a and a default non-identity transformation 125b selected, by default, according to the default way for selecting the selected transformation.

2. In general, if all levels of a transform block are equal to 0 (i.e., if CBF=0), all transform types would yield the same reconstruction signal. In the state-of-the-art, for example, the MTS transform syntax for luma is only signaled when the CBF for the luma transform block is not equal to 0, i.e., if there are any significant levels. Similarly, the TSM can only be selected if CBF is equal to 1.

In an advantageous embodiment of the present invention, the unified MTS syntax for a block including MTS and TSM information is signaled before the CBF for the block. In this configuration, the value of the CBF can be inferred to be equal to 1 if the selected transform type is not equal to one specific transform (e.g., DCT-II or transform skip) (compare FIG. 6). Or in other words, if the syntax element that specifies the transform type is equal to a pre-defined value, it specifies the transform represented by the pre-defined value and that a CBF is coded. But if the syntax element that specifies the transform type is not equal to the pre-defined value, it specifies the transform represented by the value of the syntax element and it additionally specified that the CBF is equal to 1 (the CBF is not transmitted for these values of the transform type syntax element).

Figure 6:
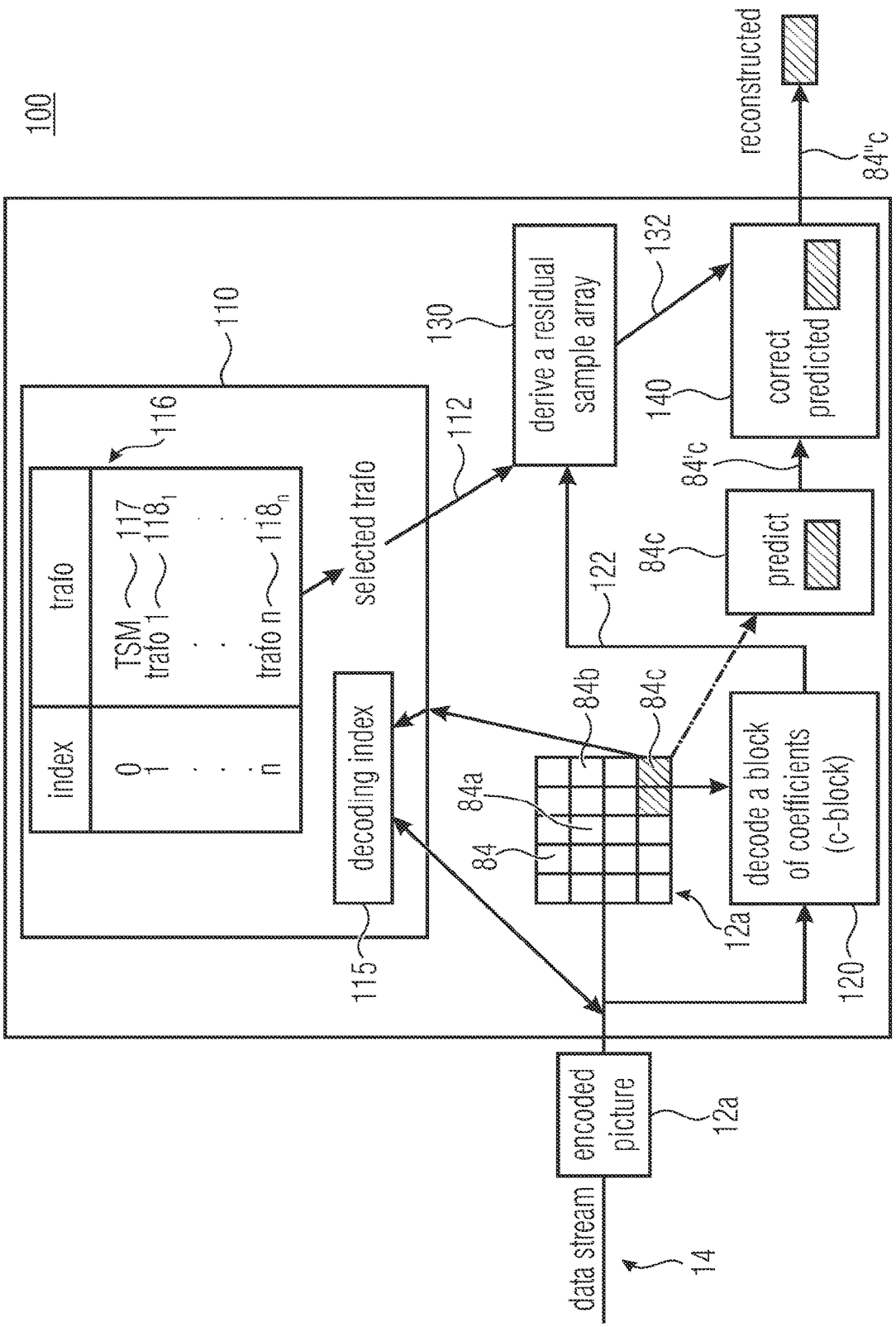
FIG. 6 shows a schematic view of an apparatus for decoding a picture, according to an embodiment of the invention.

FIG. 6 shows an apparatus 100 for decoding a picture 12a using predictive coding and block-based transform residual coding. The apparatus 100 is configured to select 110, for a predetermined transform block 84c, a selected transformation 112 by decoding 115 an index from the data stream 14 for the predetermined transform block 84c, and by using as the selected transformation 112, one transformation out of a predetermined list 116 of transformations onto which the index points. Furthermore the apparatus 100 is configured to decode 120, for the predetermined transform block 84c, a block of coefficients 122 from the data stream 14. The apparatus is configured to derive 130 from the block of coefficients 122 a residual sample array 132 for the predetermined transform block 84c so that the block of coefficients 122 is related to the residual sample array 132 according to the selected transformation 112. The apparatus 100 is also configured to correct 140 a prediction 84'c for the predetermined transform block 84c using the residual sample array 132 to reconstruct the predetermined transform block. Additionally the apparatus 100 is configured to, in decoding 120, for the predetermined transform block 84c, the block of coefficients 122 from the data stream 14 depending on whether the selected transformation for the predetermined block is contained in a predefined set of one or more transformations, as shown in FIG. 5. Thus the apparatus is configured to decode a coded block flag 126' from the data stream 14 signaling whether the block of coefficients 122 has at least one non-zero coefficient, if the selected transformation for the predetermined block is contained in the predefined set of one or more transformations, and the apparatus is configured to infer that the block of coefficients 122 has at least one non-zero coefficient, if the selected transformation for the predetermined block is not contained in the predefined set of one or more transformations. In other words, then not decoding the CBF from the data stream, or in even other words, decode a syntax element different from a current portion of the data stream from which the CBF is decoded if the selected transformation for the predetermined block is contained in the predefined set of one or more transformations.

According to an embodiment the predefined set 125 of one or more transformations comprises the identity transformation. Additionally or alternatively the predetermined list 116 of one or more transformations comprises the identity transformation. According to an embodiment the predefined set 125 of one or more transformations and the predetermined list 116 of one or more transformations can be identical. In other word one list of transformations can be used, for example, for the selection 116 of the transformation as well as for the decoding 120 of the c-block. The wording predefined set 125 of one or more transformations and predetermined list 116 of one or more transformations can be interchangeable here and in all other embodiments.

According to an embodiment, the apparatus 100 is configured to populate, or populate and sort, the predetermined list of transformations depending on the data stream 14, and to decode the index from the data stream using a variable length code, so that each transformation in the predetermined list of transformations has assigned one codeword of the variable length code and a code word length of the codewords of the variable length code monotonically increases with a rank of the transformation in the predetermined list of transformations to which the codewords are assigned. This feature is, for example, shown as transformation selection 110 in FIG. 8.

In another embodiment of the invention, the CBF is signaled before the transform type. And if CBF is equal to 0, the transform type is not signaled (the actually used transform does not have any impact on the decoding result; it could be inferred to be equal to DCT-II or transform skip or any other transform). Only if CBF is equal to 1, the transform type syntax element is transmitted. (compare FIG. 7)

Figure 7:
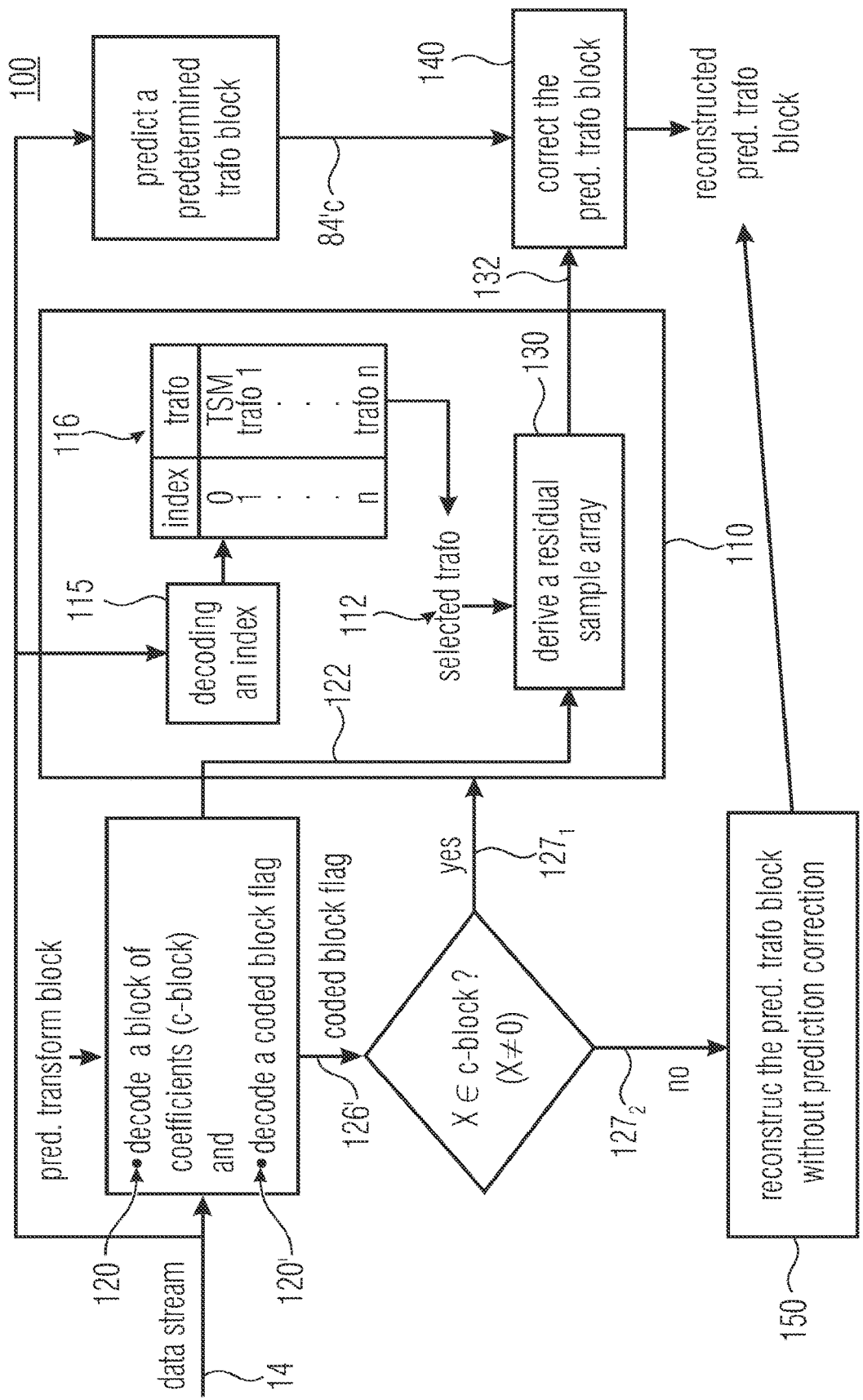
FIG. 7 shows a schematic view of an apparatus for decoding a picture, configured to reconstruct a predetermined transformation block dependent on a coded block flag, according to an embodiment of the invention.

FIG. 7 shows an apparatus 100 for decoding a picture using predictive coding and block-based transform residual coding, configured to decode 120, for the predetermined transform block, a block of coefficients 122 from the data stream 14, including decoding 120' a coded block flag 126' from the data stream 14 signaling whether the block of coefficients 122 has at least one non-zero coefficient. The apparatus 100 is configured to, if the coded block flag signals $127_1$ that the block of coefficients 122 has at least one non-zero coefficient, select 110, for a predetermined transform block, a selected transformation 112 by decoding 115 an index from the data stream 14 for the predetermined transform block, and use as the selected transformation 112, one transformation out of a predetermined list 116 of transformations onto which the index points. From the block of coefficients 122 a residual sample array 132 for the predetermined transform block is derived 130 so that the block of coefficients 122 is related to the residual sample array 132 according to the selected transformation 112. Additionally a prediction 84'$c$ for the predetermined transform block is corrected 140 using the residual sample array 132 to reconstruct the predetermined transform block. Alternatively if the coded block flag 126' signals 127$_2$ that the block of coefficients 122 does not have at least one non-zero coefficient, the apparatus 100 is configured to reconstruct 150 the predetermined transform block without prediction correction. In other words, then not decoding the index from the data stream, such as by decoding a syntax element different from the index from a current portion of the data stream from which the index is decoded if the coded block flag signals that the block of coefficients does not have at least one non-zero coefficient.

3. Another aspect to consider is the assignment and/or order of the unified MTS index to the allowed transform types. For example, TSM may be signaled before the DCT-II type and, in case of variable length coding, have the shorter codeword and vice versa. For screen or computer generated content TSM is often preferred since high frequency edge structures often occur and they are less suitable for energy compaction performed by DCT/DST-like transforms. In such cases, it is beneficial to signal TSM before any other transform type. (compare FIG. 8) Such a signal adaptive approach may be realized using a most probable transform mode (MPM) list similar to that used for intra prediction mode coding. Instead of signaling the transform type directly, an MPM list is constructed with the most probable transform type having a lower index and the index within the list is transmitted in the bitstream.

Figure 8:
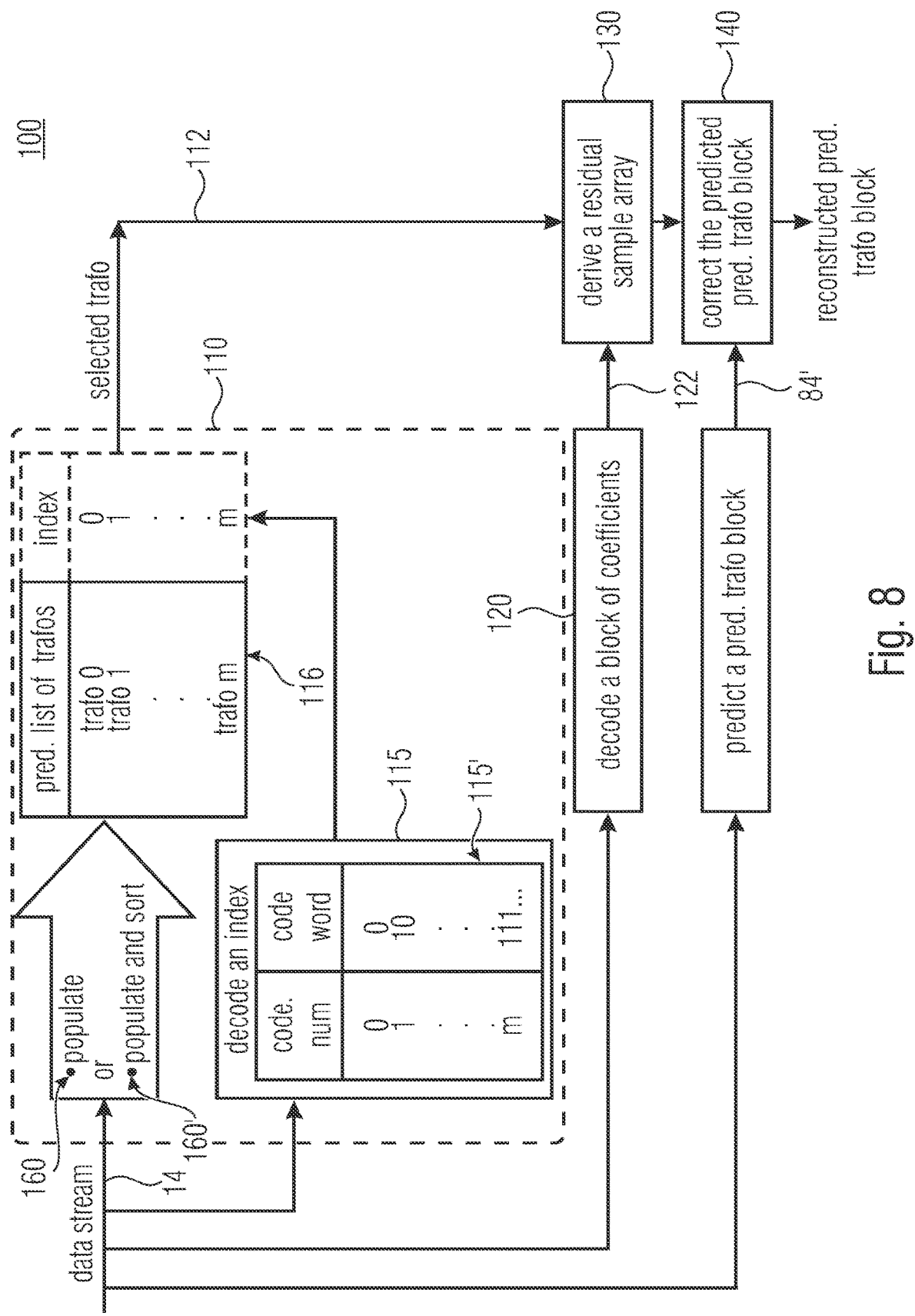
FIG. 8 shows a schematic view of an apparatus for decoding a picture, configured to populate, or populate and sort a predetermined list of transformations, according to an embodiment of the invention.

FIG. 8 shows an apparatus 100 for decoding a picture using predictive coding and block-based transform residual coding, configured to populate 160, or populate and sort 160', a predetermined list 116 of transformations depending on the data stream 14. The apparatus 100 is configured to select 110, for a predetermined transform block, a selected transformation 112 by decoding 115 an index from the data stream 14 using a variable length code 115', so that each transformation in the predetermined list 116 of transformations has assigned one codeword of the variable length code and a code word length of the codewords of the variable length code monotonically increases with a rank of the transformation in the predetermined list of transformations to which the codewords are assigned, and using as the selected transformation, one transformation out of a predetermined list of transformations onto which the index points. Furthermore the apparatus 100 is configured to decode 120, for the predetermined transform block, a block of coefficients 122 from the data stream 14, and the apparatus 100 is configured to derive 130 from the block of coefficients 122 a residual sample array 132 for the predetermined transform block so that the block of coefficients 122 is related to the residual sample array 132 according to the selected transformation 112. Additionally the apparatus is configured to correct 140 a prediction 84'$c$ for the predetermined transform block using the residual sample array 132 to reconstruct the predetermined transform block.

According to an embodiment, the apparatus is configured to sort 160' the predetermined list 116 of transformations depending on a syntax element in the data stream 14, which is at least valid for the picture globally. Additionally or alternatively the apparatus 100 is configured to sort 160' the predetermined list 116 of transformations depending on an evaluation of sample statistics in a spatial neighborhood of the predetermined transform block. Additionally or alternatively the apparatus 100 is configured to sort 160' the predetermined list 116 of transformations depending on syntax elements signaled in the data stream 14 for blocks in a spatial neighborhood of the predetermined transform block. Additionally or alternatively the apparatus 100 is configured to sort 160' the predetermined list 116 of transformations so that there exist at least one state of the data stream 14 so that the sorting 160' the predetermined list 116 of transformations arranged the identity transformation at a leading rank, e.g. with index 0, having a shortest codeword of the variable length code assigned thereto, e.g. the codeword 0.

According to an embodiment, the apparatus 100 is configured to decode 115 an index from the data stream 14 using a composed variable length code codewords of which are composed of a first codeword of a variable length code followed by, if the first codeword is a longest codeword of the variable length code, a second codeword of a fixed length code. The codewords of the composed variable length code merely composed of one of two non-longest codewords of the variable length code are assigned to, and discriminate, the identity transformation and a predefined non-identity transformation and further codewords of the composed variable length code are assigned to, and discriminate, further non-identity transformations of the predetermined list of transformations. The composed variable length code can be similar or exactly as the composed variable length code 115' in FIG. 9. 4. The binarization of the unified MTS syntax can be either fixed-length or variable-length, or a combination of both. For example, the usage of DCT-II and TSM may be variable-length and fixed-length is used for the remaining four non-DCT-II transform types.

Figure 9:
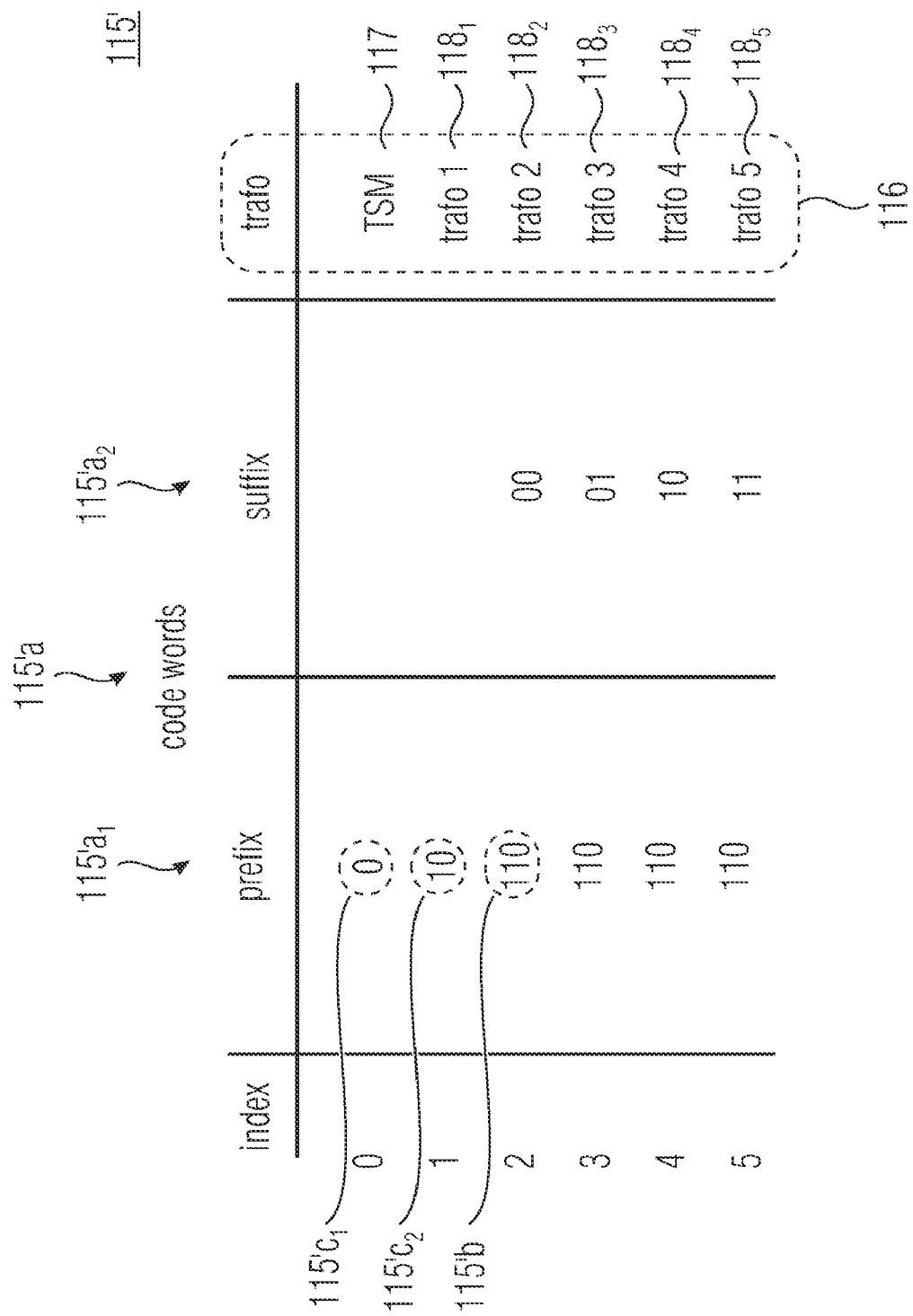
FIG. 9 shows a schematic view of composed variable length code, according to an embodiment of the invention.

In other word an apparatus 100 for decoding a picture using predictive coding and block-based transform residual coding is, according to an embodiment, configured to select, for a predetermined transform block, a selected transformation by decoding an index into a predetermined list of transformations from the data stream using, as e.g. shown in FIG. 9, a composed variable length code 115' codewords 115'$a$ of which are composed of a first codeword 115'$a_1$ of a variable length code followed by, if the first codeword 115'$a_1$ is a longest codeword 115'$b$ of the variable length code, a second codeword 115'$a_2$ of a fixed length code. The codewords 115'$a$ of the composed variable length code 115' merely composed of one of two non-longest codewords 115'$c_1$ and 115'$c_2$ of the variable length code are assigned to, and discriminate, an identity transformation 117 and a predefined non-identity transformation 118$_1$ contained in the predetermined list 116 of transformations. Further codewords of the composed variable length code are assigned to, and discriminate, further non-identity transformations 118$_2$ to 118$_5$ of the predetermined list 116 of transformations. The apparatus is configured to select, for a predetermined transform block, a selected transformation by using as the selected transformation, one transformation out of a predetermined list 116 of transformations onto which the index points. Furthermore the apparatus is configured to decode, for the predetermined transform block, a block of coefficients from the data stream, to derive from the block of coefficients a residual sample array for the predetermined transform block so that the block of coefficients is related to the residual sample array according to the selected transformation, and to correct a prediction for the predetermined transform block using the residual sample array to reconstruct the predetermined transform block.

Level Coding for Transform Skip Mode

The coding of transform coefficient levels, or shortly levels in the remainder of this document, is a process embedded in the entropy coding stage of the transform coding architecture with the latter may be a part of a hybrid video codec. In the latter architecture, a prediction minimizes the energy of the original signal resulting in a residual signal that undergoes the transform coding process. Typically, the transform and quantization stages modify the residual signal and serve the result to the entropy coding stage with the transformed and quantized coefficients being referred to as transform coefficient levels. Such a hybrid design is suitable for camera captured content. In a real-world application, however, video signals are not always camera captured; hence, the approach of transform coding is not always optimal in a rate-distortion sense. A workaround that maintains the transform coding architecture is the so-called Transform Skip Mode (TSM). As the name implies, the transformation stage is bypassed resulting in the quantization and entropy coding of the spatial residual signal. An adjustment to the entropy coding stage for the TSM results in improved compression efficiency.

Figure 10:
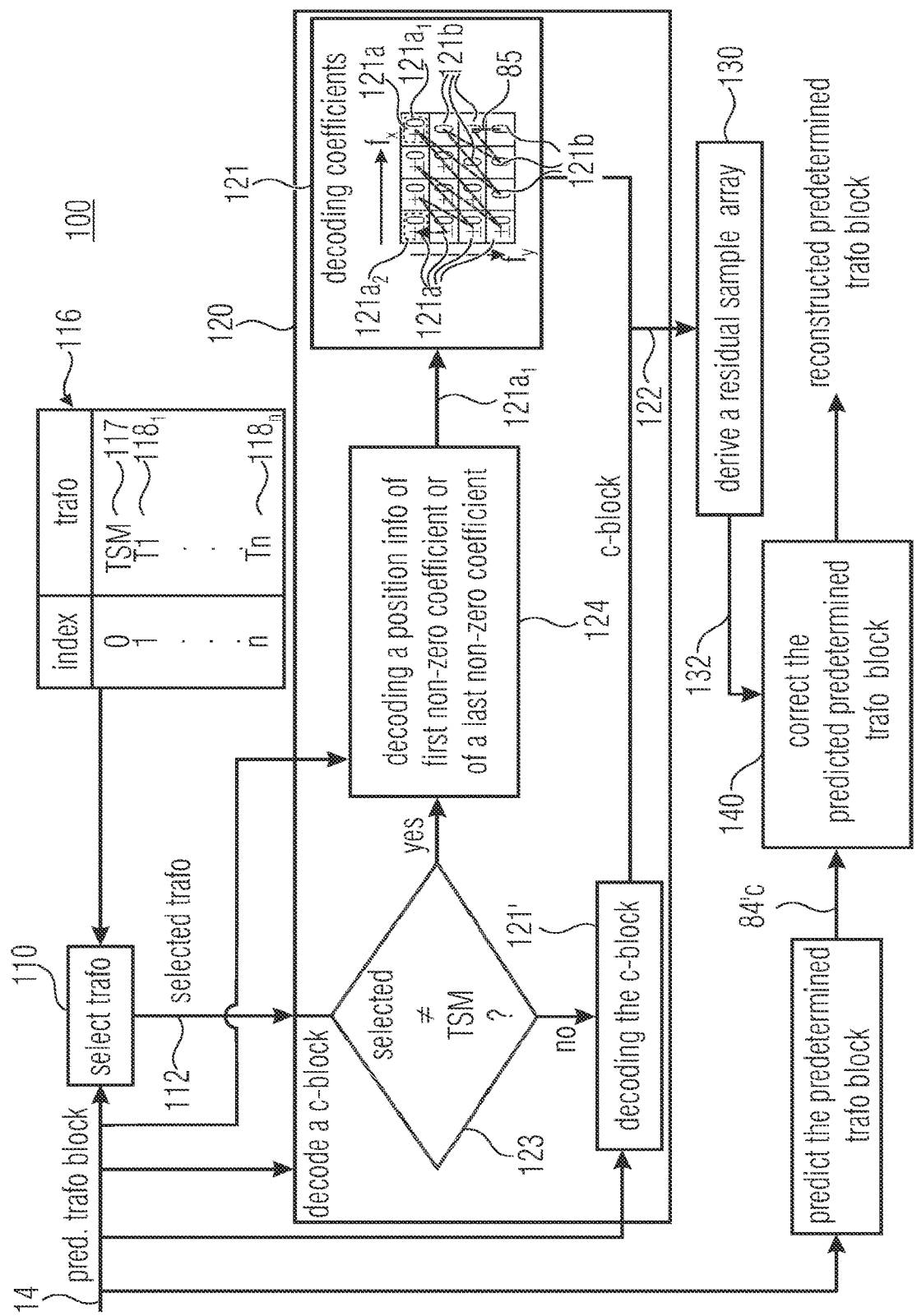
FIG. 10 shows a schematic view of an apparatus for decoding a picture, configured to decode a position information dependent on the selected transformation, according to an embodiment of the invention.

Summary of the aspects (informative notes):
1. No last position signaling
2. Subblock CBF (coded_sub_block_flag) for each sub-block
3. sig_coeff_flag context modelling including
   Reduced template for sig flag, only left and right
   Number of significant positions instead of absolute sum
4. abs_level_gt1_flag and par_level_flag context modelling:
5. abs_remainder coding:
   abs_remainder binarization with reduced template for rice parameter
   abs_remainder with dedicated context model for each bin index
   Increased number of ctx coded bin indices
   Adaptive number of ctx coded bin indices
   Maximum number of context coded bins per sample
6. coeff_sign_flag context modelling
   Different methods for context modelling
   Additional syntax elements that may modify the parsing process
7. Reduction of CCB, additionally counter-based
8. Different subblock shapes and sizes
9. Adaptive scanning patterns depending on predictor To keep the changes relative to the regular level coding mode as low as possible, a similar design may be used. Particularly, in contrast to the regular mode, a dedicated level coding mode for TSM does not employ the last significant position information (cp. FIG. 10). As a consequence, the sub-block level coded block flag (CBF) is transmitted for each sub-block within the transform block (compare FIG. 12). Furthermore, the cutoff value for the transition between the Truncated Unary and Rice/Exp-Golomb code in the binarization is fixed and increased relative to the regular mode, resulting in a higher number of bins coded in the regular mode of an entropy coder using context adaptive models.

A dedicated level coding approach is especially beneficial for the TSM since the symbol source statistics are completely different than for the other transform candidates (typically DCT/DST transforms). However, the deviation from the existing regular level coding mode should be kept as low as possible to keep the implementation overhead low. Furthermore, the dedicated TSM design should not be significantly more complex than the regular mode. The difference to the regular level coding is described as follows:

1. Last significant scanning position: Since the residual signal reflects the spatial residual after the prediction and no energy compaction by transform is performed for TSM, the higher probability for trailing zeros or insignificant levels at the bottom right corner of the transform block is not given anymore. Thus, last significant scanning position signaling is omitted in this case. Instead, the first subblock to be processed is the most bottom right subblock within the transform block. (compare FIG. 10)

FIG. 10 shows an apparatus 100 for decoding a picture using predictive coding and block-based transform residual coding, configured to select 110, for a predetermined transform block, a selected transformation 112 out of a predetermined list 116 of transformations, the selected transformation 112 comprising the identity transformation 117 and at least one non-identity transformation 118. Furthermore the apparatus 100 is configured to decode 120, for the predetermined transform block, a block of coefficients 122 from the data stream 14 by checking 123 whether the selected transform 112 is a non-identity transformation 118. If the selected transform 112 is a non-identity transformation 118, the apparatus 100 is configured to decode 120 the block of coefficients 122 by decoding 124 a position information from the data stream on where along a scanning order which traverses all coefficients of the block of coefficients, a non-zero coefficient 121a is encountered first or where along a scanning order which traverses all coefficients of the block of coefficients, a non-zero coefficient 121a is encountered last, so as to obtain predetermined coefficient position. Note the following: In the above embodiments, this position is called last position measured along a scan order leading from upper left corner to bottom right, although the actual scanning/coding started there according to these embodiments. That is the actual coding took place in a reverse scan order 85 leading from bottom-right to top-left corner. Here, the scanning order is the coding order. See the next embodiment where both scanning directions are anticipated. If the selected transform 112 is a non-identity transformation 118, the apparatus 100 is also configured to decode the block of coefficients by decoding 121 first coefficients 121a of the block of coefficients from the data stream, which include all non-zero coefficients of the block of coefficients and are traversed by the scanning order starting from or up to the predetermined coefficient position $121a_1$, and inferring second coefficients 121b of the block of coefficients, different from the first coefficients 121a, to be zero. If the selected transform 112 is the identity transformation 117, the apparatus 100 is configured to decode 120 the block of coefficients by decoding 121' all coefficients of the block of coefficients from the data stream 14. Furthermore the apparatus 100 is configured to derive 130 from the block of coefficients 122 a residual sample array 132 for the predetermined transform block so that the block of coefficients is related to the residual sample array 132 according to the selected transformation 112, and to correct 140 a prediction $84'c$ for the predetermined transform block using the residual sample array 132 to reconstruct the predetermined transform block.

According to an embodiment, the apparatus 100 is configured to in the decoding 121 of the first coefficients 121a of the block of coefficients 122 from the data stream 14, use the scanning order 85 and start the decoding of the first coefficients 121*a* at the predetermined coefficient position 121*a*$_1$, so that the first coefficients 121*a* are traversed by the scanning order 85 starting from the predetermined coefficient position 121*a*$_1$ (as shown by the scanning order 85 in FIG. 10), or finish the decoding 121 of the first coefficients 121*a* at the predetermined coefficient position 121*a*$_1$, so that the first coefficients 121*a* are traversed by the scanning order 85 up to the predetermined coefficient position 121*a*$_1$ (a reverse scanning order; in the opposite direction to the scanning order 85 shown in FIG. 10). Furthermore the apparatus 100 is configured to in the decoding 121 of all coefficients of the block of coefficients 122 from the data stream 14, sequentially decode all coefficients starting or finishing at a coefficient of the block of coefficients which is traversed last by the scanning order. The scanning order 85 shown in FIG. 10 is only an example. Different scanning orders are also possible.

According to an embodiment, the apparatus 100 is configured to in the decoding 121 of all coefficients of the block of coefficients 122 from the data stream 14, use the scanning order 85 and finish the decoding of all coefficients at a coefficient of the block of coefficients traversed last by the scanning order or use the inverse scanning order and start the decoding of all coefficients at the coefficient of the block of coefficients traversed last by the scanning order. This means, for example, that the coefficient position 121*a*$_2$ can either represent an ending position, as shown in FIG. 10, or a starting position of a scanning order. Note, that here the scanning order is defined to define the coding order in case of non-identity transformation 118.

According to an embodiment, the apparatus 100 is configured to decode 124 the position information by decoding coordinates, e.g. (x,y), of the predetermined coefficient position 121*a*$_1$ from the data steam 14, or by decoding a rank, e.g. indicating a rank in the scanning order, of the predetermined coefficient position 121*a*$_1$ within the scanning order 85 from the data stream 14.

Figure 11:
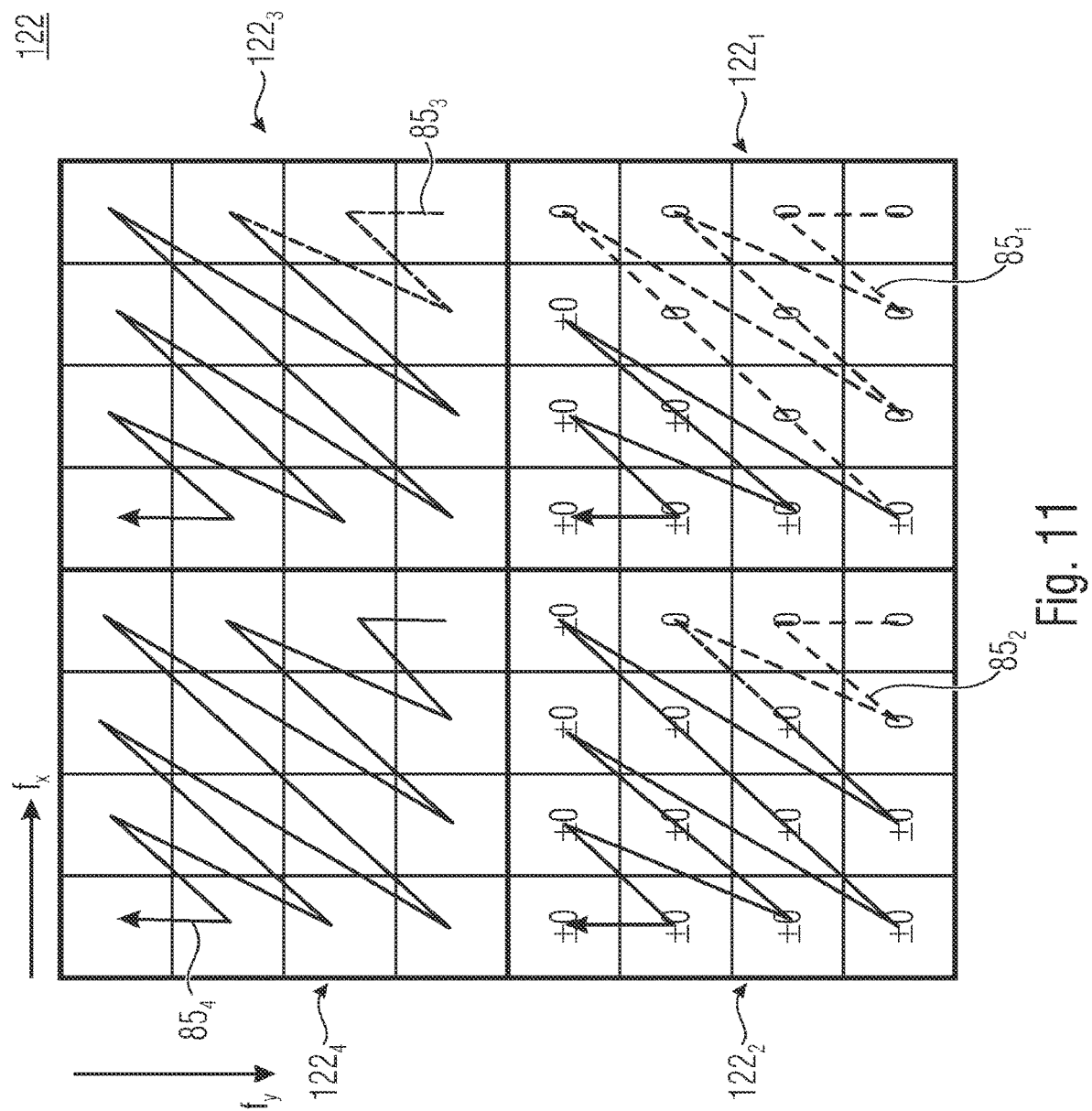
FIG. 11 shows a schematic view of an apparatus for decoding a picture, configured to decode all coefficients of the block of coefficients sub-blockwise, according to an embodiment of the invention.

According to an embodiment the apparatus 100 is configured to perform the decoding 121 of the first coefficients 121*a* of the block of coefficients 122, in sub-blocks 122$_1$-122$_4$ into which the block of coefficients is partitioned, so that the scanning order 85 traverses all first coefficients 121*a* within one sub-block before traversing first coefficients 121*a* within a different sub-block and by inferring first coefficients 121*a* within sub-blocks for which a sub-block flag, e.g. a coded sub-block flag as used in above embodiments, in the data stream 14 signals zeroness, to be zero, and decoding first coefficients 121*a* within sub-blocks for which a sub-block flag in the data stream signals non-zeroness from the data stream 14, with decoding the sub-block flags from the data stream except at least one of a first sub-block flag relating to a sub-block comprising the predetermined coefficient position, and a second sub-block flag relating to a sub-block comprising a first coefficient of the block of coefficients between which and the predetermined coefficient position the first coefficients are located, and inferring the at least one of the first and second sub-block flags to signal non-zeroness. Furthermore the apparatus is configured to perform the decoding 121 of all coefficients of the block of coefficients 122 from the data stream 14 in the sub-blocks 122$_1$-122$_4$ into which the block of coefficients is partitioned, so that the scanning order traverses all coefficients within one sub-block before traversing first coefficients within a different sub-block and by inferring coefficients within sub-blocks for which a sub-block flag in the data stream signals zeroness, to be zero, and decoding coefficients within sub-blocks for which a sub-block flag in the data stream signals non-zeroness from the data stream, with decoding the sub-block flags from the data stream for all sub-blocks. An example of this decoding 121 is shown in FIG. 11. According to FIG. 11, for example, the sub-blocks 122$_1$, 122$_2$, 122$_3$ and 122$_4$ are decoded in this order, whereby only the first coefficients are decoded and all second coefficients are not decoded. The scanning order 85 is shown as a continuous line through all first coefficients and as a dashed ling through all second coefficients. A reversed scanning of the sub-blocks 122$_1$-122$_4$ and/or a reversed scanning order 85 is also possible.

According to an embodiment, the apparatus 100 is configured to in the decoding of the sub-block flags from the data stream for all sub-blocks, decode the sub-block flags from the data stream for all sub-blocks sequentially in a sub-block order, and infer the sub-block flag being last in sub-block order to signal non-zeroness, if all preceding sub-block flags preceding in sub-block order signal zeroness. Compare the above embodiments where in 2.b. it has been stated: "This also includes the coded_sub_block_flag for the DC subblock except when all other coded_sub_block_flag syntax elements are already equal to 0. In this case, the DC coded_sub_block_flag is inferred to be equal to 1" (Compare FIGS. 13*a* and 13*b*)

According to an embodiment, the apparatus 100 is configured to in the decoding of the sub-block flags from the data stream for all sub-blocks, decode the sub-block flags from the data stream for all sub-blocks sequentially in a sub-block order, and if all preceding sub-block flags preceding in sub-block order signal zeroness, decode the coefficients within a predetermined sub-block for which sub-block flag being last in sub-block order is inferred to signal non-zeroness sequentially in coefficient order and decode for each coefficient within the predetermined sub-block, except a last coefficient, a significance flag indicating whether the respective coefficient is non-zero, and infer the last coefficient to be non-zero if the other coefficients within the predetermined sub-block are zero, and decode a significance flag for the last coefficient if at least one of the other coefficients within the predetermined sub-block is non-zero. Furthermore the apparatus 100 is configured to in the decoding of the sub-block flags from the data stream except the at least one of the first sub-block flag and the second sub-block flag, decode the sub-block flags from the data stream except the at least one of the first sub-block flag and the second sub-block flag, and infer same to signal non-zeroness, and inevitably decode for all first coefficients within the sub-block to which the second sub-block flag relates, a significance flag indicating whether the respective coefficient is non-zero. Compare above embodiments where inference for SIG flag at (0,0) took place if all other SIG flags of this sub-block are equal to 0, see 2.b of the description: "In this case, the DC coded_sub_block_flag is inferred to be equal to 1 (inferDcSbCbf=1). Since there has to be at least one significant level in this DC subblock, the sig_coeff_flag syntax element for the first position at (0,0) is not signaled and derived to be equal to 1 (inferSbDcSigCoeffFlag=1) instead if all other sig_coeff_flag syntax elements in this DC subblock are equal to 0."

2. Subblock CBFs: The absence of the last significant scanning position signaling needs the subblock CBF signaling with coded_sub_block_flag for TSM to be modified as follows:

a. Due to quantization, the aforementioned sequence of insignificance may still occur locally inside a transform block. Thus, the last significant scanning position is removed as described before and coded_sub_block_flag is coded for all sub-blocks. (compare FIG. 12)

According to an embodiment an apparatus 100 for decoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus 100 is configured to decode 120, for the predetermined transform block, a block of coefficients from the data stream by decoding 121 the coefficients of the block of coefficients from the data stream in sub-blocks into which the block of coefficients is partitioned, by inferring coefficients within sub-blocks for which a sub-block flag in the data stream signals zeroness, to be zero, and decoding coefficients within sub-blocks for which a sub-block flag in the data stream signals non-zeroness from the data stream, with if the selected transformation 112 is one of the at least one non-identity transformation (see $123_1$ in FIG. 12), sequentially decoding $200_1$ the sub-block flags from the data stream 14 except at least one of a first sub-block flag $210_1$, e.g. a sub-block flag related to a first sub-block, in scanning order, related to a position information indicating non-zeroness, and a last sub-block flag $210_n$, and inferring the at least one of the first $210_1$ and last $210_n$ sub-block flags to signal non-zeroness. For non-identity transformations the probability of non-zero coefficients in the top-left sub-block is high. Depending on the scanning order this sub-block is either the first $210_1$ or the last $210_n$ sub-block. Furthermore the apparatus 100 is configured to decode, for the predetermined transform block, a block of coefficients from the data stream by decoding the coefficients of the block of coefficients from the data stream in sub-blocks into which the block of coefficients is partitioned, by inferring coefficients within sub-blocks for which a sub-block flag in the data stream signals zeroness, to be zero, and decoding coefficients within sub-blocks for which a sub-block flag in the data stream signals non-zeroness from the data stream, with if the selected transformation 112 is the identity transformation (see $123_2$ in FIG. 12), decoding $200_2$ the sub-block flags from the data stream for all sub-blocks. For identity transformations sub-blocks with a high probability of non-zero coefficients are not known, for which reason all sub-block flags should be decoded. Additionally the apparatus is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. This apparatus can be similar to the apparatus shown in FIG. 10 with the difference, that the decoding 120 of the c-block is performed as shown in FIG. 12.

b. The coded_sub_block_flag for the subblock covering the DC frequency position (top-left subblock) presents a special case. In state-of-the-art level coding, the coded_sub_block_flag for this subblock is never signaled and always inferred to be equal to 1. When the last significant scanning position is located in another subblock, it means that there is at least one significant level outside the DC subblock. Consequently, the DC subblock may contain all zero/non-significant level although the coded_sub_block_flag for this subblock is inferred to be equal to 1. With the absence of the last scanning position information in TSM, the coded_sub_block_flag for each subblock is signaled. This also includes the coded_sub_block_flag for the DC subblock (compare FIG. 12) except when all other coded_sub_block_flag syntax elements are already equal to 0 (compare FIG. 13a and FIG. 13b). In this case, the DC coded_sub_block_flag is inferred to be equal to 1 (inferDcSbCbf=1). Since there has to be at least one significant level in this DC subblock, the sig_coeff_flag syntax element for the first position at (0,0) is not signaled and derived to be equal to 1 (inferSbDcSigCoeffFlag=1) instead if all other sig_coeff_flag syntax elements in this DC subblock are equal to 0. This is not the case in state-of-the-art level coding.

Figure 12:
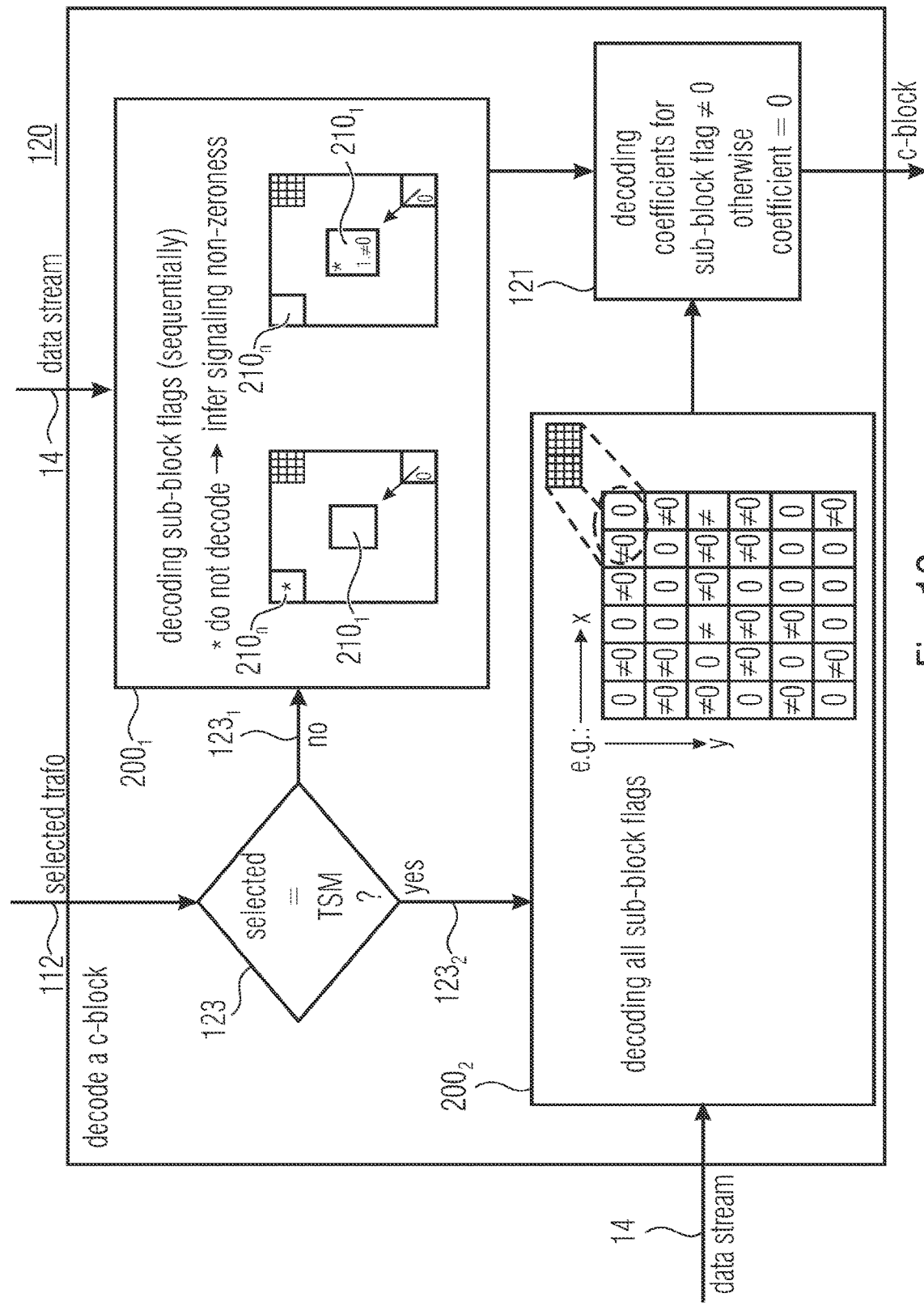
FIG. 12 shows a schematic view of an apparatus for decoding a picture, configured to decode sub-block flags dependent on the selected transformation, according to an embodiment of the invention.
Figure 13A:
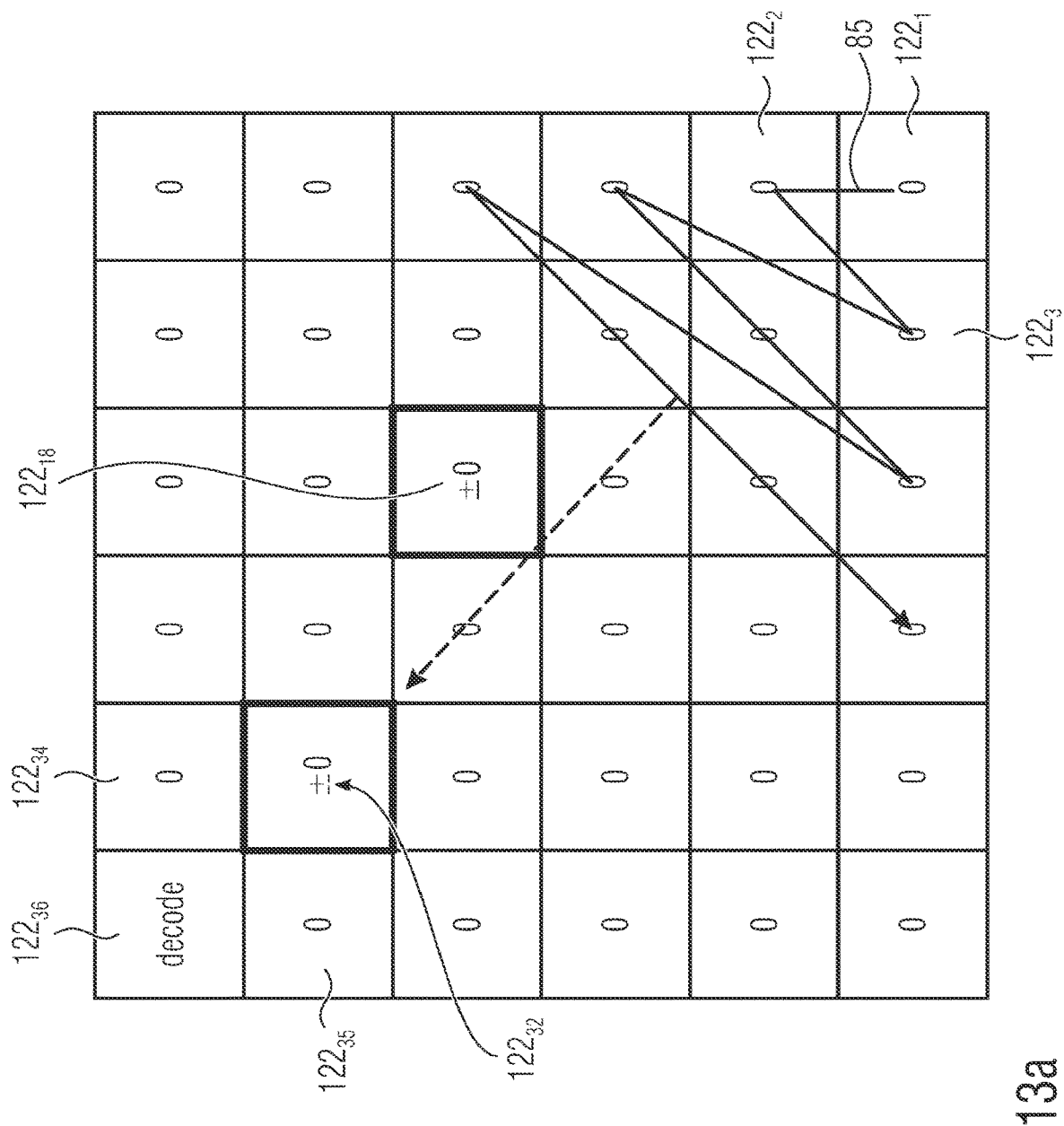
FIG. 13a shows a schematic view of decoding sub-block flags, if at least one preceding sub-block flag signals non-zeroness, according to an embodiment of the invention.
Figure 13B:
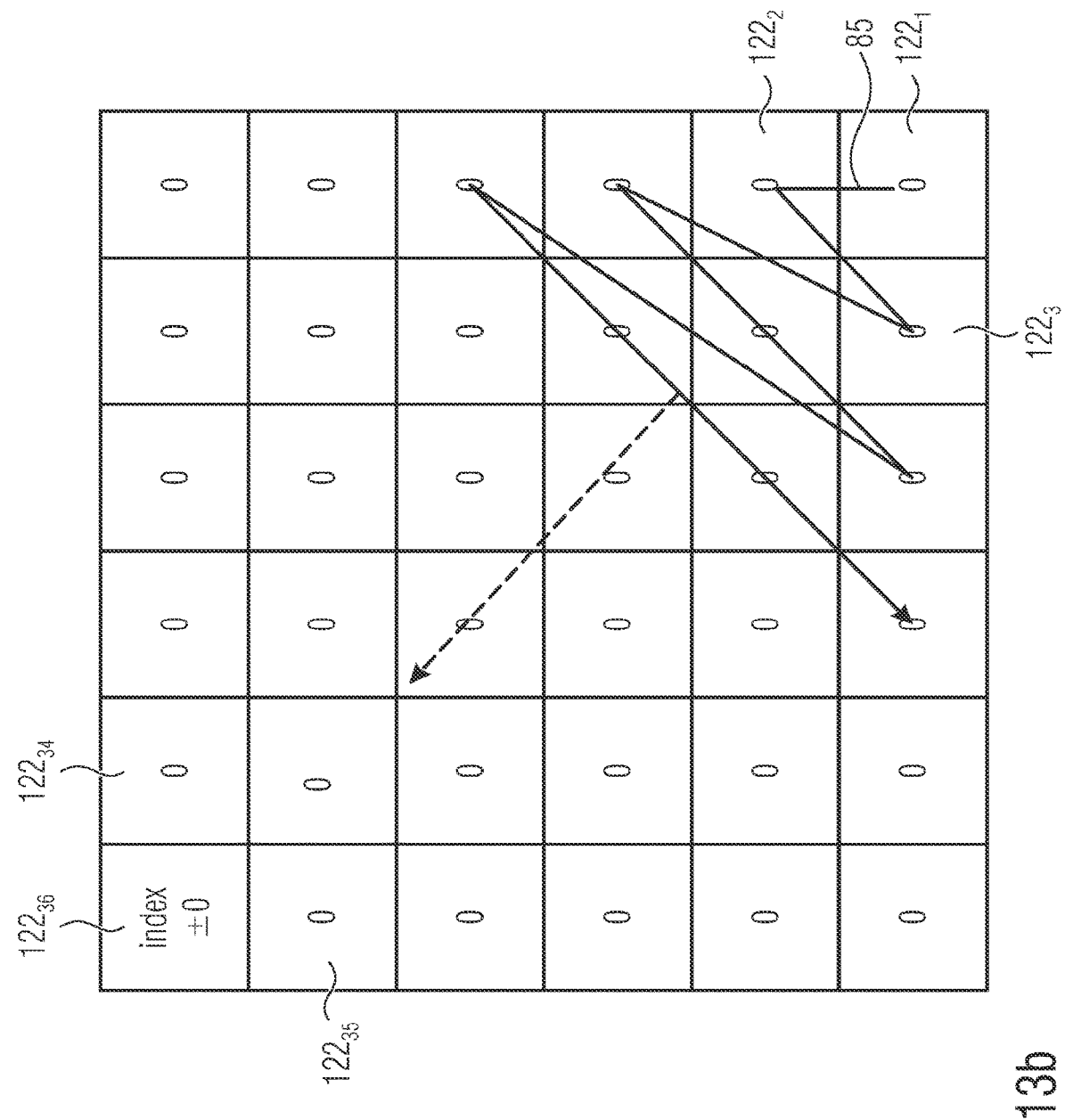
FIG. 13b shows a schematic view of decoding sub-block flags, if all preceding sub-block flag signals zeroness, according to an embodiment of the invention.

According to an embodiment, the apparatus 100, similar to the apparatus shown in FIG. 10 with the difference, that the decoding 120 of the c-block is performed as shown in FIG. 12, is configured to, in the decoding of the sub-block flags from the data stream for all sub-blocks $122_1$-$122_{36}$, decode the sub-block flags from the data stream for all sub-blocks $122_1$-$122_{36}$ sequentially in a sub-block order 85, and decode a sub-block flag being last in the sub-block order, e.g. the sub-block flag of the sub-block $122_{36}$, if at least one of preceding sub-block flags preceding in sub-block order, signals non-zeroness (e.g. the sub-block flag of the sub-block $122_{32}$ and the sub-block flag of the sub-block $122_{18}$ indicate non-zeroness in FIG. 13a), and infer the sub-block flag being last in sub-block order, e.g. the sub-block flag of the sub-block $122_{36}$, to signal non-zeroness if all preceding sub-block flags, e.g. the flags of all preceding sub-blocks $122_1$ to $122_{35}$ preceding in sub-block order, signal zeroness (compare FIG. 13b).

According to an embodiment, the apparatus 100 is configured to when inferring the sub-block flag being last in sub-block order to signal non-zeroness, infer a last coefficient within the sub-block for which the last sub-block flag is inferred to signal non-zeroness to indicate non-zeroness if all preceding coefficients within said sub-block are zero.

According to an embodiment, the apparatus 100 is configured to configured to decode a currently decoded sub-block flag from the data stream by context adaptive entropy decoding and using a context which depends on a logical disjunction of sub-block flags relating to sub-blocks neighboring the currently decoded sub-block flag if the selected transformation is one of the at least one non-identity transformation, and which depends on a arithmetic sum of sub-block flags relating to sub-blocks neighboring the currently decoded sub-block flag if the selected transformation is the identity transformation c. When there is only one subblock inside a transform block, coded_sub_block_flag is never signaled as in-state-of-the-art level coding (this is included in the previous case, since no subblock with CBF equal to 1 was transmitted for the current transform block).

d. Moreover, the context modeling for coded_sub_block_flag is changed. The context model index is calculated as the sum of the CBF of the right subblock coded_sub_block_flag (R) and the CBF of the subblock below coded_sub_block_flag(B) instead of and a logical disjunction of both, i.e. coded_sub_block_flag(R) |coded_sub_block_flag(R). (compare FIG. 14)

Figure 14:
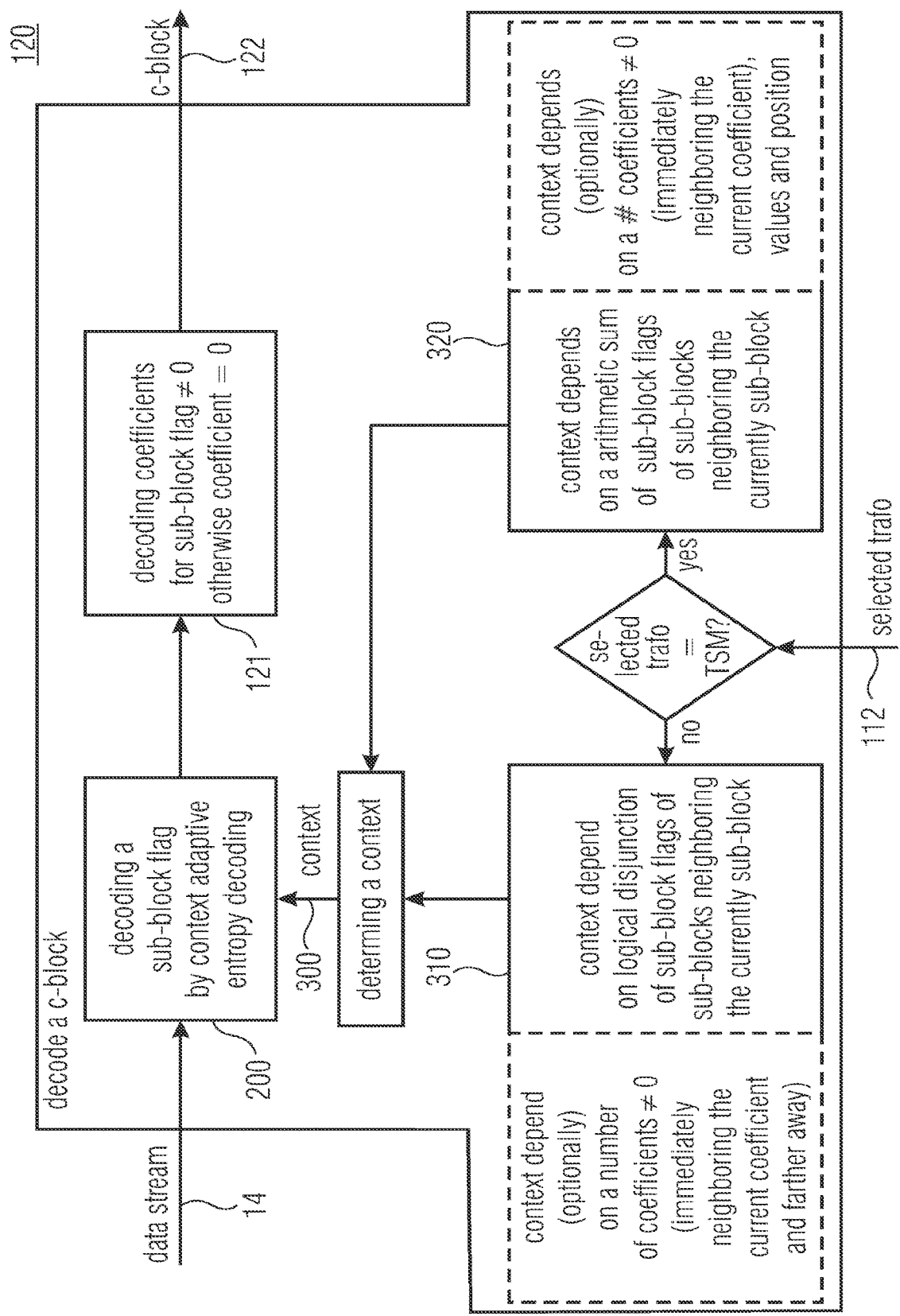
FIG. 14 shows a schematic view of an apparatus for decoding a picture, configured to decode a sub-block flag by context adaptive entropy decoding, according to an embodiment of the invention.

According to an embodiment an apparatus 100 for decoding a picture using predictive coding and block-based transform residual coding, is configured to select, for a predetermined transform block, a selected transformation 112 out of a predetermined list of transformations, the selected transformation comprising the identity transformation and at least one non-identity transformation. Furthermore the apparatus 100 is configured to decode 120, for the predetermined transform block, a block of coefficients 122 from the data stream 14 by decoding 121 the coefficients of the block of coefficients from the data stream in sub-blocks into which the block of coefficients is partitioned, by inferring coefficients within sub-blocks for which a sub-block flag in the data stream signals zeroness, to be zero, and decoding coefficients within sub-blocks for which a sub-block flag in the data stream 14 signals non-zeroness from the data stream, with decoding 200 a currently decoded sub-block flag from the data stream by context adaptive entropy decoding and using a context 300 which depends on a logical disjunction 310 of sub-block flags relating to sub-blocks neighboring the currently decoded sub-block flag if the selected transformation is one of the at least one non-identity transformation, and depends on a arithmetic sum 320 of sub-block flags relating to sub-blocks neighboring the currently decoded sub-block flag if the selected transformation is the identity transformation. Additionally the apparatus 100 is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. This apparatus can be similar to the apparatus shown in FIG. 10 with the difference, that the decoding 120 of the c-block is performed as shown in FIG. 14.

According to an embodiment, the apparatus 100 is configured to decode for a current coefficient within a sub-block for which a sub-block flag in the data stream signals non-zeroness from the data stream a significance flag indicative of whether the current coefficient is zero or not using a context which depends on a number of coefficients 310 being non-zero among a first set of coefficients immediately neighboring the current coefficient if the selected transformation is the identity transformation, and depends on a number of coefficients 320 being non-zero among a second set of coefficients which comprises the first set of coefficients and coefficients positioned farther away from the current coefficient than the first set of coefficients, values of the second set of coefficients and a position of the current coefficient if the selected transformation is one of the at least one non-identity transformation.

3. sig_coeff_flag_context_modeling: The context modeling for sig_coeff_flag employs a local template similar to the state-of-the-art level coding mode described above. However, only the neighbor to the right ($NB_0$) and the neighbor below ($NB_1$) the current scanning position are considered. The context model offset is just the number of significant neighboring positions sig_coeff_flag($NB_0$)+sig_coeff_flag($NB_1$). Hence, the selection of different context sets depending on the diagonal d within the current transform block is removed. This results in three context models and a single context model set for coding the sig_coeff_flag flag. (compare FIG. 15)

Figure 15:
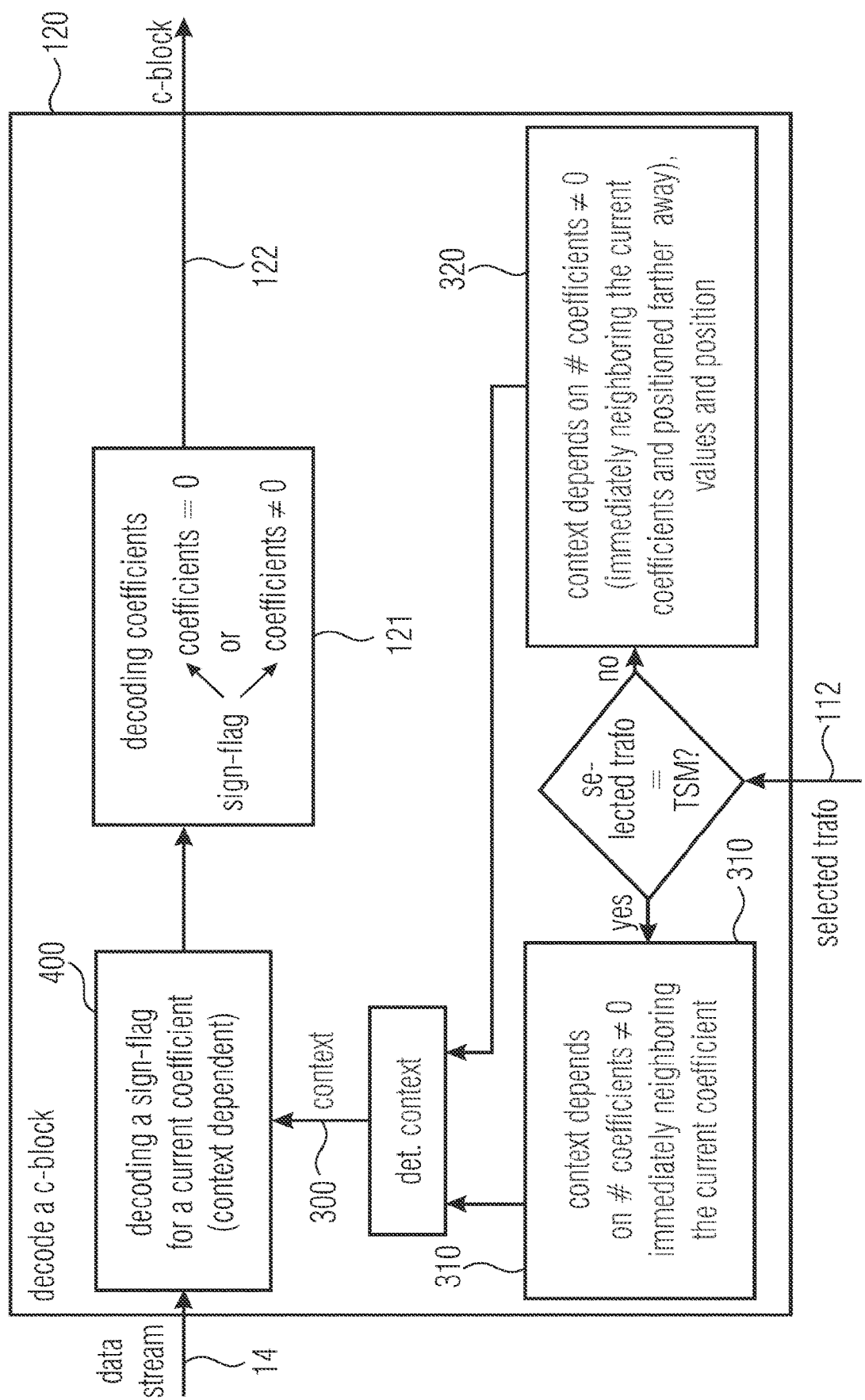
FIG. 15 shows a schematic view of an apparatus for decoding a picture, configured to decode a sig-flag using a context, according to an embodiment of the invention.

According to an embodiment, an apparatus 100 for decoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus 100 is configured to decode 120, for the predetermined transform block, a block of coefficients 122 from the data stream 14 by decoding 400 for a current coefficient a significance flag indicative of whether the current coefficient is zero or not using a context 300 which depends 310 on a number of coefficients being non-zero among a first set of coefficients immediately neighboring the current coefficient if the selected transformation 112 is the identity transformation, and depends 320 on a number of coefficients being non-zero among a second set of coefficients which comprises the first set of coefficients and coefficients positioned farther away from the current coefficient than the first set of coefficients, values of the second set of coefficients and a position of the current coefficient if the selected transformation 112 is one of the at least one non-identity transformation. Additionally the apparatus 100 is configured to derive from the block of coefficients 122 a residual sample array for the predetermined transform block so that the block of coefficients is related to the residual sample array according to the selected transformation, and correct a prediction for the predetermined transform block using the residual sample array to reconstruct the predetermined transform block. This apparatus can be similar to the apparatus shown in FIG. 10 with the difference, that the decoding 120 of the c-block is performed as shown in FIG. 15.

According to an embodiment the apparatus 100 is configured to decode a predetermined coefficient by context adaptively entropy decoding N greater-than-X flags indicative of whether an absolute of the predetermined coefficient is greater than X or not, and by decoding, using a variable length code, a remainder indicative of an amount at which the absolute of the predetermined coefficient exceeds an absolute threshold which depends on N, with N being larger if the selected transformation is the identity transformation, than compared to if the selected transformation is one of the at least one non-identity transformation.

4. abs_level_gt1_flag_and_par_level_flag_context_modeling: a single context model is employed for the flags abs_level_gt1_flag and par_level_flag.

5. abs_remainder_coding: Although the empirical distribution of the absolute levels typically still fits a Laplacian or a Geometrical distribution, there exist larger instationarities than for transform coefficients. Particularly, the variance within a window of consecutive realization is higher than for the regular case. This motivates the following modifications of the abs_remainder syntax binarization and context modelling:

a. Using a higher cutoff value in the binarization, i.e., the transition point from the coding with sig_coeff_flag,_abs_level_gt1_flag, par_level_flag, and abs_level_qt3_flag to the Rice codes for abs_remainder, and dedicated context models for each bin position yields higher compression efficiency. (compare FIG. 16) Increasing the cutoff will result in more "greater than X" flags, e.g. by introducing abs_level_gt5_flag, abs_level_gt7_flag, and so on until a/the cutoff is reached (numGtXFlags). The cutoff itself may be fixed for all transform block sizes, or fixed depending on the transform block size, or adaptively selected depending on already coded transform blocks, or signaled in a high-level syntax structure inside the bitstream, e.g. at sequence, picture, slice or tile level.

b. The number of context coded bins specifying whether the absolute level is larger than a threshold is either fixed or adaptive. Each bin index uses a dedicated context model c. The template for the rice parameter derivation is modified, i.e., only the neighbor to the left and the neighbor below the current scanning position are considered similar to the local template for sig_coeff_flag context modeling.

Figure 16:
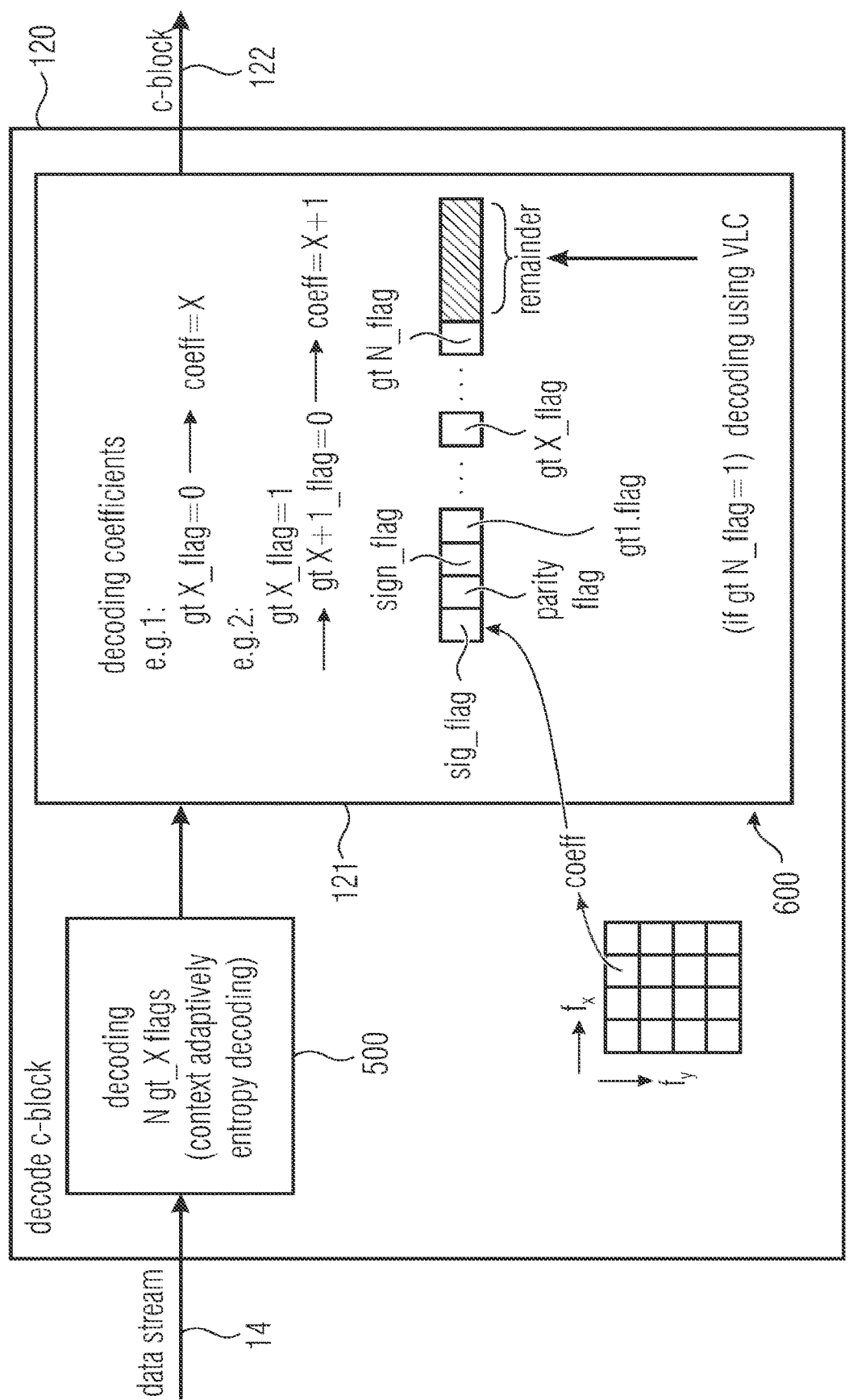
FIG. 16 shows a schematic view of an apparatus for decoding a picture, configured to decode a block of coefficients by context adaptively entropy decoding N greater-than-X flags and decoding, using a variable length code, a remainder, according to an embodiment of the invention.

According to an embodiment an apparatus 100 for decoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus 100 is configured to decode 120, for the predetermined transform block, a block of coefficients 122 from the data stream 14 by decoding a predetermined coefficient by context adaptively entropy decoding 500 N greater-than-X flags indicative of whether an absolute of the predetermined coefficient is greater than X or not, and by decoding 600, using a variable length code, a remainder indicative of an amount at which the absolute of the predetermined coefficient exceeds an absolute threshold which depends on N, with N being larger if the selected transformation is the identity transformation, than compared to if the selected transformation is one of the at least one non-identity transformation. Additionally the apparatus is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. This apparatus can be similar to the apparatus shown in FIG. 10 with the difference, that the decoding 120 of the c-block is performed as shown in FIG. 16.

According to an embodiment, the apparatus 100 is configured to perform the context adaptively entropy decoding of the N greater-than-X flags in a sequence of passes by context adaptively entropy decoding the N greater-than-X flags sequentially with increasing X with one or more of the N greater-than-X flags per pass, wherein the apparatus is configured to log a number of flags coded using context adaptively entropy decoding during the sequence of passes and to cease the context adaptively entropy decoding of the N greater-than-X flags if the number exceeds a predetermined flag threshold.

According to an embodiment, the variable length code is a Rice code, and the apparatus 100 is configured to determine a Rice parameter of the Rice code depending on a first set of coefficients immediately neighboring the predetermined coefficient if the selected transformation is the identity transformation, and depending on a second set of coefficients which comprises the first set of coefficients and coefficients positioned farther away from the predetermined coefficient than the first set of coefficients if the selected transformation is one of the at least one non-identity transformation.

According to an embodiment, the apparatus 100 is configured to decode a sign of the predetermined coefficient by context adaptive entropy decoding using a predetermined context and updating a probability associated with the predetermined context if the selected transformation is the identity transformation, and by bypass encoding (e.g. context adaptive entropy encoding with fixed equi-probability) if the selected transformation is one of the at least one non-identity transformation.

6. coeff_sign_flag_context_modelling: Due to the instationarities inside the sequence of signs and the fact that the prediction in intra are often biased, the signs can be coded using context models, even when the global empirical distribution is almost uniformly distributed. A single dedicated context model may be used for the coding of the signs. Alternatively, the context model may depend on the signs of the neighbors evaluated using a local template. A further alternative is the usage of a fixed context model for the current sub-block with the context offset being derived using the neighboring sub-blocks and their sign symbols. The signs are coded with context models instead using the bypass mode of the entropy coder. (compare FIG. 17)

Figure 17:
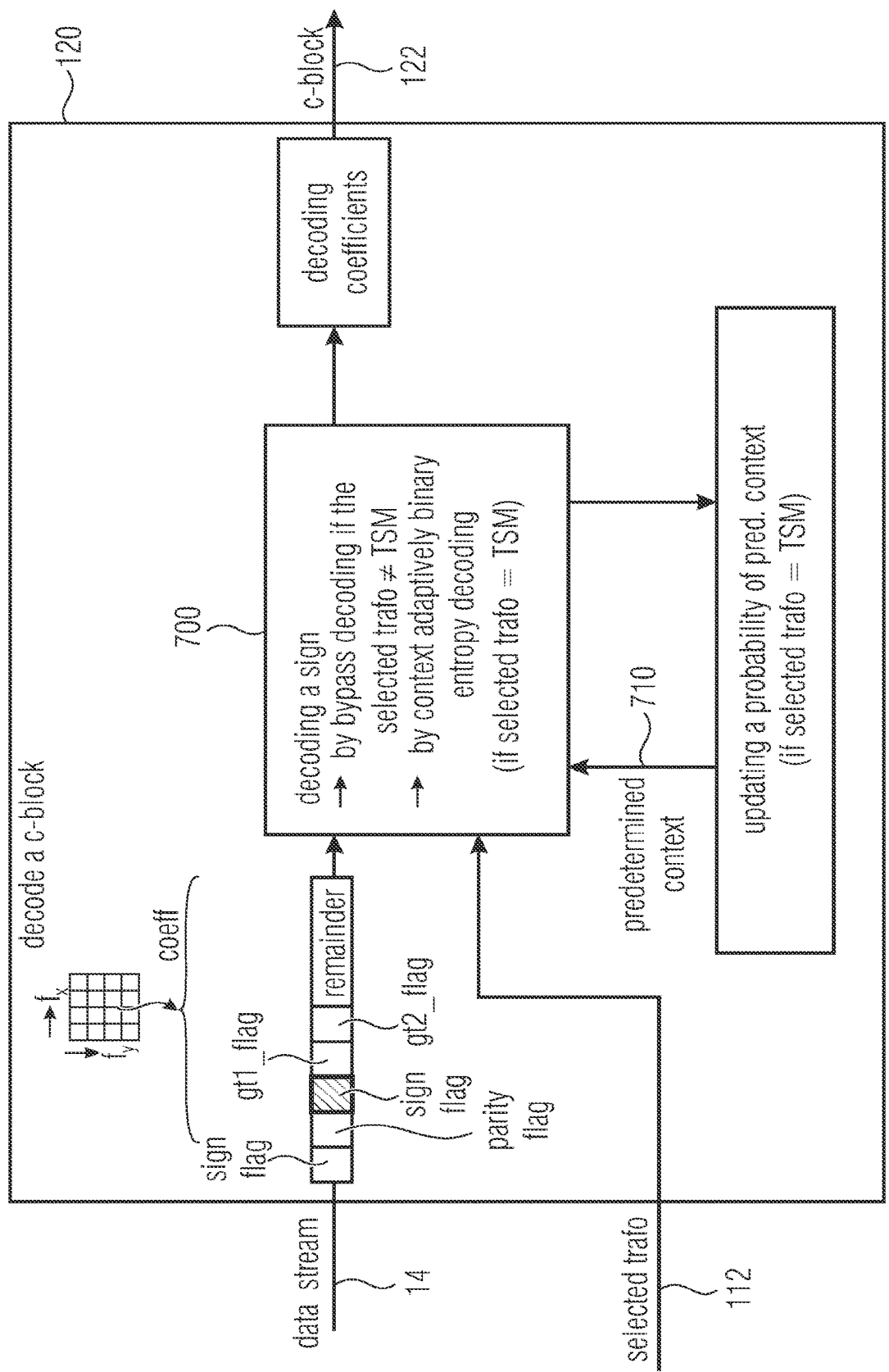
FIG. 17 shows a schematic view of an apparatus for decoding a picture, configured to decode a sign of a coefficient dependent on the selected transformation, according to an embodiment of the invention.

According to an embodiment, an apparatus 100 for decoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus 100 is configured to decode 120, for the predetermined transform block, a block of coefficients 122 from the data stream 14 by decoding 700 a sign of a predetermined coefficient. The Apparatus 100 is configured to, in the decoding of the sign of the predetermined coefficient, use context adaptive entropy decoding using a predetermined context 710 (e.g. selecting a context depending on signs of coefficients of the block of coefficients in a neighborhood of the predetermined coefficient) and updating a probability associated with the predetermined context 710 if the selected transformation 112 is the identity transformation, and use bypass decoding (e.g. context adaptive entropy decoding with fixed equi-probability) if the selected transformation 112 is one of the at least one non-identity transformation. Additionally the apparatus is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. This apparatus can be similar to the apparatus shown in FIG. 10 with the difference, that the decoding 120 of the c-block is performed as shown in FIG. 17.

According to an embodiment, the apparatus 100 is configured to select the predetermined context 710 among a plurality of context depending on a statistic of signs of previously decoded coefficients if the selected transformation is the identity transformation.

According to an embodiment, the apparatus 100 is configured to select the predetermined context 710 depending on a relative frequency of positive or negative signs among non-zero coefficients within the previously decoded coefficients if the selected transformation is the identity transformation.

According to an embodiment, the apparatus 100 is configured to set the number context models of the plurality of context models to a default number.

According to an embodiment, the apparatus 100 is configured to derive the number context models of the plurality of context models from the data stream.

According to an embodiment, the apparatus 100 is configured to associate the context models with mutually adjoining and non-overlapping relative frequency intervals for a relative frequency of positive or negative signs and perform the selection so that among the relative frequency of positive or negative signs among non-zero coefficients of the previously decoded coefficients falls into the relative frequency interval associated with the predetermined context model.

According to an embodiment, the apparatus 100 is configured to determine the statistic over the signs of the previously decoded coefficients so that the previously decoded coefficients are spread over a picture or video portion larger than the predetermined transform block.

According to an embodiment, the apparatus 100 is configured to entropy decode the signs of all non-zero coefficients of the predetermined transform block using the predetermined context model if the selected transformation is the identity transformation.

According to an embodiment, the apparatus 100 is configured to entropy decode the signs of a subset of non-zero coefficients of the predetermined transform block located in a sub-block of the block of coefficients and including the non-zero predetermined coefficient using the predetermined context model, and update the statistic using the signs of a subset of non-zero coefficients of the predetermined transform block to obtain an updated statistic, select a further predetermined context model among the plurality of context models depending on the updated statistic and entropy decode the signs of a further subset of non-zero coefficients of the predetermined transform block located in a further sub-block of the block of coefficients using the further predetermined context model if the selected transformation is the identity transformation.

According to an embodiment, the apparatus 100 is configured to update a sign probability associated with the predetermined context model based on the sign of the predetermined non-zero coefficient if the selected transformation is the identity transformation.

According to an embodiment, the apparatus 100, wherein the plurality of context models is subdivided into sets of context models and the apparatus is configured to perform the selection by selecting a predetermined set of contexts models based on the statistic of signs of previously decoded coefficients, and perform the selection by selecting the predetermined context model among the selected set of context models depending on the sign of one or more neighboring non-zero coefficients, such as ones located at positions of a template located at and surrounding the respective sign, if the selected transformation is the identity transformation.

According to an embodiment, the apparatus is configured to if the selected transformation is one of the at least one non-identity transformation, perform the context adaptively entropy decoding of the N greater-than-X flags in a sequence of passes by context adaptively entropy decoding the N greater-than-X flags sequentially with increasing X with one or more of the N greater-than-X flags per pass, and log a number of flags coded using context adaptively entropy decoding during the sequence of passes and to cease the context adaptively entropy decoding of the N greater-than-X flags if the number exceeds a predetermined flag threshold. Additionally the apparatus 100 is configured to if the selected transformation is the identity transformation, perform the context adaptively entropy decoding of the N greater-than-X flags sequentially and decode, after decoding a significance flag (X=0) among the N greater-than-X flags and prior to further N greater-than-X flags among the N greater-than-X flags, a greater-than-X-flags-bypass flag indicative of whether the predetermined coefficient is greater than the absolute threshold and cease the context adaptively entropy decoding of the N greater-than-X flags with respect to the further greater-than-X flags in case of the greater-than-X-flags-bypass flag indicating that the predetermined coefficient is greater than the absolute threshold (e.g. and resume the context adaptively entropy decoding of the N greater-than-X flags with respect to the further greater-than-X flags except a last one of the N greater-than-X flags in case of the greater-than-X-flags-bypass flag indicating that the predetermined coefficient is not greater than the absolute threshold).

7. Reduction of CCB: The first scanning pass, i.e., the transmission of the sig_coeff_flag, abs_level_gt1_flag, and par_level_flag syntax elements, is unchanged. However, the limit on the number of context coded bins (CCBs) is removed and handled differently as follows:
   a. The reduction of CCB can be guaranteed by specifying a mode with CCB>k as invalid with k being a positive integer number. Note that k=2 for the regular level coding mode of the current VVC development. Such a limitation equals to the reduction of the quantization space.

b. To avoid such a limitation, an additional flag may be signaled after the sig_coeff_flag syntax specifying if the absolute level is greater than the threshold that can be achieved with CCB. For example, the number of additional greater flags is set equal to four (numGtXFlags=5) resulting in eight CCB (sig_coeff_flag, abs_level_gt1_flag/abs_level_gtX_flag(0), par_level_flag, abs_level_gt3_flag/abs_level_gtX_flag(1), abs_level_g5_flag/abs_level_gtX_flag(2), abs_level_g7_flag/abs_level_gtX_flag(3), abs_level_g9_flag/abs_level_gtX_flag(4), coeff_sign_flag). In such a configuration, the absolute level that can be signaled with CCB is equal to nine. The level limit flag then indicates that the current absolute level is greater than nine, hence, the number of CCB can be reduced for a transform block. Note that such a concept may only be possible for TSM and not for regular transformed and quantized transform blocks. (compare FIG. 18)

Figure 18:
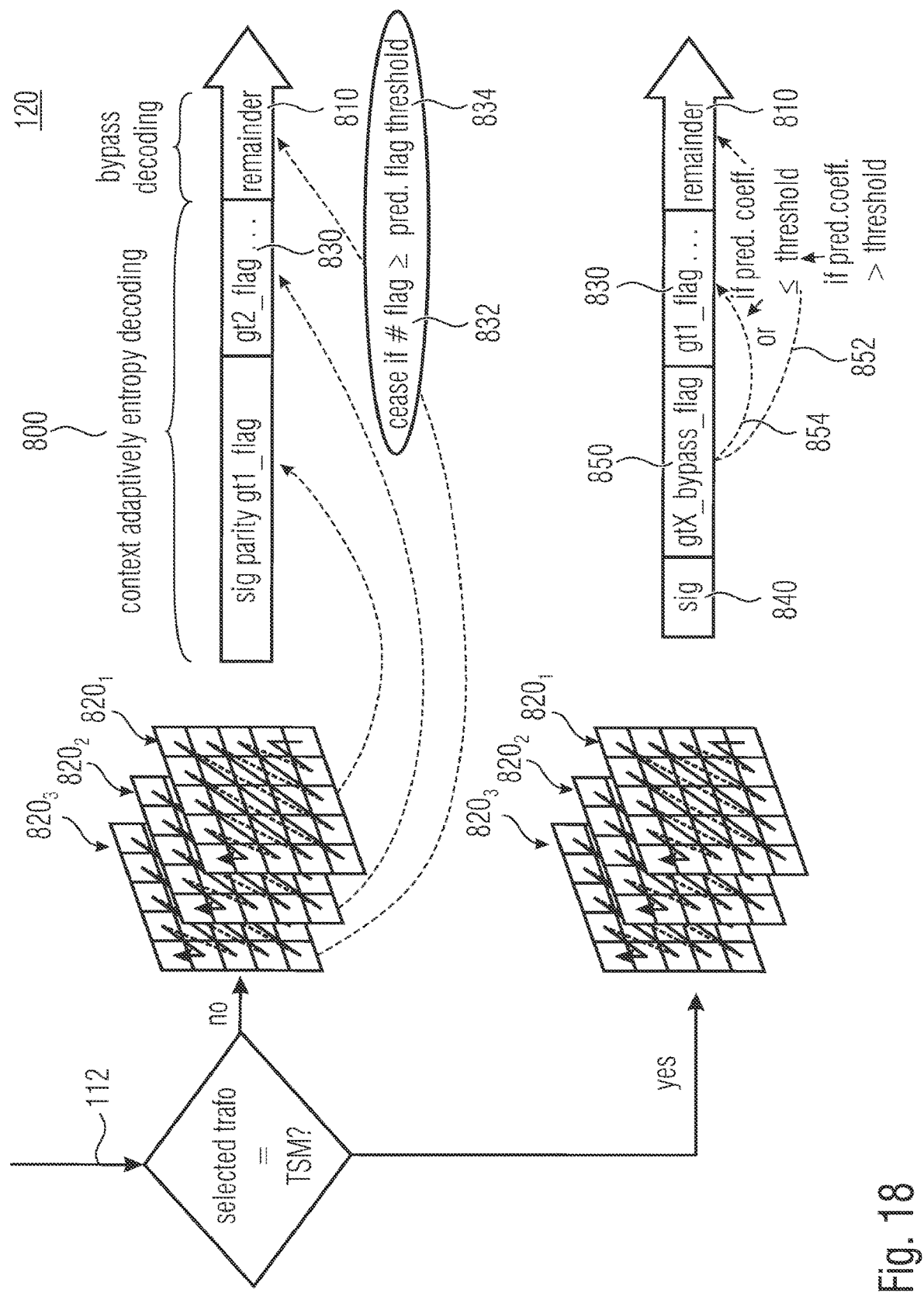
FIG. 18 shows a schematic view of an apparatus for decoding a picture, configured to decode a block of coefficients in multiple passes dependent on the selected transformation, according to an embodiment of the invention.

According to an embodiment, an apparatus 100 for decoding a picture using predictive coding and block-based transform residual coding, is configured to select, for a predetermined transform block, a selected transformation 112 out of a predetermined list of transformations, the selected transformation 112 comprising the identity transformation and at least one non-identity transformation. Furthermore the apparatus 100 is configured to decode 120, for the predetermined transform block, a block of coefficients 122 from the data stream by decoding a predetermined coefficient. The apparatus 100 is configured to, in decoding the predetermined coefficient, use context adaptively entropy decoding 800 N greater-than-X flags (e.g. N gtX_flags, like the gt1_flag, the gt2_flag and so on in FIG. 18) indicative of whether an absolute of the predetermined coefficient is greater than X or not, and use a variable length code for decoding a remainder 810 indicative of an amount at which the absolute of the predetermined coefficient exceeds an absolute threshold which depends on N. The apparatus 100 is configured to, in decoding the predetermined coefficient, if the selected transformation is one of the at least one non-identity transformation, perform the context adaptively entropy decoding 800 of the N greater-than-X flags in a sequence of passes 820₁ to 820₃ by context adaptively entropy decoding 800 the N greater-than-X flags sequentially 830 with increasing X with one or more of the N greater-than-X flags per pass, and log a number 832 of flags coded using context adaptively entropy decoding during the sequence 830 of passes and to cease the context adaptively entropy decoding 800 of the N greater-than-X flags if the number 832 exceeds a predetermined flag threshold 834, and if the selected transformation 112 is the identity transformation (e.g., TSM=transform skip mode), perform the context adaptively entropy decoding 800 of the N greater-than-X flags sequentially 830 and decode, after decoding a significance flag 840 (X=0) among the N greater-than-X flags and prior to further N greater-than-X flags, like the gt1_flag, among the N greater-than-X flags, a greater-than-X-flags-bypass flag 850 indicative of whether the predetermined coefficient is greater than the absolute threshold and cease the context adaptively entropy decoding of the N greater-than-X flags with respect to the further greater-than-X flags in case 852 of the greater-than-X-flags-bypass flag indicating that the predetermined coefficient is greater than the absolute threshold (e.g. and resume the context adaptively entropy decoding of the N greater-than-X flags with respect to the further greater-than-X flags except a last one of the N greater-than-X flags in case 854 of the greater-than-X-flags-bypass flag indicating that the predetermined coefficient is not greater than the absolute threshold). Additionally the apparatus 100 is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. FIG. 18 shows an example of decoding the block of coefficients in multiple (at least two) passes or scans. According to an embodiment shown in FIG. 18 in a first scan only the sig_flag, the parity_flag and the gt1_flag are decoded and in the second to the Nth scan all remaining gtX_flags are decoded, if the selected transformation 112 is a non-identity transformation. Alternatively, if the selected transformation is the identity transformation the gtX_bypass_flag 850 indicates, whether gtX_flags have to be decoded or whether the decoding of the gtX_flags can be skipped and only the remainder has to be decoded.

c. Since a high number of bins using the regular mode of the entropy coder represents a challenge in implementation for hardware architectures, a limitation of that number is beneficial. An approach is the bitstream limitation, i.e., a coding decision that leads to some context coded bins larger than a specific threshold is invalid, and therefore, a conforming decoder can expect a maximum number of context coded bins given a conforming bitstream. Alternatively, the number of context coded bins is tracked for each transform block. Within the processing of a transform block, when the limit has been reached, all remaining level information is transmitted using the bypass mode by either without modification to the binarization or with modification of the binarization (compare FIG. 20). In the latter configuration, each absolute level is binarized using a combination of Rice/Exp-Golomb code, i.e., the Truncated Unary part is in involved in the binarization processes anymore.

Figure 20:
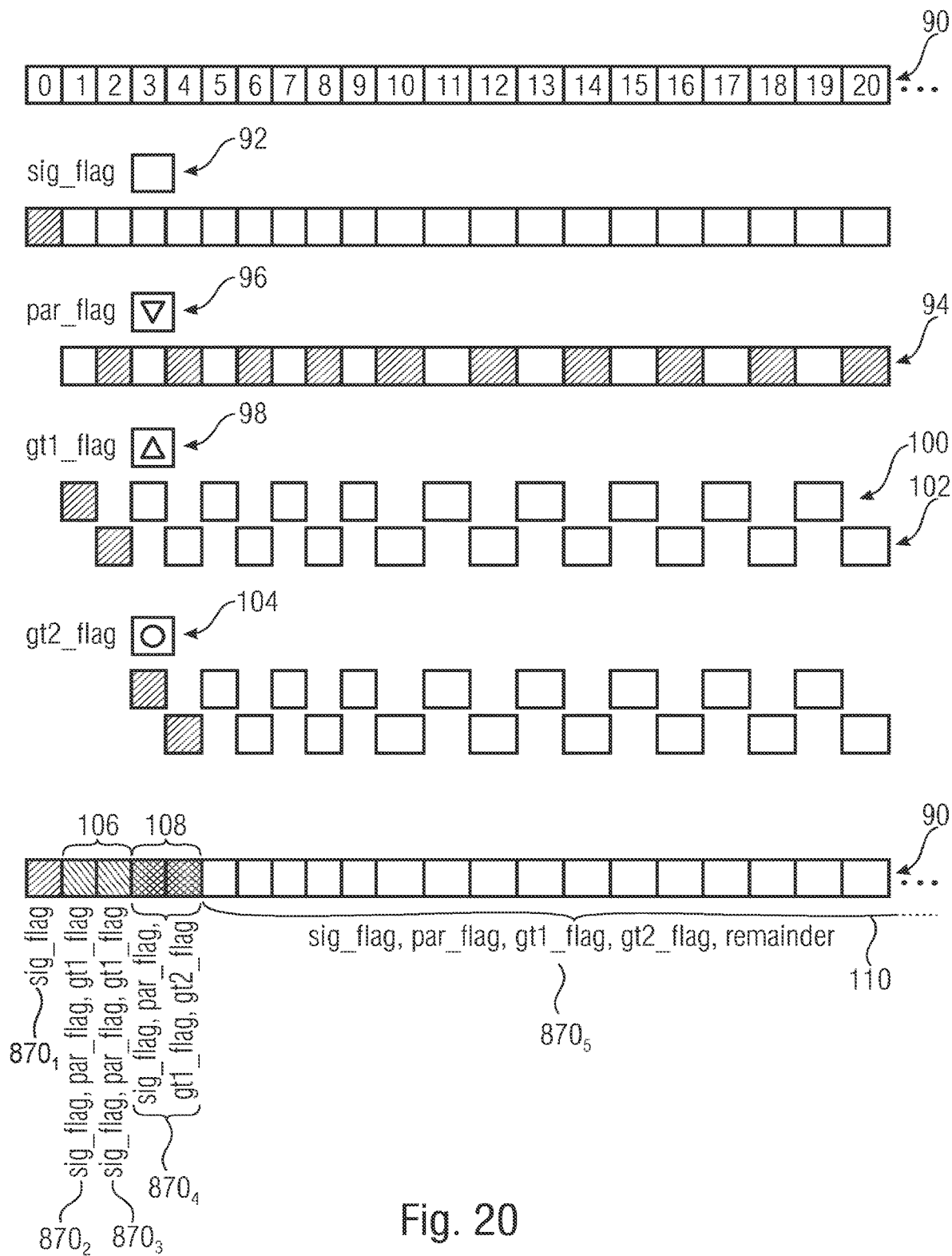
FIG. 20 shows a schematic view of an apparatus for decoding a picture, configured to decode a block of coefficients in multiple passes by decoding one or more flags, each flag reducing an absolute value domain, according to an embodiment of the invention.

According to an embodiment, an apparatus 100 is configured to, for decoding a picture using predictive coding and block-based transform residual coding, select, for a predetermined transform block, a selected transformation out of a predetermined list of transformations, the predetermined list of transformations comprising the identity transformation and at least one non-identity transformation. Furthermore the apparatus 100 is configured to decode, for the predetermined transform block, a block of coefficients from the data stream by decoding, in a sequence of passes which traverse the coefficients of the block, one or more predetermined flags, e.g. a sig_flag 92, a par_flag 96 (parity_flag), a gt1_flag 98 (greater than X flag for X=1) and/or a gt2_flag 104 (greater than X flag for X=2) as shown in FIG. 20 and/or a parity flag and/or additional greater than X flags, for each coefficient from the data stream using context adaptively binary entropy decoding, each predetermined flag reducing an absolute value domain 90 of the respective coefficient (e.g. parity bit 96 reduces the absolute value domain 90 to one half by excluding every even or uneven absolute value, and greater than X flags, e.g. gt1_flag 98 and gt2_flag 104, reduce the domain 90 of possible absolute values by either excluding one of the possible absolute values or leaving only this one of the possible absolute values and excluding all others) within which an absolute value of the respective coefficient is positioned (e.g. the absolute value domain starts at the beginning of the one or more passes, for instance, from a general absolute value domain of the coefficients $0 \ldots 2^{X-1}$ in case of X bit representation). Additionally the apparatus 100 is configured to decode, for the predetermined transform block, a block of coefficients from the data stream by decoding, in a sequence of passes which traverse the coefficients of the block, for each coefficient for which a cardinality of the absolute value domain 90 is not reduced down to one by the one or more predetermined flags 92, 96, 98, 104 decoded for the respective coefficient, a variable length code codeword (e.g. Rice/Exp-Golomb code) indicating the absolute value of the respective coefficient within the absolute value domain 90 of the respective coefficient (e.g. the code length of the variable length code may monotonically increase with increasing absolute value, see $870_1$ to $870_5$). The apparatus 100 is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. Furthermore the apparatus is configured to, in decoding, in the sequence of passes, the one or more predetermined flags 92, 96, 98, 104, cease the decoding of the one or more predetermined flags as soon as a predetermined number of predetermined flags 92, 96, 98, 104 has been reached (i.e. the overall number of predetermined flags having been decoded so far for all coefficients reaches a limit) so that the cardinality of the absolute value domain within which the pointer points to the absolute value is smaller for a first set of non-zero coefficients compared to a second set of non-zero coefficients (namely smaller for coefficients preceding the reaching of the limit within the last pass than compared to coefficients following the reaching of the limit), and the apparatus is configured to use different variable length codes for the variable length code codeword of the first and second sets of non-zero coefficients. (see FIG. 20)

In order to illustrate the just-outlined concept for limiting the number of context-adaptively encoded/decoded flags, reference is made to FIG. 20. FIG. 20 illustrates the initial value domain for the absolute value domain of the transform coefficient's quantization indexes at 90. This initial value domain may encompass all integer values between zero and some maximum value. The initial value domain may also be an interval which opens towards larger numbers. The number of integer values in the initial value domain 90 need not to be necessarily a power of 2. Further, FIG. 20 shows the various flag types participating in representing the individual quantization indexes, i.e., participating in indicating the absolute value thereof. There is the sig_flag type indicating whether the absolute value of a certain quantization index is zero or not. That is, the sig_flag 92 bi-splits the initial value domain 90 into two sub-portions, namely, one merely comprising the zero, and the other comprising all other possible values. That is, the sig_flag already uniquely indicates the absolute value of a quantization index if the latter happens to be zero as illustrated at the bottom of FIG. 14. The non-zero values of the initial value domain 90 form a value domain 94 which is further bi-split by the flag type par_flag, namely into odd values on the one hand and even values on the other hand. A par_flag 96 needs to be present for a certain quantization index only if the latter is non-zero. The par_flag 96 does not yield uniqueness with respect to one of the halves into which same bi-splits the value domain 94. It indicates one half as the next resulting (recursively defined) value domain and accordingly, the next flag, namely the gt1_flag 98, bi-splits this resulting value domain after the par_flag further, namely the odd non-zero values 100 in case of the quantization index value being odd valued, and the even non-zero values 102 in case of the quantization index being an even non-zero value. In particular, the bi-splitting by gt1_flag 98 is done in a manner so that one portion merely comprises the smallest odd value of value domain 100 or the smallest non-zero even value of domain 102, respectively. The other portion comprises all other values of the respective domain 100/102. The latter remaining value domain is further bi-split by the flag gt2_flag 104 in the same manner, i.e., the smallest value represents one portion, the other values represent the other portion. As shown at the bottom of FIG. 20, this means that merely the sig_flag 92 is coded for a quantization index of a certain transform coefficient if the latter happens to be zero, and sig_flag, par_flag and gt1_flag 92, 96 and 98 are coded to represent a certain quantization index of a certain transform coefficient if the latter happens to fall into value interval 106 comprising absolute values 1 and 2, and all flags 92, 96, 98 and 104 are coded so as to represent the absolute value of the quantization index of a certain transform coefficient if same happens to fall into the immediately following value interval 108 including values 3 and 4, and additionally a reminder is coded for quantization indexes of transform coefficients the absolute value of which lies in a remaining interval 110 out of the initial value domain 90. Flags of the flag types 92, 96 and 98 are, for example, coded in a first pass. Flag 104 is, for example, coded in a second pass. These flags are coded using context-adaptive arithmetic coding. However, the number of flags coded in a pass may be limited and is limited, for example, by a predetermined flag threshold as described with regard to FIG. 18. The flag of the flag types 92, 96 and 98 are coded for a currently visited transform coefficient location within the first pass along the order 85 only if all three flag types could still be coded in pass $60_1$ without the overall number of coded flags in pass $60_1$ exceeding the maximum allowed number of flags to be coded/decoded in the pass $820_1$. Similarly, the flag of the flag type 104 is, for example, coded for a currently visited transform coefficient location within the second pass $820_2$ along the order 85 only if same may still be coded in pass $60_2$ without the overall number of coded flags 834 in pass $820_2$ exceeding the maximum allowed number 834 of flags to be coded/decoded in pass $820_2$.

According to an embodiment, the different variable length codes for the variable length code codeword of the first and second sets of non-zero coefficients differ in a binarization boundary (cut off value) between a transitioning from a unary part to a Rice- and Exp-Golomb part and/or a binarization parameter of common binarization scheme.

According to an embodiment, the different variable length codes for the variable length code codeword of the first and second sets of non-zero coefficients differ in a different dependency of a binarization boundary (cut off value) between a transitioning from a unary part to a Rice- and Exp-Golomb part and/or a binarization parameter of common binarization scheme on previous decoded coefficients.

Figure 19:
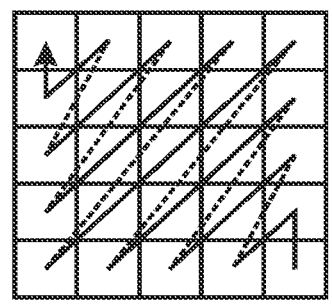
FIG. 19 shows a schematic view of an apparatus for decoding a picture, configured to decode a block of coefficients in multiple passes by differently distributing a decoding of N greater-than-X flags, a remainder and a sign over the sequence of passes depending on the selected transformation, according to an embodiment of the invention.
Figure 19:
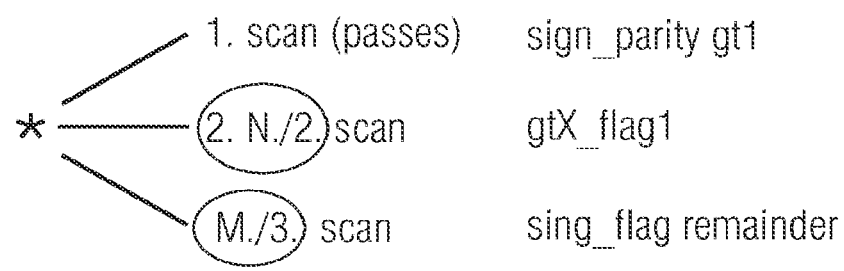

8. Scanning passes: The transmission order of syntax elements can be changed. While it is generally beneficial to encode all bypass-coded bins of a subblock consecutively. There are multiple possibilities to organize the regular-coded bins in one or more scanning passes. In one version of the invention, all regular coded bins (including the coeff_sign_flag flags) are coded in one scan pass and all bypass-coded bins are coded in a second scan pass. In another version, the regular coded bins are transmitted in multiple scan passes. For example, the bins sig_coeff_flag, abs_level_gt1_flag/abs_level_gtX_flag(0) and par_level_flag are coded in a first scan pass; the abs_level_gt3_flag/abs_level_gtX_flag(1), abs_level_g5_flag/abs_level_gtX_flag(2), abs_level_g7_flag/abs_level_gtX_flag(3), abs_level_g9_flag/abs_level_gtX_flag(4) are coded in a second scan pass, and the coeff_sign_flag flags are coded in a third scan pass (in addition all bypass-coded abs_remainder syntax elements are coded in a separate pass). In another example, the sig_coeff_flag, coeff_sign_flag, sig_coeff_flag, abs_level_gt1_flag/abs_level_gtX_flag(0), and par_level_flag are coded in one scan pass and the abs_level_gt3_flag/abs_level_gtX_flag(1), abs_level_g5_flag/abs_level_gtX_flag(2), abs_level_g7_flag/abs_level_gtX_flag(3), abs_level_g9_flag/abs_level_gtX_flag(4) are coded in a second scan pass (again, all bypass-coded abs_remainder syntax elements are coded in a another pass). In another example, the sig_coeff_flag, abs_level_gt1_flag/abs_level_gtX_flag(0) and par_level_flag are coded in a first scan pass; every additional gtX flag abs_level_gt3_flag/abs_level_gtX_flag(1), abs_level_g5_flag/abs_level_gtX_flag(2), abs_level_g7_flag/abs_level_gtX_flag(3), abs_level_g9_flag/abs_level_gtX_flag(4) is coded in a separate scan pass, and the coeff_sign_flag flags are coded in another separate scan pass (again, all bypass-coded abs_remainder syntax elements are coded in a separate pass). (compare FIG. 19)

According to an embodiment, an apparatus 100 for decoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus 100 is configured to decode 120, for the predetermined transform block, a block of coefficients 122 from the data stream 14, in a sequence of passes which traverse the coefficients of the block of coefficients in a predetermined scan order, by, for a predetermined coefficient, context adaptively entropy decoding N greater-than-X flags indicative of whether an absolute of the predetermined coefficient is greater than X or not, by decoding, using a variable length code, a remainder indicative of an amount at which the absolute of the predetermined coefficient exceeds an absolute threshold which depends on N and by decoding a sign of the predetermined coefficient, wherein the apparatus is configured to differently distribute the decoding of the N greater-than-X flags, the remainder and the sign over the sequence of passes depending on the selected transformation being the identity transformation or being one of the at least one non-identity transformation (see, for example, FIG. 19). Additionally the apparatus 100 is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block.

9. Moreover, the scanning may be inverted relative to the regular mode so that the sample positions within a transform block are processed in a forward manner, instead of reversed order in the regular mode. The usage of the forward scanning is beneficial when combining the levels coding with Differential Pulse Code Modulation (DPCM) approaches such as Block DPCM or Residual DPCM where each sample is quantized and reconstructed independently.

In other words an apparatus 100 for decoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to decode, for the predetermined transform block, a block of coefficients from the data stream by if the selected transform is a non-identity transformation, decoding the coefficients of the block of coefficients from the data stream along a (possibly following this order several times in several passes) first scan order (e.g. a scan order 85 as shown in FIG. 13*b*) leading towards a DC coefficient of the non-identity transformation (e.g. from the highest frequency coefficient onwards, possibly starting from the "last" significant coefficient position). Furthermore the apparatus is configured to decode, for the predetermined transform block, a block of coefficients from the data stream by if the selected transform is the identity transformation, decoding the coefficients of the block of coefficients from the data stream along a second scan order (e.g. a scan order 85 as shown in FIG. 13*a*) leading from an upper left sample position to a lower right sample position. Additionally the apparatus 100 is configured to derive from the block of coefficients a residual sample array for the predetermined transform block so that the block of coefficients is related to the residual sample array according to the selected transformation (this step may include in case of the identity transformation adding to each coefficient the coefficients residing in the block on a predetermined side such as the left hand side in case of horizontal DPCM or to the top of the respective coefficient in case of vertical DPCM so as to perform DPCM reversal), and correct a prediction for the predetermined transform block using the residual sample array to reconstruct the predetermined transform block.

According to an embodiment, the apparatus 100 is configured to select the second scan order depending on DPCM direction using which the predetermined transform block is coded, e.g. horizontal raster scan in case of horizontal DPCM and vertical raster scan in case of vertical DPCM.

Coding of the Sign Syntax Element in TSM

For regular transformed residual signals, the expected value for the levels is mainly zero, i.e., the absolute levels are statistically distributed around the value equal to zero. Consequently, the sign values are transmitted in the bypass mode of an entropy coder using adaptive context models since the probability is equally distributed. In contrast to that observed for camera captured content, the levels in TSM tend to have the same bias for a given area, i.e., they are locally biased, whereas the expected value may be equal to the value zero similar to the case for camera captured content. As a consequence, the coding of the sign information using context models for an entropy coding engine employing adaptive context modelling is beneficial. The context model selection for the coding of sign values may be designed locally, e.g., using a local template evaluating the neighbouring spatial locations. This invention describes a further stage that can be combined with the existing context modelling of the sign values in TSM mode or modes where the transform characteristics are not suitable.

Forward-Adaptive Configuration

Figure 22:
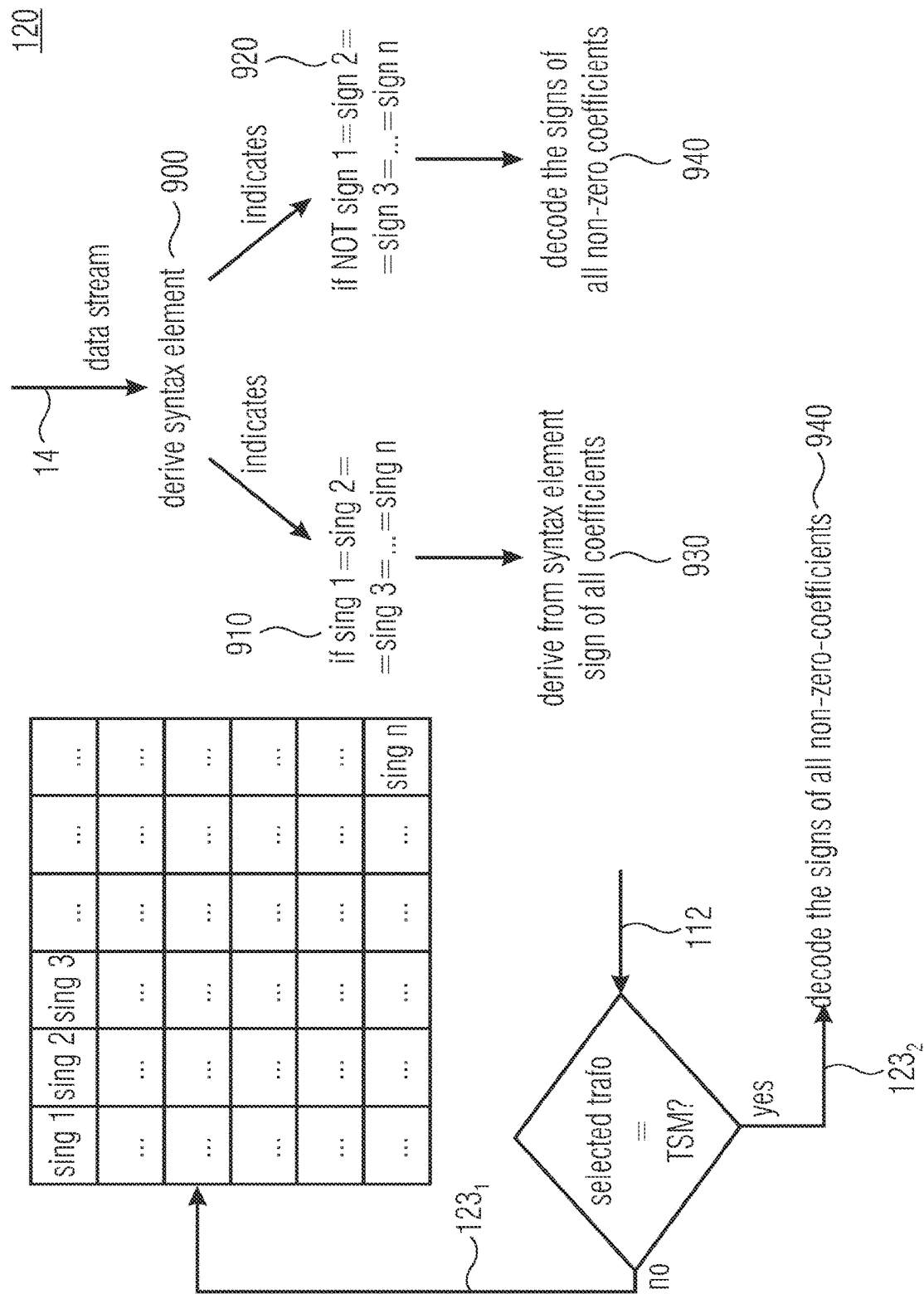
FIG. 22 shows a schematic view of an apparatus for decoding a picture, configured to decode signs of coefficients dependent on a sign probability tendency index if the selected transformation is a non-identity transformation, according to an embodiment of the invention.

When coding the sign values using context models, there exists a lower limit due to the practical design of the entropy coding engine, or, in other words, the minimum codeword length is limited due to the implementation of the entropy coding engine, whereas the theoretical minimum codeword length may be shorter. A solution is the transmission of additional syntax elements in the bitstream indicating whether all signs within an area have the same value. (compare FIG. 22) Several configurations are possible and may be combined depending on further data such as block size and/or operation point. A configuration of the area may be each sub-block, or each transform block, or a combination of both. In all three cases, the area may be fixed. Alternatively, the area configuration is adaptive, e.g., depending on the number of successive scanning positions within a transform block and the statistics that occurs within the adaptive area, and/or the preceding area relative to the current area in the same sub-block, transform block, and/or coding unit.

According to an embodiment an apparatus 100 for decoding a picture using predictive coding and block-based transform residual coding, is configured to select, for a predetermined transform block, a selected transformation 112 out of a predetermined list of transformations, the predetermined list of transformations comprising the identity transformation and at least one non-identity transformation. Furthermore the apparatus 100 is configured to decode 120, for the predetermined transform block, a block of coefficients from the data stream by if the selected transformation is one of the at least one non-identity transformation $123_1$, decoding 900 a syntax element from the data stream 14, deriving therefrom whether signs of non-zero coefficients within a predetermined group of non-zero coefficients are equal to each other 910 or not 920 and, if so 910, the signs of the non-zero coefficients within the predetermined group of non-zero coefficients 930 and, if the signs of the non-zero coefficients within the predetermined group of non-zero coefficients are not equal to each other 920, decoding 940 the signs of the non-zero coefficients within the predetermined group of non-zero coefficients by decoding sign bits on a per non-zero-coefficient basis. Furthermore the apparatus 100 is configured to decode, for the predetermined transform block, a block of coefficients from the data stream by if the selected transformation is the identity transformation $123_2$, decoding 940 the signs of the non-zero coefficients within the predetermined group of non-zero coefficients by decoding sign bits on a per non-zero-coefficient basis irrespective of the signs of the non-zero coefficients within the predetermined group of non-zero coefficients being equal to each other or not. Additionally the apparatus 100 is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. (see FIG. 22)

According to an embodiment, the apparatus 100 is configured to determine the predetermined group of non-zero coefficients as those non-zero coefficients within the block of coefficients which are located within a predetermined sub-block of the block of coefficients.

According to an embodiment, the apparatus 100 is configured to if the selected transformation is one of the at least one non-identity transformation, decode a further syntax element from the data stream, derive therefrom whether signs of non-zero coefficients within a further predetermined group of non-zero coefficients are equal to each other or not and, if so, the signs of the non-zero coefficients within the further predetermined group of non-zero coefficients and, if the signs of the non-zero coefficients within the further predetermined group of non-zero coefficients are not equal to each other, decoding the signs of the non-zero coefficients within the further predetermined group of non-zero coefficients by decoding further sign bits on a per non-zero-coefficient basis. Additionally the apparatus 100 is configured to group non-zero coefficients of the block of coefficients into a plurality of groups of non-zero coefficients including the group of non-zero coefficients and the further group of non-zero coefficients.

According to an embodiment, the apparatus 100 is configured to a subdivision of the block of coefficients into sub-blocks so that each group of non-zero coefficients comprises only non-zero coefficients located in one of the sub-blocks.

According to an embodiment, the apparatus 100 is configured to adapt the subdivision with respect to a size of a predetermined sub-block based on signs of one or more non-zero coefficients in one or more of the sub-blocks preceding the predetermined sub-block in a sub-block decoding order. Additionally or alternatively the apparatus 100 is configured to adapt the subdivision based on signs of previously decoded non-zero coefficients.

According to an embodiment, the apparatus 100 is configured to determine the predetermined group of non-zero coefficients so as to include all non-zero coefficients within the block of coefficients.

According to an embodiment, the apparatus 100 is configured to if the selected transformation is one of the at least one non-identity transformation, decoding a block-global syntax element from the data stream, deriving therefrom whether signs of all non-zero coefficients within the predetermined transform block are equal to each other or not and, if so, the signs of all non-zero coefficients within the predetermined transformation block and, if not the signs of all non-zero coefficients within the predetermined transformation block are equal to each other, performing the decoding the syntax element from the data stream.

Figure 23:
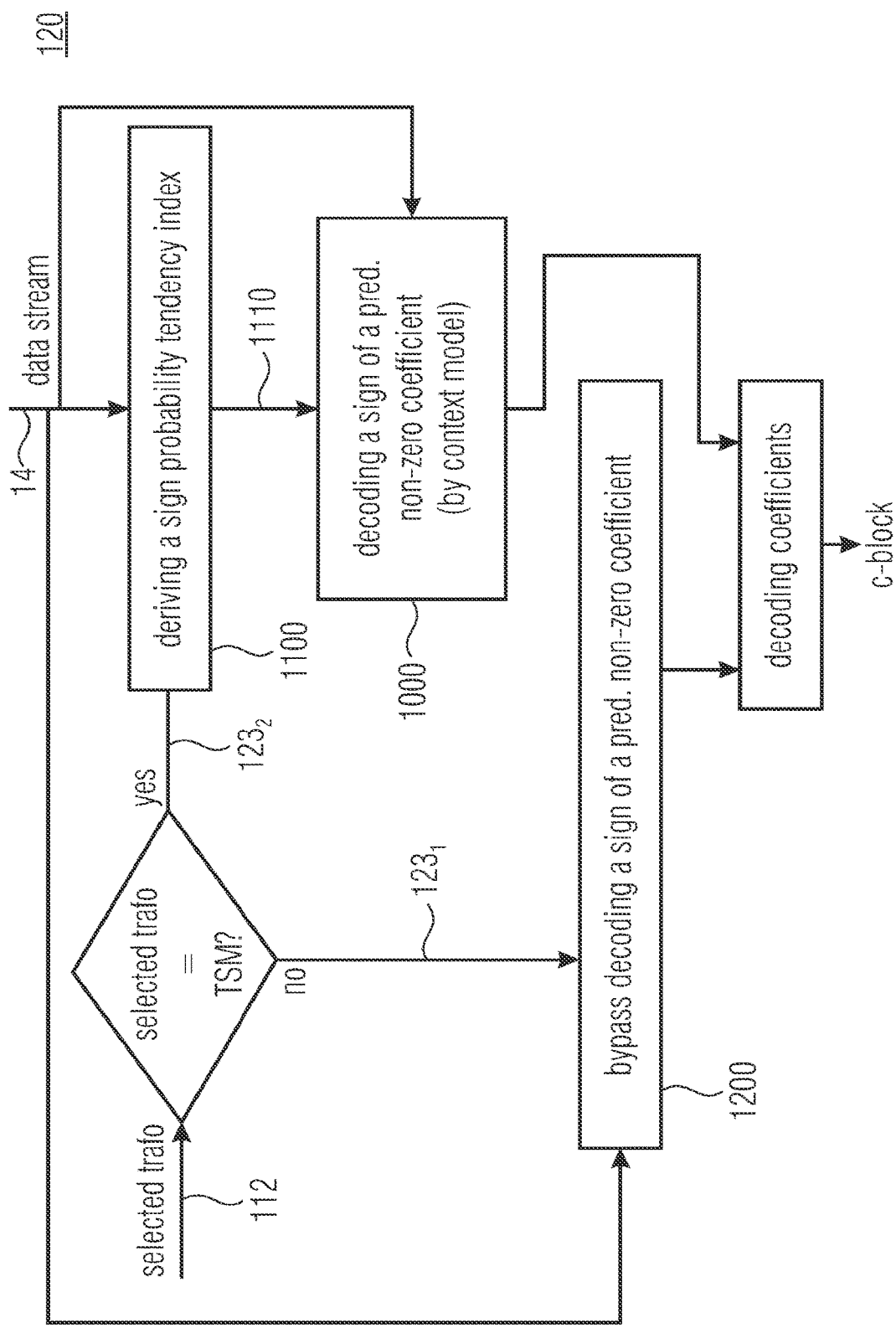
FIG. 23 shows a schematic view of an apparatus for decoding a picture, configured to decode signs of coefficients dependent on a syntax element if the selected transformation is an identity transformation, according to an embodiment of the invention.

The additional syntax elements introduce overhead for cases where the conditions are not met, i.e., when the sign information do not have the same value. Assuming that only one value of the set of sign values is different than the remaining values, the configuration using the additional syntax elements becomes inefficient. An alternative forward-adaptive signalling is the tendency index. When signalling the tendency index, the decoder uses a specific context model set depending on the tendency index that has been parsed from the bitstream (compare FIG. 23). The scale, i.e., the number of tendency indexes may be fixed or adaptive, and the scale may be signalled in the bitstream header such as slice header or sequence parameter set, and/or in the picture parameter set. An exemplary configuration may specify three tendency indexes with the first tendency index indicating a high probability for positive sign values, the second tendency index indicating a high probability for negative sign values, and the last tendency index indicating the uncertainty case. Again, the tendency index may be signalled for each sub-block, or each transform block, or a combination of both. In contrast to the syntax element indicating that all signs within an area have the same value, the tendency index may be signalled at an even higher level such as coding units, and/or slice header, and/or picture parameter set, and/or sequence parameter set.

According to an embodiment an apparatus 100 for decoding a picture using predictive coding and block-based transform residual coding, is configured to select, for a predetermined transform block, a selected transformation 112 out of a predetermined list of transformations, the selected transformation comprising the identity transformation and at least one non-identity transformation. Furthermore the apparatus 100 is configured to decode 120, for the predetermined transform block, a block of coefficients from the data stream 14 by decoding 1000 signs of non-zero coefficients of the predetermined block of coefficients by deriving 1100 a sign probability tendency index from the data stream 14 and entropy decoding the sign of a predetermined non-zero coefficient (such as the first in decoding order or one within a certain sub-block of the coefficient block to which the index applies) using a context model (a context model which defines a certain sign probability such as the probability to be positive) associated with the sign probability tendency index 1110 if the selected transformation 112 is the identity transformation $123_2$, and by bypass decoding 1200 (e.g. context adaptive entropy decoding with fixed equi-probability) the sign of the predetermined non-zero coefficient if the selected transformation is one of the at least one non-identity transformation $123_1$. Additionally the apparatus 100 is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. (see FIG. 23)

According to an embodiment, the apparatus 100 is configured to entropy decode the signs of all non-zero coefficients using the context model associated with the sign probability tendency index if the selected transformation is the identity transformation, and bypass decoding (e.g. context adaptive entropy decoding with fixed equi-probability) the signs of all predetermined non-zero coefficients if the selected transformation is one of the at least one non-identity transformation.

According to an embodiment, the apparatus 100 is configured to update a sign probability associated with the context model associated with the sign probability tendency index based on the sign of the predetermined non-zero coefficient if the selected transformation is the identity transformation.

According to an embodiment, a number of context models are associated with the sign probability tendency index and the apparatus is configured to entropy decode each of the signs of non-zero coefficients using a predetermined context model among the number of context models associated with the sign probability tendency index and select the predetermined context model among the number of context models associated with the sign probability tendency index depending on the sign of one or more neighboring non-zero coefficients (such as ones located at positions of a template located at and surrounding the respective sign) if the selected transformation is the identity transformation, and bypass decode (e.g. context adaptive entropy decoding with fixed equi-probability) the signs of all predetermined non-zero coefficients if the selected transformation is one of the at least one non-identity transformation.

According to an embodiment, the apparatus 100 is configured to select the predetermined context model among the number of context models associated with the sign probability tendency index depending on a frequency of a positive or negative sign among the one or more neighboring non-zero coefficients if the selected transformation is the identity transformation.

According to an embodiment, the sign probability tendency index is signaled in the data stream specifically for a sub-block of the coefficient block within which the predetermined non-zero coefficient is located, the predetermined transform block, a coding block containing the predetermined transform block, a picture slice containing the predetermined transform block the picture or a picture sequence containing the picture.

According to an embodiment, the apparatus 100 is configured to read, from the data stream, an information on which of different sets of context models with different cardinalities (three in case of the example given in the description) applies to the sign probability tendency index, wherein the sign probabilities associated with the context models are distributed more dense within a first set of context models than within a second set of context models having a cardinality lower than the cardinality of the first set of context models, and select the context model by using the sign probability tendency index as a pointer into the set of context models applying to the sign probability tendency index.

According to an embodiment, the sign probability tendency index is signaled in the data stream specifically for a picture slice containing the predetermined transform block, the picture or a picture sequence containing the picture.

Backward-Adaptive Configuration

Figure 24:
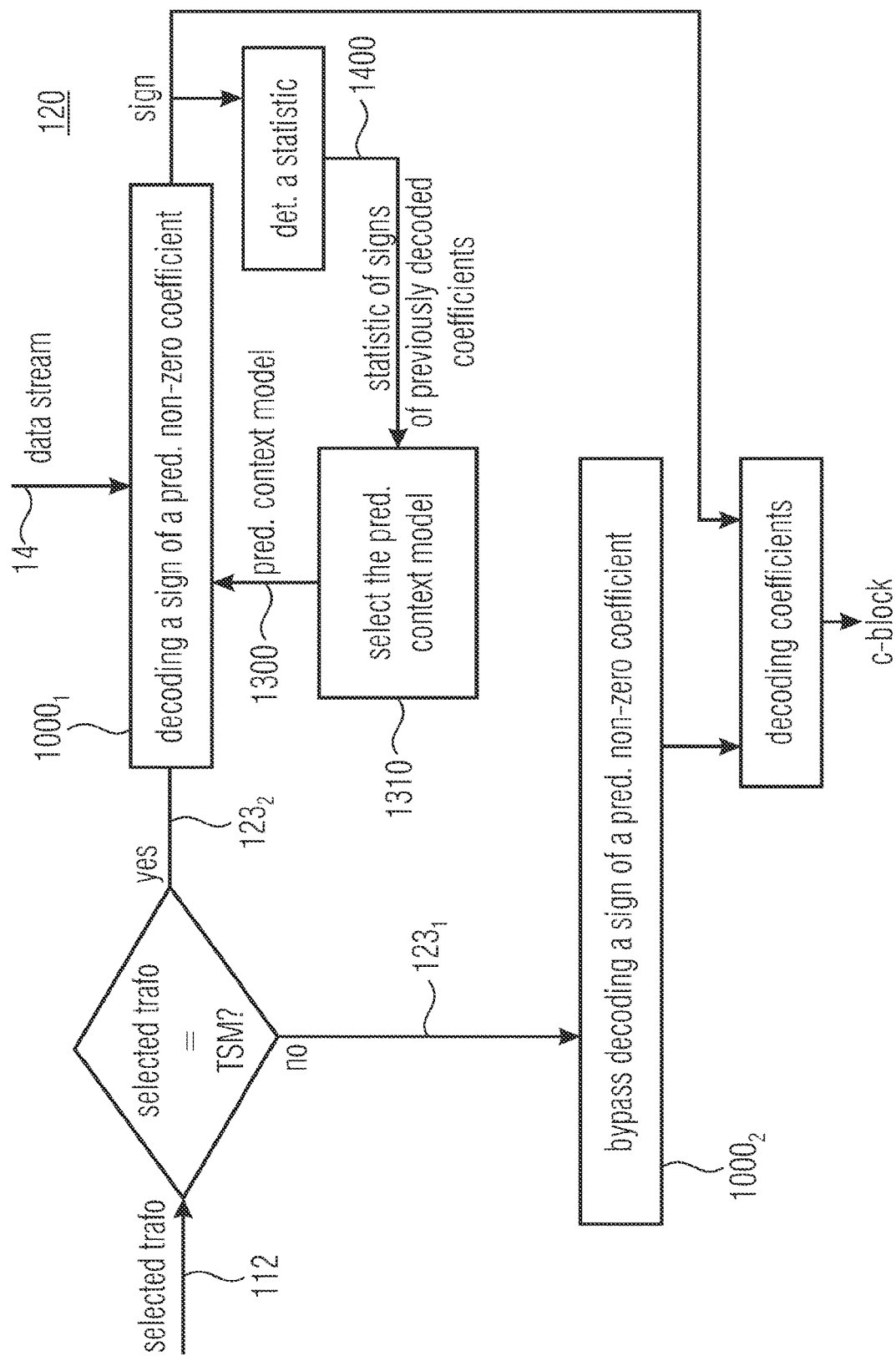
FIG. 24 shows a schematic view of an apparatus for decoding a picture, configured to decode signs of coefficients dependent on a statistic of signs of previously decoded coefficients if the selected transformation is an identity transformation, according to an embodiment of the invention.
Figure 25:
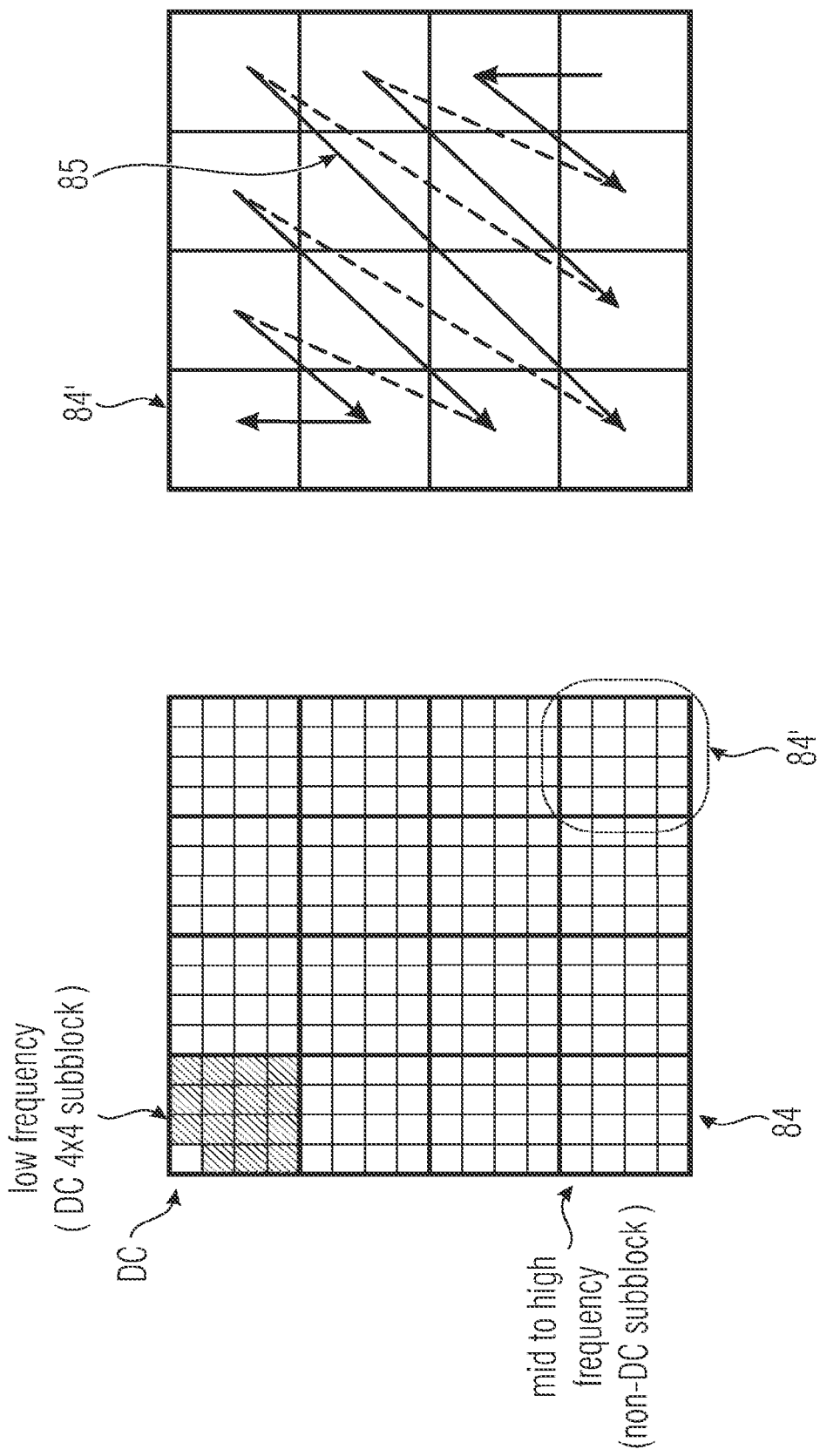
FIG. 25 shows a schematic view of a transform block and subblocks of the transform block.

In contrast to forward-adaptive configurations, the backward-adaptive approaches do not require additional syntax elements in the bitstream. Since the sign values in TSM are biased locally, the context modelling may consider the local statistics, e.g., the number of positive or negative sign values relative to the total number of sign syntax elements. (compare FIG. 24) Specifically, the relative number of the relation may be derived, and a different context model set may be selected when specific thresholds are met. Such a thresholds configuration may be symmetrical or asymmetrical. For example, a configuration may use three context model sets with the first context model set is suitable for cases with a high probability for a positive sign, the second context model set is suitable for cases with a high probability for the negative sign, and the final context model set stands for the uncertainty case. For a symmetrical configuration, the first or the second context model set is selected when the ratio is lower a value b0=x or higher a value b1=(1−x) with x being a ratio. For an asymmetrical configuration, the values b0 and b1 are not in relation via another variable as given for the symmetrical configuration. Furthermore, the number of threshold values b and their values may be fixed or adaptive. The specific configuration for that information may be signalled at the coding unit level, slice level and so on.

According to an embodiment, an apparatus 100 for decoding a picture using predictive coding and block-based transform residual coding, is configured to select, for a predetermined transform block, a selected transformation 112 out of a predetermined list of transformations, the predetermined list of transformations comprising the identity transformation and at least one non-identity transformation. Furthermore the apparatus 100 is configured to decode 120, for the predetermined transform block, a block of coefficients from the data stream 14 by decoding $1000_1$ signs of non-zero coefficients of the predetermined block of coefficients by decoding the sign of a predetermined non-zero coefficient using a predetermined context model 1300 among a plurality of context models and select 1310 the predetermined context model 1300 among the plurality of context models depending on a statistic 1400 of signs of previously decoded coefficients if the selected transformation is the identity transformation $123_2$. Furthermore the apparatus 100 is configured to decode 120, for the predetermined transform block, a block of coefficients from the data stream by decoding $1000_2$ signs of non-zero coefficients of the predetermined block of coefficients by bypass decoding (e.g. context adaptive entropy decoding with fixed equi-probability) the sign of the predetermined non-zero coefficient if the selected transformation is one of the at least one non-identity transformation $123_1$. Additionally the apparatus is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. (see FIG. 24)

According to an embodiment, the apparatus 100 is configured to select the predetermined context model depending on a relative frequency of positive or negative signs among non-zero coefficients within the previously decoded coefficients if the selected transformation is the identity transformation.

According to an embodiment, the apparatus 100 is configured to set the number context models of the plurality of context models to a default number.

According to an embodiment, the apparatus 100 is configured to derive the number context models of the plurality of context models from the data stream.

According to an embodiment, the apparatus 100 is configured to associate the context models with mutually adjoining and non-overlapping relative frequency intervals for a relative frequency of positive or negative signs and perform the selection so that among the relative frequency of positive or negative signs among non-zero coefficients of the previously decoded coefficients falls into the relative frequency interval associated with the predetermined context model.

According to an embodiment, the apparatus 100 is configured to determine the statistic over the signs of the previously decoded coefficients so that the previously decoded coefficients are spread over a picture or video portion larger than the predetermined transform block.

According to an embodiment, the apparatus 100 is configured to entropy decode the signs of all non-zero coefficients of the predetermined transform block using the predetermined context model if the selected transformation is the identity transformation.

According to an embodiment, the apparatus 100 is configured to entropy decode the signs of a subset of non-zero coefficients of the predetermined transform block located in a sub-block of the block of coefficients and including the non-zero predetermined coefficient using the predetermined context model, and update the statistic using the signs of a subset of non-zero coefficients of the predetermined transform block to obtain an updated statistic, select a further predetermined context model among the plurality of context models depending on the updated statistic and entropy decode the signs of a further subset of non-zero coefficients of the predetermined transform block located in a further sub-block of the block of coefficients using the further predetermined context model if the selected transformation is the identity transformation.

According to an embodiment, the apparatus 100 is configured to update a sign probability associated with the predetermined context model based on the sign of the predetermined non-zero coefficient if the selected transformation is the identity transformation.

According to an embodiment, the plurality of context models is sub-divided into sets of context models and the apparatus is configured to perform the selection by selecting a predetermined set of contexts models based on the statistic of signs of previously decoded coefficients, and by selecting the predetermined context model among the selected set of context models depending on the sign of one or more neighboring non-zero coefficients (such as ones located at positions of a template located at and surrounding the respective sign) if the selected transformation is the identity transformation.

Combination of Forward- and Backward-Adaptive Configurations

The combination of any forward- and backward-adaptive configuration described in this invention is possible since they do not overlap, i.e., there are no conflicts in the context model set selection rules. For example, the combination of the tendency index with the backward-adaptive approach would result in a configuration such that the initial context model set is derived using the tendency index and is updated depending on the backward-adaptive approach.

ADVANTAGEOUS EMBODIMENTS

In an advantageous embodiment of the invention, the limitation on the number of context coded bins is realized by switching to the bypass mode of the entropy coding engine while maintaining the existing binarization scheme.

In a further advantageous embodiment of the invention, the limitation on the number of context coded bins is realized by switching to the bypass mode of the entropy coding and setting the first binarization boundary equal to zero, i.e., the resulting binarization is a combination of Rice- and Exp-Golomb codes only.

In a further advantageous embodiment of the invention, the limitation on the number of context coded bins is realized by switching to the bypass mode of the entropy coding and using a dedicated binarization scheme, such as Rice codes only (compare FIG. 20).

In a further advantageous embodiment of the invention, when switching to the bypass mode, the parameter derivation that select a specific Rice code among all Rice codes, or Exp-Golomb code among all Exp-Golomb codes, is modified.

In a further advantageous embodiment of the invention, the limitation on the number of context coded bins is realized by switching to the bypass mode of the entropy coding while the significant information is still coded using context models. In this configuration, the switching point has to be determined by considering the remaining number of scanning positions as well.

In other words an apparatus 100 for decoding a picture using predictive coding and block-based transform residual coding, can be configured to select, for a predetermined transform block, a selected transformation out of a predetermined list of transformations, the selected transformation comprising the identity transformation and at least one non-identity transformation. Furthermore the apparatus 100 is configured to decode, for the predetermined transform block, a block of coefficients from the data stream by decoding, in a sequence of passes which traverse the coefficients of the block, one or more predetermined flags for each coefficient (e.g. parity flag and/or greater than X flag, sig flag; e.g. sig_flag 92, par_flag 96, gt1_flag 98 and/or gt2_flag 104 shown in FIG. 20) from the data stream using context adaptively binary entropy decoding, each predetermined flag reducing an absolute value domain 90 of the respective coefficient (e.g. parity bit 96 reduces the absolute value domain 90 to one half by excluding every even or uneven absolute value, and greater than X flags, e.g. gt1_flag 98 and gt2_flag 104, reduce the domain of possible absolute values by either excluding one of the possible absolute values or leaving only this one of the possible absolute values and excluding all others) within which an absolute value of the respective coefficient is positioned (e.g. the absolute value domain starts at the beginning of the one or more passes, for instance, from a general absolute value domain of the coefficients 0 . . . $2^{X-1}$ in case of X bit representation). Furthermore the apparatus 100 is configured to decode, for the predetermined transform block, a block of coefficients from the data stream by decoding, in a sequence of passes which traverse the coefficients of the block, for each coefficient for which a cardinality of the absolute value domain 90 is not reduced down to one by the one or more predetermined flags decoded for the respective coefficient, a variable length code codeword (e.g. Rice/Exp-Golomb code) _for identifying the absolute value of the respective coefficient out of the absolute value domain of the respective coefficient (e.g. the code length of the variable length code may monotonically increase with increasing absolute value; here the codeword is free to refer only to the reduced absolute value domain or the general one or some other being inevitably a proper superset of the reduced absolute value domain). Additionally the apparatus 100 is configured to derive from the block of coefficients a residual sample array for the predetermined transform block so that the block of coefficients is related to the residual sample array according to the selected transformation, and correct a prediction for the predetermined transform block using the residual sample array to reconstruct the predetermined transform block. The apparatus is configured to, in decoding, in the sequence of passes, the one or more predetermined flags, cease the decoding the one or more predetermined flags as soon as a predetermined number of predetermined flags has been reached (i.e. the overall number of predetermined flags having been decoded so far for all coefficients reaches a limit) so that the cardinality of the absolute value domain is smaller for a first set of non-zero coefficients compared a second set of non-zero coefficients (namely smaller for coefficients preceding the reaching of the limit within the last pass than compared to coefficients following the reaching of the limit), except with respect to a significance flag among the one or more predetermined flags (which are, thus, decoded using context adaptively binary entropy decoding inevitably), which indicates whether the coefficient for which it is decoded is zero or not, wherein the predetermined number corresponds to an upper limit minus a number of coefficients for which the significance flag has not yet been decoded. (compare with FIG. 20)

Figure 21:
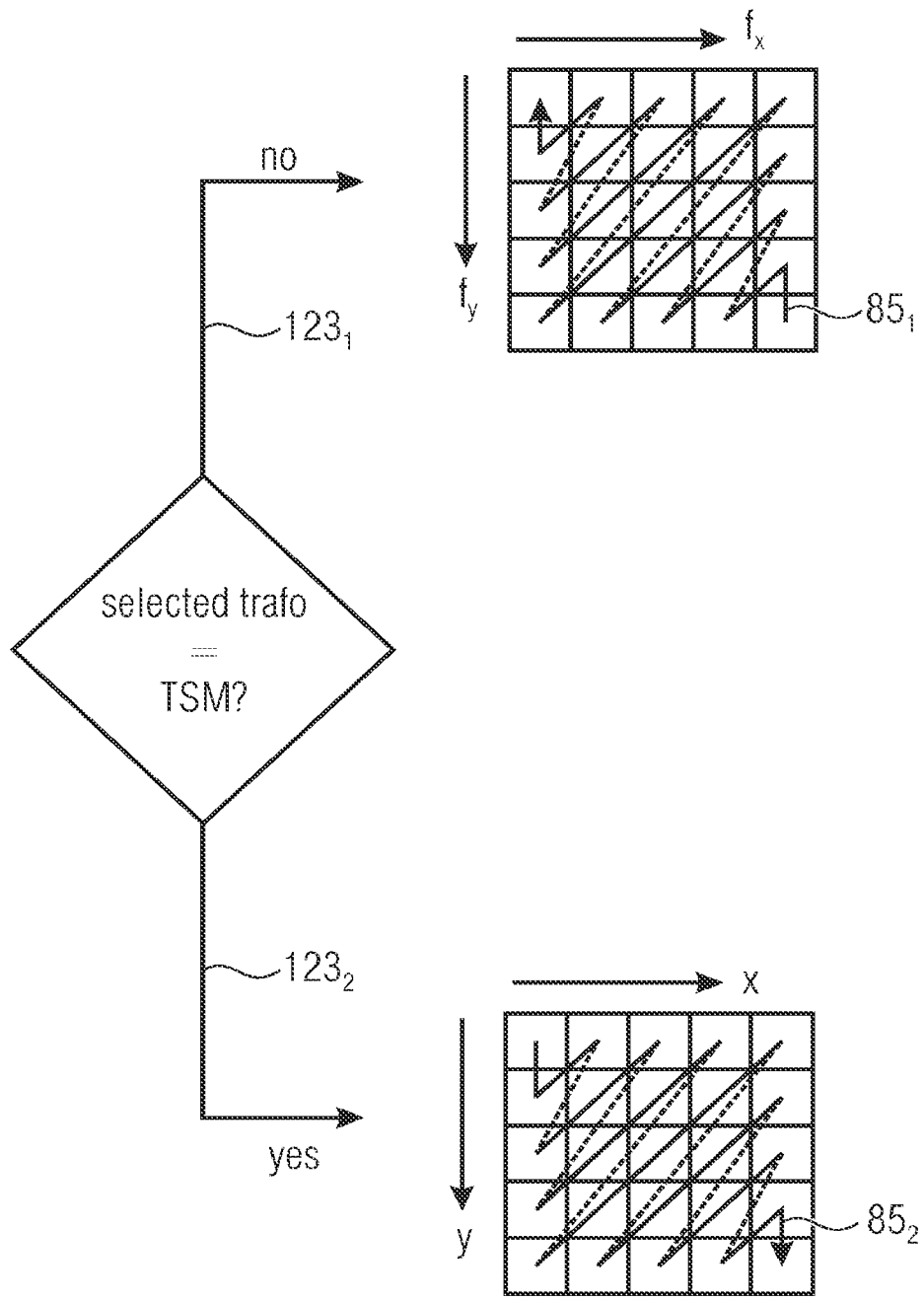
FIG. 21 shows a schematic view of an apparatus for decoding a picture configured to decode a block of coefficients with a scanning order dependent on the selected transformation, according to an embodiment of the invention.

In an advantageous embodiment of the invention, the processing order of the levels coding for TSM is forward, i.e., the scanning starts with the DC frequency position and ends with the highest AC frequency position (compare FIG. 21).

In other words an apparatus 100 for decoding a picture using predictive coding and block-based transform residual coding, is configured to select, for a predetermined transform block, a selected transformation out of a predetermined list of transformations, the selected transformation comprising the identity transformation and at least one non-identity transformation. The apparatus is configured to decode 120, for the predetermined transform block, a block of coefficients from the data stream by if the selected transform is a non-identity transformation $123_1$, decoding the coefficients of the block of coefficients from the data stream along a (possibly following this order several times in several passes) first scan order $85_1$ leading towards a DC coefficient of the non-identity transformation (e.g. from the highest frequency coefficient onwards, possibly starting from the "last" significant coefficient position). The apparatus is configured to decode 120, for the predetermined transform block, a block of coefficients from the data stream by if the selected transform is the identity transformation $123_2$, decoding the coefficients of the block of coefficients from the data stream along a second scan order $85_2$ leading from an upper left sample position to a lower right sample position. This scan order decision is illustrated in FIG. 21.

Furthermore the apparatus is configured to derive from the block of coefficients a residual sample array for the predetermined transform block so that the block of coefficients is related to the residual sample array according to the selected transformation (this step may include in case of the identity transformation adding to each coefficient the coefficients residing in the block on a predetermined side such as the left hand side in case of horizontal DPCM or to the top of the respective coefficient in case of vertical DPCM so as to perform DPCM reversal) and correct a prediction for the predetermined transform block using the residual sample array to reconstruct the predetermined transform block.

In a further advantageous embodiment of the invention, the scanning pattern may be horizontal or vertical and is coupled to the used prediction mode, such as BDPCM and/or RBDPCM (compare FIG. 21).

In other words the apparatus 100 is configured to select the second scan order $85_2$ depending on DPCM direction using which the predetermined transform block is coded, e.g. horizontal raster scan in case of horizontal DPCM and vertical raster scan in case of vertical DPCM.

In an advantageous embodiment of the invention, all context coded bins are coded in a single loop rather than separated loops, and the final level information coded in the bypass mode form another processing loop.

In a further advantageous embodiment of the invention, each level is coded completely before processing the next scanning position.

In an advantageous embodiment of the invention, the number of positive or negative value is tracked together with the total number of sign values. When a symmetrical threshold of x is exceeded, a different context model set is used, resulting in three context model sets.

The level for the statistics is a transform block.

In a further advantageous embodiment of the invention, the level for the statistics is a sub-block.

In a further advantageous embodiment of the invention, the level for the statistics is a slice.

In a further advantageous embodiment of the invention, the threshold x is fixed.

In a further advantageous embodiment of the invention, the threshold x is variable.

In a further advantageous embodiment of the invention, the context modelling for the index within the context model set is fixed and is equal to one.

In an advantageous embodiment of the invention, the number of context model sets is also equal to three and the thresholds are asymmetrical.

In an advantageous embodiment of the invention, the thresholds are transmitted in within the header such as slice header or picture parameter set within the bitstream.

In an advantageous embodiment of the invention, the coding of the sign syntax element is decoupled from the coding of the absolute levels.

In an advantageous embodiment of the invention, a syntax element is transmitted in the bitstream indicating whether the sign values are the same for a specific area.

In a further advantageous embodiment of the invention, a syntax element is transmitted in the bitstream indicating whether the sign values are the same for a specific area with the area is defined as being a transform block.

In a further advantageous embodiment of the invention, a syntax element is transmitted in the bitstream indicating whether the sign values are the same for a specific area with the area is defined as being a sub-block.

In a further advantageous embodiment of the invention, a syntax element is transmitted in the bitstream indicating whether the sign values are the same for a specific area with the area is defined as being a coding unit.

In a further advantageous embodiment of the invention, the context modelling for the additional syntax element is derived by evaluating neighboring sub blocks when the area is defined as sub blocks.

In a further advantageous embodiment of the invention, the context modelling for the additional syntax element is derived by evaluating neighboring transform blocks when the area is defined as transform blocks.

Table 5 illustrates a syntax table for one embodiment of level coding for a transform skip modes with numGtX-Flags–1 additional "greater than X" flags.

TABLE 5

Example residual coding syntax for transform skip

| residual_coding_trafoskip(x0, y0, log2TbWidth, log2TbHeight, cIdx) { | Descriptor |
|---|---|
|   log2SbSize = (Min(log2TbWidth, log2TbHeight) <2 ? 1 : 2) | |
|   numSbCoeff = 1 << (log2SbSize << 1) | |
|   lastSubBlock = (1 << (log2TbWidth + log2TbHeight − 2 * log2SbSize)) − 1 | |
| /* Loop over subblocks from last to the top-left (DC) subblock */ | |
|   numSigCoeff = 0 | |
|   QState = 0 | |
|   inferDcSbCbf = 1 | |
|   for(i = lastSubBlock; i >= 0; i− −) { | |
|     startQStateSb = QState | |
|     xS = DiagScanOrder(log2TbWidth − log2SbSize)(log2TbHeight − log2SbSize)(lastSubBlock)(0 } | |
|     yS = DiagScanOrder(log2TbWidth − log2SbSize)(log2TbHeight − log2SbSize)(lastSubBlock)(1 | |
|     if((i > 0 \|\| !inferDcSbCbf) | |
|       coded_sub_block_flag(xS)(yS) | ae(v) |
|     if(coded_sub_block_flag(xS)(yS) && i > 0) | |
|       inferDcSbCbf = 0 | |
|     } | |
| /* First scan pass */ | |
|     inferSbDcSigCoeffFlag = 1 | |
|     for(n = (i = = numSbCoeff − 1; n >= 0; n− −) { | |
|       xC = (xS << log2SbSize) + DiagScanOrder(log2SbSize)(log2SbSize)(n)(0) | |
|       yC = (yS << log2SbSize) + DiagScanOrder(log2SbSize)(log2SbSize)(n)(1) | |
|       if(coded_sub_block_flag(xS)(yS) && (n > 0 \|\| !inferSbDcSigCoeffFlag)) { | |

TABLE 5-continued

Example residual coding syntax for transform skip

| residual_coding_trafoskip(x0, y0, log2TbWidth, log2TbHeight, cldx) { | Descriptor |
|---|---|
|     sig_coeff_flag(xC)(yC) | ae(v) |
|     if(sig_coeff_flag(xC)(yC)) | |
|       inferSbDcSigCoeffFlag = 0 | |
|     } | |
|     if(sig_coeff_flag(xC)(yC)) { | |
|       abs_level_gtX_flag(n)(0) | ae(v) |
|       if(abs_level_gtX_flag(n)(0)) | |
|         par_level_flag(n) | ae(v) |
|     } | |
|     AbsLevelPassX(xC)(yC) = | |
|       sig_coeff_flag(xC)(yC) + par_level_flag(n) + abs_level_gtX_flag(n)(0) | |
|     if(dep_quant_enabled_flag) | |
|       QState = QStateTransTable(QState)(AbsLevelPass1(xC)(yC) & 1) | |
|   } | |
|   /* Greater than X scan passes */ | |
|   for(i = 1; i <= numGtXFlags - 1 && abs_level_gtX_flag(n)(i - 1) ; i++) { | |
|     for(n = numSbCoeff - 1; n >= 0; n- -) { | |
|       xC = (xS << log2SbSize) + DiagScanOrder(log2SbSize)(log2SbSize)(n)(0) | |
|       yC = (yS << log2SbSize) + DiagScanOrder(log2SbSize)(log2SbSize)(n)(1) | |
|       abs_level_gtX_flag(n)(i) | ae(v) |
|       AbsLevelPassX(xC)(yC) + = 2 * abs_level_gtX_flag(n)(i) | |
|     } | |
|   } | |
|   /* remainder scan pass */ | |
|   for(n = numSbCoeff - 1; n >= 0; n- -) { | |
|     xC = (xS << log2SbSize) + DiagScanOrder(log2SbSize)(log2SbSize)(n)(0) | |
|     yC = (yS << log2SbSize) + DiagScanOrder(log2SbSize)(log2SbSize)(n)(1) | |
|     if(abs_level_gtX_flag(n)(numGtXFlags - 1)) | |
|       abs_remainder(n) | ae(v) |
|     AbsLevel(xC)(yC) = AbsLevelPassX(xC)(yC) + abs_remainder(n) | |
|   } | |
|   /* sign scan pass */ | |
|   for(n = numSbCoeff - 1; n >= 0; n- -) { | |
|     xC = (xS << log2SbSize) + DiagScanOrder(log2SbSize)(log2SbSize)(n)(0) | |
|     yC = (yS << log2SbSize) + DiagScanOrder(log2SbSize)(log2SbSize)(n)(1) | |
|     if(sig_coeff_flag(xC)(yC) && (n != firstSigScanPosSb)) | |
|       coeff_sign_flag(n) | ae(v) |
|   } | |
|   if(dep_quant_enabled_flag) { | |
|     QState = startQStateSb | |
|     for(n = numSbCoeff - 1; n >= 0; n- -) { | |
|       xC = (xS << log2SbSize) + DiagScanOrder(log2SbSize)(log2SbSize)(n)(0) | |
|       yC = (yS << log2SbSize) + DiagScanOrder(log2SbSize)(log2SbSize)(n)(1) | |
|       if(sig_coeff_flag(xC)(yC)) | |
|         TransCoeffLevel(x0)(y0)(cldx)(xC)(yC) = | |
|           (2 * AbsLevel(xC)(yC) - (QState > 1 ? 1 : 0)) * | |
|           (1 - 2 * coeff_sign_flag(n)) | |
|       QState = QStateTransTable(QState)(par_level_flag(n)) | |
|     } | |
|   } else { | |
|     sumAbsLevel = 0 | |
|     for(n = numSbCoeff - 1; n >= 0; n- -) { | |
|       xC = (xS << log2SbSize) + DiagScanOrder(log2SbSize)(log2SbSize)(n)(0) | |
|       yC = (yS << log2SbSize) + DiagScanOrder(log2SbSize)(log2SbSize)(n)(1) | |
|       if(sig_coeff_flag(xC)(yC)) { | |
|         TransCoeffLevel(x0)(y0)(cldx)(xC)(yC) = | |
|           AbsLevel(xC)(yC) * (1 - 2 * coeff_sign_flag(n)) | |
|       } | |
|     } | |
|   } | |
|   } | |
|   } | |
| } | |

The following apparatuses for encoding can comprise similar or equivalent features as the above described apparatuses for decoding.

According to an embodiment, an apparatus for encoding a picture using predictive coding and block-based transform residual coding, is configured to subdivide the picture into transform bocks of different sizes Furthermore the apparatus is configured to select, for a predetermined transform block, a selected transformation by checking whether a size of the predetermined transform block exceeds a predetermined threshold size. If the size of the predetermined transform block exceeds the predetermined threshold size, the apparatus is configured to use for the selection of the selected transformation a default way for selecting the selected transformation. If the size of the predetermined transform block does not exceed the predetermined threshold size, the apparatus is configured to choose for the selection of the selected transformation a transformation out of a predetermined list of transformations and transmit in the data stream an index which points to the chosen transform out of the predetermined list of transformations so as to be used for the predetermined transform block as the selected transformation, the predetermined list of transformations comprising an identity transformation and non-identity transformations. Additionally the apparatus is configured to predict the predetermined transform block and encode, for the predetermined transform block, a block of coefficients into the data stream, so that if the selected transformation is the identity transformation, the block of coefficients is to be used as residual sample array for correcting the prediction to reconstruct the predetermined transform block, and so that if the selected transformation is not the identity transformation, the block of coefficients is to be subject to an inverse transformation corresponding to the selected transformation to obtain the residual sample array for the predetermined transform block.

According to an embodiment, the apparatus is configured to if the size of the predetermined transform block exceeds the predetermined threshold size, use a default non-identity transformation for the selected transformation.

According to an embodiment, the default non-identity transformation is contained in the predetermined list of transformations.

According to an embodiment, the apparatus is configured to derive the predetermined threshold size from the data stream.

According to an embodiment, the apparatus is configured to encode the index into a current position in the data stream for the predetermined transform block if the size of the predetermined transform block does not exceed the predetermined threshold size, and encode into the current position of the data stream a syntax element other than the index (E.g. instead of the index another element is read, but not in the sense of skipping and not reading, but in that the data stream really does not contain the index although up to that position in the data stream the syntax might be the same), if the size of the predetermined transform block exceeds the predetermined threshold size.

According to an embodiment, the apparatus is configured to encode the index into the data stream for a coding block of the picture which is partitioned into a plurality of transform bocks including the predetermined transform block. (Note that possibly, the unified MTS syntax might be signaled a disjoint set of CUs at a higher level), i.e. the index might be valid for a set of coding blocks.

According to an embodiment, the transform blocks are luma transform blocks and the apparatus is configured to use a fixed default transformation for chroma transform blocks.

According to an embodiment, the apparatus is configured to apply the selected transformation to luma and chroma components of the picture within the predetermined transform block.

According to an embodiment, the apparatus is configured to encode the index into the data stream for the predetermined transform block per component of luma and chroma components of the picture.

According to an embodiment, the apparatus is configured to signal in the data stream whether the transform blocks are luma transform blocks and a fixed default transformation is to be used for chroma transform blocks, the selected transformation is to be applied to luma and chroma components of the picture within the predetermined transform block, or whether the index from the data stream is to be encoded for the predetermined transform block per component of luma and chroma components of the picture.

According to an embodiment, the apparatus is configured to in encoding, for the predetermined transform block, a block of coefficients into the data stream depending on whether the selected transformation for the predetermined block is contained in a predefined set of one or more transformations. Furthermore the apparatus is configured to, in encoding, for the predetermined transform block, a block of coefficients into the data stream, encode a coded block flag into the data stream signaling whether the block of coefficients has at least one non-zero coefficient, if the selected transformation for the predetermined block is contained in the predefined set of one or more transformations, and the apparatus is configured to, in encoding, for the predetermined transform block, a block of coefficients, into the data stream infer that the block of coefficients has at least one non-zero coefficient, if the selected transformation for the predetermined block is not contained in the predefined set of one or more transformations (in other words, then not encoding the CBF into the data stream, or in even other words, encode a syntax element different from a current portion of the data stream into which the CBF is encoded if the selected transformation for the predetermined block is contained in the predefined set of one or more transformations).

According to an embodiment, the predefined set of one or more transformations comprises the identity transformation and a default non-identity transformation selected, by default, according to the default way for selecting the selected transformation.

According to an embodiment, an apparatus for encoding a picture using predictive coding and block-based transform residual coding, is configured to select, for a predetermined transform block, a selected transformation out of a predetermined list of transformations onto and encoding an index into the data stream for the predetermined transform block, which points in the predetermined list of transformations onto the selected transformation. Furthermore the apparatus is configured to predict the predetermined transform block and encode, for the predetermined transform block, a block of coefficients into the data stream, so that from the block of coefficients a residual sample array for the predetermined transform block is derivable so that the block of coefficients is related to the residual sample array according to the selected transformation, and so that the prediction for the predetermined transform block is correctable using the residual sample array to reconstruct the predetermined transform block. The apparatus is configured to, in encoding, for the predetermined transform block, the block of coefficients into the data stream depending on whether the selected transformation for the predetermined block is contained in a predefined set of one or more transformations, encode a coded block flag into the data stream signaling whether the block of coefficients has at least one non-zero coefficient, if the selected transformation for the predetermined block is contained in the predefined set of one or more transformations. Additionally the apparatus is configured to, in encoding, for the predetermined transform block, the block of coefficients into the data stream depending on whether the selected transformation for the predetermined block is contained in a predefined set of one or more transformations, refrain from encoding the coded block flag into the data stream with the coded block flag having to be inferred at encoder side as signaling that the block of coefficients has at least one non-zero coefficient, if the selected transformation for the predetermined block is not contained in the predefined set of one or more transformations (in other words, then not encoding the CBF into the data stream, or in even other words, encode a syntax element different from a current portion of the data stream into which the CBF is encoded if the selected transformation for the predetermined block is contained in the predefined set of one or more transformations).

According to an embodiment the predefined set of one or more transformations comprises the identity transformation.

According to an embodiment, the apparatus is configured to populate, or populate and sort, the predetermined list of transformations depending on the data stream, and encode the index into the data stream using a variable length code, so that each transformation in the predetermined list of transformations has assigned one codeword of the variable length code and a code word length of the codewords of the variable length code monotonically increases with a rank of the transformation in the predetermined list of transformations to which the codewords are assigned.

According to an embodiment, an apparatus for encoding a picture using predictive coding and block-based transform residual coding, is configured to predict a predetermined transform block and encode, for the predetermined transform block, a block of coefficients into the data stream, including encoding a coded block flag into the data stream signaling whether the block of coefficients has at least one non-zero coefficient. The apparatus is configured to, if the coded block flag signals that the block of coefficients has at least one non-zero coefficient, select, for a predetermined transform block, a selected transformation out of a predetermined list of transformations and encoding an index into the data stream for the predetermined transform block which points in the predetermined list of transformations onto the selected transformation. From the block of coefficients a residual sample array for the predetermined transform block is derivable so that the block of coefficients is related to the residual sample array according to the selected transformation, and so that the prediction for the predetermined transform block is correctable using the residual sample array to reconstruct the predetermined transform block. The apparatus is configured to, if the coded block flag signals that the block of coefficients does not have at least one non-zero coefficient, reconstruct the predetermined transform block without prediction correction (in other words, then not encoding the index into the data stream, such as by encoding a syntax element different from the index from a current portion of the data stream into which the index is encoded if the coded block flag signals that the block of coefficients does not have at least one non-zero coefficient).

According to an embodiment an apparatus for encoding a picture using predictive coding and block-based transform residual coding, is configured to populate, or populate and sort, a predetermined list of transformations depending on the data stream, and select, for a predetermined transform block, a selected transformation out of the predetermined list of transformations. Furthermore the apparatus is configured to encode an index into the data stream which points onto the selected transformation in the predetermined list of transformations using a variable length code, so that each transformation in the predetermined list of transformations has assigned one codeword of the variable length code and a code word length of the codewords of the variable length code monotonically increases with a rank of the transformation in the predetermined list of transformations to which the codewords are assigned. Additionally the apparatus is configured to derive a prediction for the predetermined transform block and encode, for the predetermined transform block, a block of coefficients into the data stream, so that from the block of coefficients a residual sample array for the predetermined transform block is derivable so that the block of coefficients is related to the residual sample array according to the selected transformation, and so that the predetermined transform block is reconstructible by prediction for the predetermined transform block is correctable using the residual sample array to reconstruct the predetermined transform block.

According to an embodiment, the apparatus is configured to sort the predetermined list of transformations depending on a syntax element in the data stream, which is at least valid for the picture globally.

According to an embodiment, the apparatus is configured to sort the predetermined list of transformations depending on an evaluation of sample statistics in a spatial neighborhood of the predetermined transform block.

According to an embodiment, the apparatus is configured to sort the predetermined list of transformations depending on syntax elements signaled in the data stream for blocks in a spatial neighborhood of the predetermined transform block.

According to an embodiment, the apparatus is configured to sort the predetermined list of transformations so that there exist at least one state of the data stream so that the sorting the predetermined list of transformations arranged the identity transformation at a leading rank having a shortest codeword of the variable length code assigned thereto.

According to an embodiment, the apparatus is configured to encode an index into the data stream using a composed variable length code codewords of which are composed of a first codeword of a variable length code followed by, if the first codeword is a longest codeword of the variable length code, a second codeword of a fixed length code. The codewords of the composed variable length code merely composed of one of two non-longest codewords of the variable length code are assigned to, and discriminate, the identity transformation and a predefined non-identity transformation and further codewords of the composed variable length code are assigned to, and discriminate, further non-identity transformations of the predetermined list of transformations.

According to an embodiment, an apparatus for encoding a picture using predictive coding and block-based transform residual coding, is configured to derive a prediction for a predetermined transform block. Furthermore the apparatus is configured to select, for a predetermined transform block, a selected transformation from a predetermined list of transformations and encoding an index into a predetermined list of transformations into the data stream which points onto the selected transformation using a composed variable length code codewords of which are composed of a first codeword of a variable length code followed by, if the first codeword is a longest codeword of the variable length code, a second codeword of a fixed length code. The codewords of the composed variable length code merely composed of one of two non-longest codewords of the variable length code are assigned to, and discriminate, an identity transformation and a predefined non-identity transformation contained in the predetermined list of transformations and further codewords of the composed variable length code are assigned to, and discriminate, further non-identity transformations of the predetermined list of transformations. Additionally the apparatus is configured to encode, for the predetermined transform block, a block of coefficients into the data stream, so that the block of coefficients is related to the residual sample array according to the selected transformation, and so that the predetermined transform block is reconstructible by correcting the prediction of the predetermined transform block using the residual sample array.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to derive a prediction for the predetermined transform block and encode, for the predetermined transform block, a block of coefficients into the data stream by checking whether the selected transform is a non-identity transformation. If the selected transform is a non-identity transformation, the apparatus is configured to encode a position information into the data stream on where along a scanning order which traverses all coefficients of the block of coefficients, a non-zero coefficient is encountered first or where along a scanning order which traverses all coefficients of the block of coefficients, a non-zero coefficient is encountered last, so as to obtain predetermined coefficient position to encode, for the predetermined transform block, a block of coefficients into the data stream (Note the following. In the above embodiments, this position is called last position measured along a scan order leading from upper left corner to bottom right, although the actual scanning started coding started there according to these embodiments. That is the actual coding took place in a reverse scan order leading from bottom-right to top-left corner. Here, the scanning order is the coding order. See the next embodiment where both scanning directions are anticipated) and encoding first coefficients of the block of coefficients into the data stream, which include all non-zero coefficients of the block of coefficients and are traversed by the scanning order starting from or up to the predetermined coefficient position, and inferring second coefficients of the block of coefficients, different from the first coefficients, to be zero, to encode, for the predetermined transform block, a block of coefficients into the data stream. If the selected transform is the identity transformation, the apparatus is configured to encode all coefficients of the block of coefficients into the data stream to encode, for the predetermined transform block, a block of coefficients into the data stream. The block of coefficients is related to the residual sample array according to the selected transformation and the predetermined transform block is reconstructable by correcting the prediction thereof using the residual sample array.

According to an embodiment the apparatus is configured to in the encoding of the first coefficients of the block of coefficients into the data stream, use the scanning order and start the encoding of the first coefficients at the predetermined coefficient position, so that the first coefficient are traversed by the scanning order starting from the predetermined coefficient position, or use the scanning order and finish the encoding of the first coefficients at the predetermined coefficient position, so that the first coefficient are traversed by the scanning order up to the predetermined coefficient position. The apparatus is configured to in the encoding of all coefficients of the block of coefficients into the data stream, sequentially encode all coefficients starting or finishing at a coefficient of the block of coefficients which is traversed last by the scanning order.

According to an embodiment the apparatus is configured to in the encoding of all coefficients of the block of coefficients into the data stream, use the scanning order and finish the encoding of all coefficients at a coefficient of the block of coefficients traversed last by the scanning order or use the inverse scanning order and start the encoding of all coefficients at the coefficient of the block of coefficients traversed last by the scanning order. (Note, that here the scanning order is defined to define the coding order in case of non-identity transformation)

According to an embodiment the apparatus is configured to encode the position information by encoding coordinates of the predetermined coefficient position into the data steam, or by encoding a rank of the predetermined coefficient position within the scanning order into the data stream.

According to an embodiment the apparatus is configured to perform the encoding of the first coefficients of the block of coefficients, in sub-blocks into which the block of coefficients is partitioned, so that the scanning order traverses all first coefficients within one sub-block before traversing first coefficients within a different sub-block wherein first coefficients within sub-blocks for which a sub-block flag (Note that "coded sub-block flag" has been used in above embodiments) in the data stream signals zeroness, are inferred to be zero, and first coefficients within sub-blocks for which a sub-block flag in the data stream signals non-zeroness are encoded into the data stream, with encoding the sub-block flags into the data stream except at least one of a first sub-block flag relating to a sub-block comprising the predetermined coefficient position, and a second sub-block flag relating to a sub-block comprising a first coefficient of the block of coefficients between which and the predetermined coefficient position the first coefficients are located, wherein the at least one of the first and second predetermined sub-block flags are to be inferred to signal non-zeroness. The apparatus is configured to perform the encoding of all coefficients of the block of coefficients into the data stream in the sub-blocks into which the block of coefficients is partitioned, so that the scanning order traverses all coefficients within one sub-block before traversing first coefficients within a different sub-block wherein coefficients within sub-blocks for which a sub-block flag in the data stream signals zeroness, are inferred to be zero, and coefficients within sub-blocks for which a sub-block flag in the data stream signals non-zeroness are encoded into the data stream, with encoding the sub-block flags into the data stream for all sub-blocks.

According to an embodiment the apparatus is configured to in the encoding of the sub-block flags into the data stream for all sub-blocks, encode the sub-block flags into the data stream for all sub-blocks sequentially in a sub-block order, and not encode the sub-block flag being last in sub-block order with same being to be inferred to signal non-zeroness, if all preceding sub-block flags preceding in sub-block order signal zeroness. (Compare the above embodiments where in 2.b. it has been stated: "This also includes the coded_sub_block_flag for the DC subblock except when all other coded_sub_block_flag syntax elements are already equal to 0. In this case, the DC coded_sub_block_flag is inferred to be equal to 1")

According to an embodiment the apparatus is configured to in the encoding of the sub-block flags into the data stream for all sub-blocks, encode the sub-block flags into the data stream for all sub-blocks sequentially in a sub-block order, and if all preceding sub-block flags preceding in sub-block order signal zeroness, encode the coefficients within a predetermined sub-block for which sub-block flag being last in sub-block order is inferred to signal non-zeroness sequentially in coefficient order and encode for each coefficient within the predetermined sub-block, except a last coefficient, a significance flag indicating whether the respective coefficient is non-zero, and infer the last coefficient to be non-zero if the other coefficients within the predetermined sub-block are zero, and encode a significance flag for the last coefficient if at least one of the other coefficients within the predetermined sub-block is non-zero. Furthermore the apparatus is configured to in the encoding of the sub-block flags into the data stream except the at least one of the first sub-block flag and the second sub-block flag, encode the sub-block flags into the data stream except the at least one of the first sub-block flag and the second sub-block flag, which are to be inferred to signal non-zeroness, and inevitably encode for all first coefficients within the sub-block to which the second sub-block flag relates, a significance flag indicating whether the respective coefficient is non-zero. (Compare above embodiments where inference for SIG flag at (0,0) took place if all other SIG flags of this sub-block are equal to 0, see 2.b of the description: "In this case, the DC coded_sub_block_flag is inferred to be equal to 1 (inferDcSbCbf=1). Since there has to be at least one significant level in this DC subblock, the sig_coeff_flag syntax element for the first position at (0,0) is not signaled and derived to be equal to 1 (inferSbDcSigCoeffFlag=1) instead if all other sig_coeff_flag syntax elements in this DC subblock are equal to 0.")

According to an embodiment an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding the coefficients of the block of coefficients into the data stream in sub-blocks into which the block of coefficients is partitioned, wherein coefficients within sub-blocks for which a sub-block flag in the data stream signals zeroness, are inferred to be zero, and coefficients within sub-blocks for which a sub-block flag in the data stream signals non-zeroness are encoded into the data stream. The inferring of coefficients to be zero and the encoding non-zeroness coefficients is performed with if the selected transformation is one of the at least one non-identity transformation, sequentially encoding the sub-block flags into the data stream except at least one of a first sub-block flag, and a last sub-block flag, wherein the at least one of the first and last sub-block flags are to be inferred to signal non-zeroness, and if the selected transformation is the identity transformation, encoding the sub-block flags into the data stream for all sub-blocks. The block of coefficients is related to the residual sample array according to the selected transformation, and the predetermined transform block is reconstructible by correcting the prediction for the predetermined transform block using the residual sample array.

According to an embodiment the apparatus is configured to, in the encoding of the sub-block flags into the data stream for all sub-blocks, encode the sub-block flags into the data stream for all sub-blocks sequentially in a sub-block order, and encode a sub-block flag being last in the sub-block order if at least one of preceding sub-block flags preceding in sub-block order, signals non-zeroness, wherein the sub-block flag being last in sub-block order is to be inferred to signal non-zeroness if all preceding sub-block flags preceding in sub-block order, signal zeroness.

According to an embodiment the apparatus is configured to when inferring the sub-block flag being last in sub-block order to signal non-zeroness, infer a last coefficient within the sub-block for which the last sub-block flag is inferred to signal non-zeroness to indicate non-zeroness if all preceding coefficients within said sub-block are zero.

According to an embodiment the apparatus is configured to encode a currently encoded sub-block flag into the data stream by context adaptive entropy encoding and using a context. The context depends on a logical disjunction of sub-block flags relating to sub-blocks neighboring the currently encoded sub-block flag if the selected transformation is one of the at least one non-identity transformation, and a arithmetic sum of sub-block flags relating to sub-blocks neighboring the currently encoded sub-block flag if the selected transformation is the identity transformation.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block.

Furthermore the apparatus is configured to encode, for the predetermined transform block, a block of coefficients into the data stream by encoding the coefficients of the block of coefficients into the data stream in sub-blocks into which the block of coefficients is partitioned, by inferring coefficients within sub-blocks for which a sub-block flag in the data stream signals zeroness, to be zero, and encoding coefficients within sub-blocks for which a sub-block flag in the data stream signals non-zeroness into the data stream, with encoding a currently encoded sub-block flag into the data stream by context adaptive entropy encoding and using a context. The context depends on a logical disjunction of sub-block flags relating to sub-blocks neighboring the currently encoded sub-block flag if the selected transformation is one of the at least one non-identity transformation, and an arithmetic sum of sub-block flags relating to sub-blocks neighboring the currently encoded sub-block flag if the selected transformation is the identity transformation. The block of coefficients is related to the residual sample array according to the selected transformation, and the predetermined transform block is reconstructable by correcting the prediction for the predetermined transform block using the residual sample array.

According to an embodiment the apparatus is configured to encode for a current coefficient within a sub-block for which a sub-block flag in the data stream signals non-zeroness into the data stream a significance flag indicative of whether the current coefficient is zero or not using a context. The context depends on a number of coefficients being non-zero among a first set of coefficients immediately neighboring the current coefficient if the selected transformation is the identity transformation, and depends on a number of coefficients being non-zero among a second set of coefficients which comprises the first set of coefficients and coefficients positioned farther away from the current coefficient than the first set of coefficients, values of the second set of coefficients and a position of the current coefficient if the selected transformation is one of the at least one non-identity transformation.

According to an embodiment an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding for a current coefficient a significance flag indicative of whether the current coefficient is zero or not using a context.

The context depends on a number of coefficients being non-zero among a first set of coefficients immediately neighboring the current coefficient if the selected transformation is the identity transformation, and depends on a number of coefficients being non-zero among a second set of coefficients which comprises the first set of coefficients and coefficients positioned farther away from the current coefficient than the first set of coefficients, values of the second set of coefficients and a position of the current coefficient if the selected transformation is one of the at least one non-identity transformation. The block of coefficients is related to the residual sample array according to the selected transformation, and the predetermined transform block is reconstructible by correcting the prediction for the predetermined transform block using the residual sample array.

According to an embodiment the apparatus is configured to encode a predetermined coefficient by context adaptively entropy encoding N greater-than-X flags indicative of whether an absolute of the predetermined coefficient is greater than X or not, and by encoding, using a variable length code, a remainder indicative of an amount at which the absolute of the predetermined coefficient exceeds an absolute threshold which depends on N, with N being larger if the selected transformation is the identity transformation, than compared to if the selected transformation is one of the at least one non-identity transformation.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding a predetermined coefficient by context adaptively entropy encoding N greater-than-X flags indicative of whether an absolute of the predetermined coefficient is greater than X or not, and by encoding, using a variable length code, a remainder indicative of an amount at which the absolute of the predetermined coefficient exceeds an absolute threshold which depends on N, with N being larger if the selected transformation is the identity transformation, than compared to if the selected transformation is one of the at least one non-identity transformation. The block of coefficients is related to the residual sample array according to the selected transformation, and the predetermined transform block is reconstructible by correcting the prediction of the predetermined transform block using the residual sample array.

According to an embodiment the apparatus is configured to perform the context adaptively entropy encoding of the N greater-than-X flags in a sequence of passes by context adaptively entropy encoding the N greater-than-X flags sequentially with increasing X with one or more of the N greater-than-X flags per pass, wherein the apparatus is configured to log a number of flags coded using context adaptively entropy encoding during the sequence of passes and to cease the context adaptively entropy encoding of the N greater-than-X flags if the number exceeds a predetermined flag threshold.

According to an embodiment, the variable length code is a Rice code, and the apparatus is configured to determine a Rice parameter of the Rice code depending on a first set of coefficients immediately neighboring the predetermined coefficient if the selected transformation is the identity transformation, and depending on a second set of coefficients which comprises the first set of coefficients and coefficients positioned farther away from the predetermined coefficient than the first set of coefficients if the selected transformation is one of the at least one non-identity transformation.

According to an embodiment the apparatus is configured to encode a sign of the predetermined coefficient by context adaptive entropy encoding using a predetermined context and updating a probability associated with the predetermined context if the selected transformation is the identity transformation, and by bypass encoding (e.g. context adaptive entropy encoding with fixed equi-probability) if the selected transformation is one of the at least one non-identity transformation.

According to an embodiment an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding a sign of a predetermined coefficient by context adaptive entropy encoding using a predetermined context and updating a probability associated with the predetermined context if the selected transformation is the identity transformation, and by bypass encoding (e.g. context adaptive entropy encoding with fixed equi-probability) if the selected transformation is one of the at least one non-identity transformation. The block of coefficients is related to the residual sample array according to the selected transformation, and the predetermined transform block is reconstructible by correcting the prediction of the predetermined transform block using the residual sample array.

According to an embodiment the apparatus is configured to if the selected transformation is one of the at least one non-identity transformation, perform the context adaptively entropy encoding of the N greater-than-X flags in a sequence of passes by context adaptively entropy encoding the N greater-than-X flags sequentially with increasing X with one or more of the N greater-than-X flags per pass, and log a number of flags coded using context adaptively entropy encoding during the sequence of passes and to cease the context adaptively entropy encoding the N greater-than-X flags if the number exceeds a predetermined flag threshold. Additionally the apparatus is configured to if the selected transformation is the identity transformation, perform the context adaptively entropy encoding of the N greater-than-X flags sequentially and encode, after encoding a significance flag (X=0) among the N greater-than-X flags and prior to further N greater-than-X flags among the N greater-than-X flags, a greater-than-X-flags-bypass flag indicative of whether the predetermined coefficient is greater than the absolute threshold and cease the context adaptively entropy encoding of the N greater-than-X flags with respect to the further greater-than-X flags in case of the greater-than-X-flags-bypass flag indicating that the predetermined coefficient is greater than the absolute threshold (e.g. and resume the context adaptively entropy encoding of the N greaterthan-X flags with respect to the further greater-than-X flags except a last one of the N greater-than-X flags in case of the greater-than-X-flags-bypass flag indicating that the predetermined coefficient is not greater than the absolute threshold).

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream by encoding a predetermined coefficient by context adaptively entropy encoding N greater-than-X flags indicative of whether an absolute of the predetermined coefficient is greater than X or not, and by encoding, using a variable length code, a remainder indicative of an amount at which the absolute of the predetermined coefficient exceeds an absolute threshold which depends on N. The apparatus is configured to if the selected transformation is one of the at least one non-identity transformation, perform the context adaptively entropy encoding of the N greater-than-X flags in a sequence of passes by context adaptively entropy encoding the N greater-than-X flags sequentially with increasing X with one or more of the N greater-than-X flags per pass, and log a number of flags coded using context adaptively entropy encoding during the sequence of passes and to cease the context adaptively entropy encoding of the N greater-than-X flags if the number exceeds a predetermined flag threshold. Additionally the apparatus is configured to if the selected transformation is the identity transformation, perform the context adaptively entropy encoding of the N greater-than-X flags sequentially and encode, after encoding a significance flag (X=0) among the N greater-than-X flags and prior to further N greater-than-X flags among the N greater-than-X flags, a greater-than-X-flags-bypass flag indicative of whether the predetermined coefficient is greater than the absolute threshold and cease the context adaptively entropy encoding the N greater-than-X flags with respect to the further greater-than-X flags in case of the greater-than-X-flags-bypass flag indicating that the predetermined coefficient is greater than the absolute threshold (e.g. and resume the context adaptively entropy encoding the N greater-than-X flags with respect to the further greater-than-X flags except a last one of the N greater-than-X flags in case of the greater-than-X-flags-bypass flag indicating that the predetermined coefficient is not greater than the absolute threshold). The block of coefficients is related to the residual sample array according to the selected transformation, and the predetermined transform block is reconstructable by correcting the prediction of the predetermined transform block using the residual sample array.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation, and derive a prediction for the predetermined transform block. Furthermore the apparatus is configured to encode, for the predetermined transform block, a block of coefficients into the data stream, in a sequence of passes which traverse the coefficients of the block of coefficients in a predetermined scan order, by, for a predetermined coefficient, context adaptively entropy encoding N greater-than-X flags indicative of whether an absolute of the predetermined coefficient is greater than X or not, by encoding, using a variable length code, a remainder indicative of an amount at which the absolute of the predetermined coefficient exceeds an absolute threshold which depends on N, and by encoding a sign of the predetermined coefficient. The apparatus is configured to differently distribute the encoding of the N greater-than-X flags, the remainder and the sign over the sequence of passes depending on the selected transformation being the identity transformation or being one of the at least one non-identity transformation. The block of coefficients is related to the residual sample array according to the selected transformation, and the predetermined transform block is reconstructible by correcting the prediction of the predetermined transform block using the residual sample array.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by encoding, in a sequence of passes which traverse the coefficients of the block, one or more predetermined flags for each coefficient (e.g. parity flag and/or greater than X flag, sig flag) into the data stream using context adaptively binary entropy encoding, each predetermined flag reducing an absolute value domain of the respective coefficient (e.g. parity bit reduces the absolute value domain to one half by excluding every even or uneven absolute value, and greater than X flags reduce the domain of possible absolute values by either excluding one of the possible absolute values or leaving only this one of the possible absolute values and excluding all others) within which an absolute value of the respective coefficient is positioned (e.g. the absolute value domain starts at the beginning of the one or more passes, for instance, from a general absolute value domain of the coefficients $0 \ldots 2^{X-1}$ in case of X bit representation). Furthermore the apparatus is configured to encode, for the predetermined transform block, a block of coefficients into the data stream by encoding, in a sequence of passes which traverse the coefficients of the block, for each coefficient for which a cardinality of the absolute value domain is not reduced down to one by the one or more predetermined flags encoded for the respective coefficient, a variable length code codeword (e.g. Rice/Exp-Golomb code)_indicating the absolute value of the respective coefficient within the absolute value domain of the respective coefficient (e.g. the code length of the variable length code may monotonically increase with increasing absolute value). The apparatus is configured to encode, for the predetermined transform block, a block of coefficients into the data stream so that the block of coefficients is related to a residual sample array for the predetermined transform block according to the selected transformation, the residual sample array allowing for correcting a prediction for the predetermined transform block to reconstruct the predetermined transform block. The apparatus is configured to, in encoding, in the sequence of passes, the one or more predetermined flags, cease the encoding the one or more predetermined flags as soon as a predetermined number of predetermined flags has been reached (i.e. the overall number of predetermined flags having been encoded so far for all coefficients reaches a limit) so that the cardinality of the absolute value domain within which the pointer points to the absolute value is smaller for a first set of non-zero coefficients compared a second set of non-zero coefficients (namely smaller for coefficients preceding the reaching of the limit within the last pass than compared to coefficients following the reaching of the limit) and use different variable length codes for the variable length code codeword of the first and second sets of non-zero coefficients.

According to an embodiment, the different variable length codes for the variable length code codeword of the first and second sets of non-zero coefficients differ in a binarization boundary (cut off value) between a transitioning from a unary part to a Rice- and Exp-Golomb part and/or a binarization parameter of common binarization scheme.

According to an embodiment, the different variable length codes for the variable length code codeword of the first and second sets of non-zero coefficients differ in a different dependency of a binarization boundary (cut off value) between a transitioning from a unary part to a Rice- and Exp-Golomb part and/or a binarization parameter of common binarization scheme on previous encoded coefficients.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by if the selected transform is a non-identity transformation, encoding the coefficients of the block of coefficients into the data stream along a (possibly following this order several times in several passes) first scan order leading towards a DC coefficient of the non-identity transformation (e.g. from the highest frequency coefficient onwards, possibly starting from the "last" significant coefficient position). Furthermore the apparatus is configured to encode, for the predetermined transform block, a block of coefficients into the data stream by if the selected transform is the identity transformation, encoding the coefficients of the block of coefficients into the data stream along a second scan order leading from an upper left sample position to a lower right sample position. Furthermore the apparatus is configured to encode, for the predetermined transform block, a block of coefficients into the data stream so that the block of coefficients is related to a residual sample array for the predetermined transform block according to the selected transformation (this step may include in case of the identity transformation adding to each coefficient the coefficients residing in the block on a predetermined side such as the left hand side in case of horizontal DPCM or to the top of the respective coefficient in case of vertical DPCM so as to perform DPCM reversal) which allows for correcting a prediction for the predetermined transform block to reconstruct the predetermined transform block.

According to an embodiment the apparatus is configured to select the second scan order depending on DPCM direction using which the predetermined transform block is coded (e.g. horizontal raster scan in case of horizontal DPCM and vertical raster scan in case of vertical DPCM)

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by if the selected transformation is one of the at least one non-identity transformation, encoding a syntax element into the data stream, deriving therefrom whether signs of non-zero coefficients within a predetermined group of non-zero coefficients are equal to each other or not and, if so, the signs of the non-zero coefficients within the predetermined group of non-zero coefficients and, if the signs of the non-zero coefficients within the predetermined group of non-zero coefficients are not equal to each other, encoding the signs of the non-zero coefficients within the predetermined group of non-zero coefficients by encoding sign bits on a per non-zero-coefficient basis. Furthermore the apparatus is configured to encode, for the predetermined transform block, a block of coefficients into the data stream by if the selected transformation is the identity transformation, encoding the signs of the non-zero coefficients within the predetermined group of non-zero coefficients by encoding sign bits on a per non-zero-coefficient basis irrespective of the signs of the non-zero coefficients within the predetermined group of non-zero coefficients being equal to each other or not. Additionally the apparatus is configured to encode, for the predetermined transform block, a block of coefficients into the data stream so that the block of coefficients is related to a residual sample array for the predetermined transform block according to the selected transformation, wherein the residual sample array allows to correct a prediction for the predetermined transform block to reconstruct the predetermined transform block.

According to an embodiment, the apparatus is configured to determine the predetermined group of non-zero coefficients as those non-zero coefficients within the block of coefficients which are located within a predetermined sub-block of the block of coefficients.

According to an embodiment, the apparatus is configured to if the selected transformation is one of the at least one non-identity transformation, encode a further syntax element into the data stream, which signals whether signs of non-zero coefficients within a further predetermined group of non-zero coefficients are equal to each other or not and, if so, the signs of the non-zero coefficients within the further predetermined group of non-zero coefficients and, if the signs of the non-zero coefficients within the further predetermined group of non-zero coefficients are not equal to each other, encode the signs of the non-zero coefficients within the further predetermined group of non-zero coefficients by encoding further sign bits on a per non-zero-coefficient basis, and group non-zero coefficients of the block of coefficients into a plurality of groups of non-zero coefficients including the group of non-zero coefficients and the further group of non-zero coefficients.

According to an embodiment, the apparatus is configured to perform the grouping based on a subdivision of the block of coefficients into sub-blocks so that each group of non-zero coefficients comprises only non-zero coefficients located in one of the sub-blocks.

According to an embodiment, the apparatus is configured to adapt the subdivision with respect to a size of a predetermined sub-block based on signs of one or more non-zero coefficients in one or more of the sub-blocks preceding the predetermined sub-block in a sub-block encoding order, and/or based on signs of previously encoded non-zero coefficients.

According to an embodiment, the apparatus is configured to determine the predetermined group of non-zero coefficients so as to include all non-zero coefficients within the block of coefficients.

According to an embodiment, the apparatus is configured to if the selected transformation is one of the at least one non-identity transformation, encoding a block-global syntax element into the data stream, deriving therefrom whether signs of all non-zero coefficients within the predetermined transform block are equal to each other or not and, if so, the signs of all non-zero coefficients within the predetermined transform block and, if not the signs of all non-zero coefficients within the predetermined transform block are equal to each other, performing the encoding the syntax element into the data stream.

According to an embodiment, an apparatus for encoding a picture using predictive coding and block-based transform residual coding, configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by encoding signs of non-zero coefficients of the predetermined block of coefficients by encoding a sign probability tendency index into the data stream and entropy encoding the sign of a predetermined non-zero coefficient (such as the first in encoding order or one within a certain sub-block of the coefficient block to which the index applies) using context model (a context model which defines a certain sign probability such as the probability to be positive) associated with the sign probability tendency index if the selected transformation is the identity transformation. Furthermore the apparatus is configured to encode, for the predetermined transform block, a block of coefficients into the data stream by encoding signs of non-zero coefficients of the predetermined block of coefficients by bypass encoding (e.g. context adaptive entropy encoding with fixed equi-probability) the sign of the predetermined non-zero coefficient if the selected transformation is one of the at least one non-identity transformation Additionally the apparatus is configured to encode, for the predetermined transform block, a block of coefficients into the data stream by encoding signs of non-zero coefficients of the predetermined block of coefficients so that the block of coefficients is related to a residual sample array for the predetermined transform block according to the selected transformation, wherein a prediction for the predetermined transform block is correctible using the residual sample array to reconstruct the predetermined transform block.

According to an embodiment, the apparatus is configured to entropy encode the signs of all non-zero coefficients using the context model associated with the sign probability tendency index if the selected transformation is the identity transformation, and bypass encode (e.g. context adaptive entropy encoding with fixed equi-probability) the signs of all predetermined non-zero coefficients if the selected transformation is one of the at least one non-identity transformation.

According to an embodiment, the apparatus is configured to update a sign probability associated with the context model associated with the sign probability tendency index based on the sign of the predetermined non-zero coefficient if the selected transformation is the identity transformation.

According to an embodiment, a number of context models are associated with the sign probability tendency index and the apparatus is configured to entropy encode each of the signs of non-zero coefficients using predetermined context models among the number of context models associated with the sign probability tendency index and select the predetermined context model among the number of context models associated with the sign probability tendency index depending on the sign of one or more neighboring non-zero coefficients (such as ones located at positions of a template located at and surrounding the respective sign) if the selected transformation is the identity transformation, and bypass encode (e.g. context adaptive entropy encoding with fixed equi-probability) the signs of all predetermined non-zero coefficients if the selected transformation is one of the at least one non-identity transformation.

According to an embodiment, the apparatus is configured to select the predetermined context model among the number of context models associated with the sign probability tendency index depending on a frequency of a positive or negative sign among the one or more neighboring non-zero coefficients if the selected transformation is the identity transformation.

According to an embodiment, the sign probability tendency index is signaled in the data stream specifically for a sub-block of the coefficient block within which the predetermined non-zero coefficient is located, the predetermined transform block, a coding block containing the predetermined transform block, a picture slice containing the predetermined transform block the picture or a picture sequence containing the picture.

According to an embodiment, the apparatus is configured to insert, into the data stream, an information on which of different sets of context models with different cardinalities (three in case of the example given in the description) applies to the sign probability tendency index, wherein the sign probabilities associated with the context models are distributed more dense within a first set of context models than within a second set of context models having a cardinality lower than the cardinality of the first set of context models. The sign probability tendency index selects the context model as a pointer into the set of context models applying to the sign probability tendency index.

According to an embodiment, the sign probability tendency index is signaled in the data stream specifically for a picture slice containing the predetermined transform block, the picture or a picture sequence containing the picture.

According to an embodiment, an apparatus for encoding a picture using predictive coding and block-based transform residual coding, configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by encoding signs of non-zero coefficients of the predetermined block of coefficients by encoding the sign of a predetermined non-zero coefficient using a predetermined context model among a plurality of context models and select the predetermined context model among the plurality of context models depending on a statistic of signs of previously encoded coefficients if the selected transformation is the identity transformation, and bypass encoding (e.g. context adaptive entropy encoding with fixed equi-probability) the sign of the predetermined non-zero coefficient if the selected transformation is one of the at least one non-identity transformation. Additionally the apparatus is configured to encode, for the predetermined transform block, a block of coefficients into the data stream so that the block of coefficients is related to a residual sample array for the predetermined transform block according to the selected transformation, so that a prediction for the predetermined transform block is correctible using the residual sample array to reconstruct the predetermined transform block.

According to an embodiment, the apparatus is configured to select the predetermined context model depending on a relative frequency of positive or negative signs among non-zero coefficients within the previously encoded coefficients if the selected transformation is the identity transformation.

According to an embodiment, the apparatus is configured to set the number context models of the plurality of context models to a default number.

According to an embodiment, the apparatus is configured to insert information on the number context models of the plurality of context models in the data stream.

According to an embodiment, the apparatus is configured to associate the context models with mutually adjoining and non-overlapping relative frequency intervals for a relative frequency of positive or negative signs and perform the selection so that among the relative frequency of positive or negative signs among non-zero coefficients of the previously encoded coefficients falls into the relative frequency interval associated with the predetermined context model.

According to an embodiment, the apparatus is configured to determine the statistic over the signs of the previously encoded coefficients so that the previously encoded coefficients are spread over a picture or video portion larger than the predetermined transform block.

According to an embodiment, the apparatus is configured to entropy encode the signs of all non-zero coefficients of the predetermined transform block using the predetermined context model if the selected transformation is the identity transformation.

According to an embodiment, the apparatus is configured to entropy encode the signs of a subset of non-zero coefficients of the predetermined transform block located in a sub-block of the block of coefficients and including the non-zero predetermined coefficient using the predetermined context model, and update the statistic using the signs of a subset of non-zero coefficients of the predetermined transform block to obtain an updated statistic, select a further predetermined context model among the plurality of context models depending on the updated statistic and entropy encode the signs of a further subset of non-zero coefficients of the predetermined transform block located in a further sub-block of the block of coefficients using the further predetermined context model if the selected transformation is the identity transformation.

According to an embodiment, the apparatus is configured to update a sign probability associated with the predetermined context model based on the sign of the predetermined non-zero coefficient if the selected transformation is the identity transformation.

According to an embodiment, the plurality of context models is sub-divided into sets of context models and the apparatus is configured to perform the selection by selecting a predetermined set of contexts models based on the statistic of signs of previously encoded coefficients, and by selecting the predetermined context model among the selected set of context models depending on the sign of one or more neighboring non-zero coefficients (such as ones located at positions of a template located at and surrounding the respective sign) if the selected transformation is the identity transformation.

According to an embodiment, an apparatus for encoding a picture using predictive coding and block-based transform residual coding, is configured to select, for a predetermined transform block, a selected transformation out of a predetermined list of transformations, the selected transformation comprising the identity transformation and at least one non-identity transformation. Furthermore the apparatus is configured to encode, for the predetermined transform block, a block of coefficients into the data stream by encoding, in a sequence of passes which traverse the coefficients of the block, one or more predetermined flags for each coefficient (e.g. parity flag and/or greater than X flag, sig flag) from the data stream using context adaptively binary entropy encoding, each predetermined flag reducing an absolute value domain of the respective coefficient (e.g. parity bit reduces the absolute value domain to one half by excluding every even or uneven absolute value, and greater than X flags reduce the domain of possible absolute values by either excluding one of the possible absolute values or leaving only this one of the possible absolute values and excluding all others) within which an absolute value of the respective coefficient is positioned (e.g. the absolute value domain starts at the beginning of the one or more passes, for instance, from a general absolute value domain of the coefficients 0 . . . $2^{X-1}$ in case of X bit representation). Furthermore the apparatus is configured to encode, for the predetermined transform block, a block of coefficients into the data stream by encoding, in a sequence of passes which traverse the coefficients of the block, for each coefficient for which a cardinality of the absolute value domain is not reduced down to one by the one or more predetermined flags encoded for the respective coefficient, a variable length code codeword (e.g. Rice/Exp-Golomb code) for identifying the absolute value of the respective coefficient out of the absolute value domain of the respective coefficient (e.g. the code length of the variable length code may monotonically increase with increasing absolute value; here the codeword is free to refer only to the reduced absolute value domain or the general one or some other being inevitably a proper superset of the reduced absolute value domain)_. Additionally the apparatus is configured to encode, for the predetermined transform block, a block of coefficients into the data stream so that the block of coefficients is related to a residual sample array for the predetermined transform block according to the selected transformation, so that a prediction for the predetermined transform block is correctible using the residual sample array to reconstruct the predetermined transform block. The apparatus is configured to, in encoding, in the sequence of passes, the one or more predetermined flags, cease the encoding the one or more predetermined flags as soon as a predetermined number of predetermined flags has been reached (i.e. the overall number of predetermined flags having been encoded so far for all coefficients reaches a limit) so that the cardinality of the absolute value domain is smaller for a first set of non-zero coefficients compared a second set of non-zero coefficients (namely smaller for coefficients preceding the reaching of the limit within the last pass than compared to coefficients following the reaching of the limit), except with respect to a significance flag among the one or more predetermined flags (which are, thus, encoded using context adaptively binary entropy encoded inevitably), which indicates whether the coefficient for which it is encoded is zero or not, wherein the predetermined number corresponds to an upper limit minus a number of coefficients for which the significance flag has not yet been encoded.

According to an embodiment, a method for decoding a picture using predictive coding and block-based transform residual coding, comprises subdividing the picture into transform bocks of different sizes. Furthermore the method comprises selecting, for a predetermined transform block, a selected transformation by checking whether a size of the predetermined transform block exceeds a predetermined threshold size. If the size of the predetermined transform block exceeds the predetermined threshold size, a default way for selecting the selected transformation is used. If the size of the predetermined transform block does not exceed the predetermined threshold size, a transformation which is pointed to out of a predetermined list of transformations by an index transmitted in the data stream for the predetermined transform block as the selected transformation is used, the predetermined list of transformations comprising an identity transformation and non-identity transformations. Additionally the method comprises decoding, for the predetermined transform block, a block of coefficients from the data stream, if the selected transformation is the identity transformation, using the block of coefficients as residual sample array for the predetermined transform block, and if the selected transformation is not the identity transformation, subjecting the block of coefficients to an inverse transformation corresponding to the selected transformation to obtain the residual sample array for the predetermined transform block. Furthermore the method comprises correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation by decoding an index from the data stream for the predetermined transform block, and by using as the selected transformation, one transformation out of a predetermined list of transformations onto which the index points. Furthermore the method comprises decoding, for the predetermined transform block, a block of coefficients from the data stream, deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block. The method comprises, in decoding, for the predetermined transform block, the block of coefficients from the data stream depending on whether the selected transformation for the predetermined block is contained in a predefined set of one or more transformations. The method comprises, in decoding, for the predetermined transform block, the block of coefficients from the data stream decoding a coded block flag from the data stream signaling whether the block of coefficients has at least one non-zero coefficient, if the selected transformation for the predetermined block is contained in the predefined set of one or more transformations, and inferring that the block of coefficients has at least one non-zero coefficient, if the selected transformation for the predetermined block is not contained in the predefined set of one or more transformations (in other words, then not decoding the CBF from the data stream, or in even other words, decode a syntax element different from a current portion of the data stream from which the CBF is decoded if the selected transformation for the predetermined block is contained in the predefined set of one or more transformations).

According to an embodiment, a method for decoding a picture using predictive coding and block-based transform residual coding, comprises decoding, for the predetermined transform block, a block of coefficients from the data stream, including decoding a coded block flag from the data stream signaling whether the block of coefficients has at least one non-zero coefficient. The method comprises, if the coded block flag signals that the block of coefficients has at least one non-zero coefficient, selecting, for a predetermined transform block, a selected transformation by decoding an index from the data stream for the predetermined transform block, and use as the selected transformation, one transformation out of a predetermined list of transformations onto which the index points, deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block. Furthermore the method comprises, if the coded block flag signals that the block of coefficients does not have at least one non-zero coefficient, reconstructing the predetermined transform block without prediction correction (in other words, then not decoding the index from the data stream, such as by decoding a syntax element different from the index from a current portion of the data stream from which the index is decoded if the coded block flag signals that the block of coefficients does not have at least one non-zero coefficient).

According to an embodiment, a method for decoding a picture using predictive coding and block-based transform residual coding, comprises populating, or populating and sorting, a predetermined list of transformations depending on the data stream. The method comprises selecting, for a predetermined transform block, a selected transformation by decoding an index from the data stream using a variable length code, so that each transformation in the predetermined list of transformations has assigned one codeword of the variable length code and a code word length of the codewords of the variable length code monotonically increases with a rank of the transformation in the predetermined list of transformations to which the codewords are assigned, and by using as the selected transformation, one transformation out of a predetermined list of transformations onto which the index points. Furthermore the method comprises decoding, for the predetermined transform block, a block of coefficients from the data stream, deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation by decoding an index into a predetermined list of transformations from the data stream using a composed variable length code codewords of which are composed of a first codeword of a variable length code followed by, if the first codeword is a longest codeword of the variable length code, a second codeword of a fixed length code. The codewords of the composed variable length code merely composed of one of two non-longest codewords of the variable length code are assigned to, and discriminate, an identity transformation and a predefined non-identity transformation contained in the predetermined list of transformations and further codewords of the composed variable length code are assigned to, and discriminate, further non-identity transformations of the predetermined list of transformations. The method comprises selecting, for a predetermined transform block, a selected transformation by using as the selected transformation, one transformation out of a predetermined list of transformations onto which the index points. Furthermore the method comprises decoding, for the predetermined transform block, a block of coefficients from the data stream, deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by checking whether the selected transform is a non-identity transformation. If the selected transform is a non-identity transformation, the method comprises decoding a position information from the data stream on where along a scanning order which traverses all coefficients of the block of coefficients, a non-zero coefficient is encountered first or where along a scanning order which traverses all coefficients of the block of coefficients, a non-zero coefficient is encountered last, so as to obtain predetermined coefficient position (Note the following. In the above embodiments, this position is called last position measured along a scan order leading from upper left corner to bottom right, although the actual scanning started coding started there according to these embodiments. That is the actual coding took place in a reverse scan order leading from bottom-right to top-left corner. Here, the scanning order is the coding order), and the method comprises decoding first coefficients of the block of coefficients from the data stream, which include all non-zero coefficients of the block of coefficients and are traversed by the scanning order starting from or up to the predetermined coefficient position, and inferring second coefficients of the block of coefficients, different from the first coefficients, to be zero. If the selected transform is the identity transformation, the method comprises decoding all coefficients of the block of coefficients from the data stream. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding the coefficients of the block of coefficients from the data stream in sub-blocks into which the block of coefficients is partitioned, by inferring coefficients within sub-blocks for which a sub-block flag in the data stream signals zeroness, to be zero, and decoding coefficients within sub-blocks for which a sub-block flag in the data stream signals non-zeroness from the data stream. If the selected transformation is one of the at least one non-identity transformation, sequentially decoding the sub-block flags from the data stream except at least one of a first sub-block flag, and a last sub-block flag, and inferring the at least one of the first and last sub-block flags to signal non-zeroness, and if the selected transformation is the identity transformation, decoding the sub-block flags from the data stream for all sub-blocks. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding the coefficients of the block of coefficients from the data stream in sub-blocks into which the block of coefficients is partitioned, by inferring coefficients within sub-blocks for which a sub-block flag in the data stream signals zeroness, to be zero, and decoding coefficients within sub-blocks for which a sub-block flag in the data stream signals non-zeroness from the data stream, with decoding a currently decoded sub-block flag from the data stream by context adaptive entropy decoding and using a context. The context depends on a logical disjunction of sub-block flags relating to sub-blocks neighboring the currently decoded sub-block flag if the selected transformation is one of the at least one non-identity transformation, and the context depends on an arithmetic sum of sub-block flags relating to sub-blocks neighboring the currently decoded sub-block flag if the selected transformation is the identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding for a current coefficient a significance flag indicative of whether the current coefficient is zero or not using a context. The context depends on a number of coefficients being non-zero among a first set of coefficients immediately neighboring the current coefficient if the selected transformation is the identity transformation, and the context depends on a number of coefficients being non-zero among a second set of coefficients which comprises the first set of coefficients and coefficients positioned farther away from the current coefficient than the first set of coefficients, values of the second set of coefficients and a position of the current coefficient if the selected transformation is one of the at least one non-identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding a predetermined coefficient by context adaptively entropy decoding N greater-than-X flags indicative of whether an absolute of the predetermined coefficient is greater than X or not. Furthermore the method comprises decoding, for the predetermined transform block, a block of coefficients from the data stream by decoding a predetermined coefficient by decoding, using a variable length code, a remainder indicative of an amount at which the absolute of the predetermined coefficient exceeds an absolute threshold which depends on N, with N being larger if the selected transformation is the identity transformation, than compared to if the selected transformation is one of the at least one non-identity transformation. Additionally the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding a sign of a predetermined coefficient by context adaptive entropy decoding using a predetermined context and updating a probability associated with the predetermined context if the selected transformation is the identity transformation, and by bypass decoding (e.g. context adaptive entropy decoding with fixed equi-probability) if the selected transformation is one of the at least one non-identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding a predetermined coefficient by context adaptively entropy decoding N greater-than-X flags indicative of whether an absolute of the predetermined coefficient is greater than X or not. Additionally the method comprises decoding, for the predetermined transform block, a block of coefficients from the data stream by decoding a predetermined coefficient by decoding, using a variable length code, a remainder indicative of an amount at which the absolute of the predetermined coefficient exceeds an absolute threshold which depends on N. If the selected transformation is one of the at least one non-identity transformation, performing the context adaptively entropy decoding of the N greater-than-X flags in a sequence of passes by context adaptively entropy decoding the N greater-than-X flags sequentially with increasing X with one or more of the N greater-than-X flags per pass, and logging a number of flags coded using context adaptively entropy decoding during the sequence of passes and ceasing the context adaptively entropy decoding of the N greater-than-X flags if the number exceeds a predetermined flag threshold. If the selected transformation is the identity transformation, performing the context adaptively entropy decoding of the N greater-than-X flags sequentially and decoding, after decoding a significance flag (X=0) among the N greater-than-X flags and prior to further N greater-than-X flags among the N greater-than-X flags, a greater-than-X-flags-bypass flag indicative of whether the predetermined coefficient is greater than the absolute threshold and cease the context adaptively entropy decoding of the N greater-than-X flags with respect to the further greater-than-X flags in case of the greater-than-X-flags-bypass flag indicating that the predetermined coefficient is greater than the absolute threshold (e.g. and resume the context adaptively entropy decoding of the N greater-than-X flags with respect to the further greater-than-X flags except a last one of the N greater-than-X flags in case of the greater-than-X-flags-bypass flag indicating that the predetermined coefficient is not greater than the absolute threshold). Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream, in a sequence of passes which traverse the coefficients of the block of coefficients in a predetermined scan order, by, for a predetermined coefficient, context adaptively entropy decoding N greater-than-X flags indicative of whether an absolute of the predetermined coefficient is greater than X or not, decoding, using a variable length code, a remainder indicative of an amount at which the absolute of the predetermined coefficient exceeds an absolute threshold which depends on N, and decoding a sign of the predetermined coefficient, wherein the method comprises differently distributing the decoding of the N greater-than-X flags, the remainder and the sign over the sequence of passes depending on the selected transformation being the identity transformation or being one of the at least one non-identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding, in a sequence of passes which traverse the coefficients of the block, one or more predetermined flags for each coefficient from the data stream using context adaptively binary entropy decoding, each predetermined flag reducing an absolute value domain of the respective coefficient within which an absolute value of the respective coefficient is positioned. Furthermore the method comprises decoding, for the predetermined transform block, a block of coefficients from the data stream by decoding, in a sequence of passes which traverse the coefficients of the block, for each coefficient for which a cardinality of the absolute value domain is not reduced down to one by the one or more predetermined flags decoded for the respective coefficient, a variable length code codeword indicating the absolute value of the respective coefficient within the absolute value domain of the respective coefficient. Additionally the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block. The method comprises, in decoding, in the sequence of passes, the one or more predetermined flags, ceasing the decoding of the one or more predetermined flags as soon as a predetermined number of predetermined flags has been reached so that the cardinality of the absolute value domain within which the pointer points to the absolute value is smaller for a first set of non-zero coefficients compared a second set of non-zero coefficients, and using different variable length codes for the variable length code codeword of the first and second sets of non-zero coefficients.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by if the selected transform coefficients is a non-identity transformation, decoding the coefficients of the block of coefficients from the data stream along a first scan order leading towards a DC coefficient of the non-identity transformation, and if the selected transform is the identity transformation, decoding the coefficients of the block of coefficients from the data stream along a second scan order leading from an upper left sample position to a lower right sample position. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by if the selected transformation is one of the at least one non-identity transformation, decoding a syntax element from the data stream, deriving therefrom whether signs of non-zero coefficients within a predetermined group of non-zero coefficients are equal to each other or not and, if so, the signs of the non-zero coefficients within the predetermined group of non-zero coefficients and, if the signs of the non-zero coefficients within the predetermined group of non-zero coefficients are not equal to each other, decoding the signs of the non-zero coefficients within the predetermined group of non-zero coefficients by decoding sign bits on a per non-zero-coefficient basis. Furthermore the method comprises decoding, for the predetermined transform block, a block of coefficients from the data stream by if the selected transformation is the identity transformation, decoding the signs of the non-zero coefficients within the predetermined group of non-zero coefficients by decoding sign bits on a per non-zero-coefficient basis irrespective of the signs of the non-zero coefficients within the predetermined group of non-zero coefficients being equal to each other or not. Additionally the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding signs of non-zero coefficients of the predetermined block of coefficients by deriving a sign probability tendency index from the data stream and entropy decoding the sign of a predetermined non-zero coefficient using a context model associated with the sign probability tendency index if the selected transformation is the identity transformation, and by bypass decoding the sign of the predetermined non-zero coefficient if the selected transformation is one of the at least one non-identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding signs of non-zero coefficients of the predetermined block of coefficients by decoding the sign of a predetermined non-zero coefficient using a predetermined context model among a plurality of context models and select the predetermined context model among the plurality of context models depending on a statistic of signs of previously decoded coefficients if the selected transformation is the identity transformation, and by bypass decoding the sign of the predetermined non-zero coefficient if the selected transformation is one of the at least one non-identity transformation. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block.

According to an embodiment, a method for decoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises decoding, for the predetermined transform block, a block of coefficients from the data stream by decoding, in a sequence of passes which traverse the coefficients of the block, one or more predetermined flags for each coefficient from the data stream using context adaptively binary entropy decoding, each predetermined flag reducing an absolute value domain of the respective coefficient within which an absolute value of the respective coefficient is positioned. Additionally the method comprises decoding, for the predetermined transform block, a block of coefficients from the data stream by decoding, in a sequence of passes which traverse the coefficients of the block, for each coefficient for which a cardinality of the absolute value domain is not reduced down to one by the one or more predetermined flags decoded for the respective coefficient, a variable length code codeword for identifying the absolute value of the respective coefficient out of the absolute value domain of the respective coefficient. Furthermore the method comprises deriving from the block of coefficients a residual sample array for the predetermined transform block so that the block of coefficients is related to the residual sample array according to the selected transformation and correcting a prediction for the predetermined transform block using the residual sample array to reconstruct the predetermined transform block. The method comprises, in decoding, in the sequence of passes, the one or more predetermined flags, ceasing the decoding the one or more predetermined flags as soon as a predetermined number of predetermined flags has been reached so that the cardinality of the absolute value domain is smaller for a first set of non-zero coefficients compared a second set of non-zero coefficients, except with respect to a significance flag among the one or more predetermined flags, which indicates whether the coefficient for which it is decoded is zero or not, wherein the predetermined number corresponds to an upper limit minus a number of coefficients for which the significance flag has not yet been decoded.

According to an embodiment, a method for encoding a picture using predictive coding and block-based transform residual coding, comprises subdividing the picture into transform bocks of different sizes and selecting, for a predetermined transform block, a selected transformation by checking whether a size of the predetermined transform block exceeds a predetermined threshold size. If the size of the predetermined transform block exceeds the predetermined threshold size, the method comprises using a default way for selecting the selected transformation, and if the size of the predetermined transform block does not exceed the predetermined threshold size, the method comprises choosing a transformation out of a predetermined list of transformations and transmit in the data stream an index which points to the chosen transform out of the predetermined list of transformations so as to be used for the predetermined transform block as the selected transformation, the predetermined list of transformations comprising an identity transformation and non-identity transformations. Furthermore the method comprises predicting the predetermined transform block and encode, for the predetermined transform block, a block of coefficients into the data stream, so that if the selected transformation is the identity transformation, the block of coefficients is to be used as residual sample array for correcting the prediction to reconstruct the predetermined transform block, and so that if the selected transformation is not the identity transformation, the block of coefficients is to be subject to an inverse transformation corresponding to the selected transformation to obtain the residual sample array for the predetermined transform block.

According to an embodiment, a method for encoding a picture using predictive coding and block-based transform residual coding, comprises selecting, for a predetermined transform block, a selected transformation out of a predetermined list of transformations onto and encoding an index into the data stream for the predetermined transform block, which points in the predetermined list of transformations onto the selected transformation. The method comprises predicting the predetermined transform block and encoding, for the predetermined transform block, a block of coefficients into the data stream, so that from the block of coefficients a residual sample array for the predetermined transform block is derivable so that the block of coefficients is related to the residual sample array according to the selected transformation, and so that the prediction for the predetermined transform block is correctable using the residual sample array to reconstruct the predetermined transform block. The method comprises, in encoding, for the predetermined transform block, the block of coefficients into the data stream depending on whether the selected transformation for the predetermined block is contained in a predefined set of one or more transformations. Thus the method comprises encoding a coded block flag into the data stream signaling whether the block of coefficients has at least one non-zero coefficient, if the selected transformation for the predetermined block is contained in the predefined set of one or more transformations, and the method comprises refraining from encoding the coded block flag into the data stream with the coded block flag having to be inferred at encoder side as signaling that the block of coefficients has at least one non-zero coefficient, if the selected transformation for the predetermined block is not contained in the predefined set of one or more transformations.

According to an embodiment, a method for encoding a picture using predictive coding and block-based transform residual coding, comprises predicting a predetermined transform block and encoding, for the predetermined transform block, a block of coefficients into the data stream, including encoding a coded block flag into the data stream signaling whether the block of coefficients has at least one non-zero coefficient. The method comprises, if the coded block flag signals that the block of coefficients has at least one non-zero coefficient, selecting, for a predetermined transform block, a selected transformation out of a predetermined list of transformations and encoding an index into the data stream for the predetermined transform block which points in the predetermined list of transformations onto the selected transformation. From the block of coefficients a residual sample array for the predetermined transform block is derivable so that the block of coefficients is related to the residual sample array according to the selected transformation, and so that the prediction for the predetermined transform block is correctable using the residual sample array to reconstruct the predetermined transform block. Additionally the method comprises, if the coded block flag signals that the block of coefficients does not have at least one non-zero coefficient, the predetermined transform block is to be reconstructed without prediction correction.

According to an embodiment, a method for encoding a picture using predictive coding and block-based transform residual coding, comprises populating, or populating and sorting, a predetermined list of transformations depending on the data stream, and selecting, for a predetermined transform block, a selected transformation out of the predetermined list of transformations. Furthermore the method comprises encoding an index into the data stream which points onto the selected transformation in the predetermined list of transformations using a variable length code, so that each transformation in the predetermined list of transformations has assigned one codeword of the variable length code and a code word length of the codewords of the variable length code monotonically increases with a rank of the transformation in the predetermined list of transformations to which the codewords are assigned. Additionally the method comprises deriving a prediction for the predetermined transform block and encoding, for the predetermined transform block, a block of coefficients into the data stream, so that from the block of coefficients a residual sample array for the predetermined transform block is derivable so that the block of coefficients is related to the residual sample array according to the selected transformation, and so that the predetermined transform block is reconstructible by prediction for the predetermined transform block is correctable using the residual sample array to reconstruct the predetermined transform block.

According to an embodiment, a method for encoding a picture using predictive coding and block-based transform residual coding, comprises deriving a prediction for a predetermined transform block, and selecting, for a predetermined transform block, a selected transformation from a predetermined list of. The method comprises encoding an index into a predetermined list of transformations into the data stream which points onto the selected transformation using a composed variable length code codewords of which are composed of a first codeword of a variable length code followed by, if the first codeword is a longest codeword of the variable length code, a second codeword of a fixed length code. The codewords of the composed variable length code merely composed of one of two non-longest codewords of the variable length code are assigned to, and discriminate, an identity transformation and a predefined non-identity transformation contained in the predetermined list of transformations and further codewords of the composed variable length code are assigned to, and discriminate, further non-identity transformations of the predetermined list of transformations. Furthermore the method comprises encoding, for the predetermined transform block, a block of coefficients into the data stream, so that the block of coefficients is related to the residual sample array according to the selected transformation, and so that the predetermined transform block is reconstructible by correcting the prediction of the predetermined transform block using the residual sample array.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises deriving a prediction for the predetermined transform block and encode, for the predetermined transform block, a block of coefficients into the data stream by checking whether the selected transform is a non-identity transformation. If the selected transform is a non-identity transformation, the method comprises encoding a position information into the data stream on where along a scanning order which traverses all coefficients of the block of coefficients, a non-zero coefficient is encountered first or where along a scanning order which traverses all coefficients of the block of coefficients, a non-zero coefficient is encountered last, so as to obtain predetermined coefficient position, and the method comprises encoding first coefficients of the block of coefficients into the data stream, which include all non-zero coefficients of the block of coefficients and are traversed by the scanning order starting from or up to the predetermined coefficient position, and inferring second coefficients of the block of coefficients, different from the first coefficients, to be zero. If the selected transform is the identity transformation, the method comprises encoding all coefficients of the block of coefficients into the data stream. The block of coefficients is related to the residual sample array according to the selected transformation and the predetermined transform block is reconstructible by correcting the prediction thereof using the residual sample array.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation and deriving a prediction for the predetermined transform block. The method comprises encoding, for the predetermined transform block, a block of coefficients into the data stream by encoding the coefficients of the block of coefficients into the data stream in sub-blocks into which the block of coefficients is partitioned, wherein coefficients within sub-blocks for which a sub-block flag in the data stream signals zeroness, are inferred to be zero, and coefficients within sub-blocks for which a sub-block flag in the data stream signals non-zeroness are encoded into the data stream. If the selected transformation is one of the at least one non-identity transformation, the method comprises encoding the coefficients of the block of coefficients into the data stream with sequentially encoding the sub-block flags into the data stream except at least one of a first sub-block flag, and a last sub-block flag, wherein the at least one of the first and last sub-block flags are to be inferred to signal non-zeroness, and if the selected transformation is the identity transformation, the method comprises encoding the coefficients of the block of coefficients into the data stream with encoding the sub-block flags into the data stream for all sub-blocks. The block of coefficients is related to the residual sample array according to the selected transformation, and the predetermined transform block is reconstructible by correcting the prediction for the predetermined transform block using the residual sample array.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation and deriving a prediction for the predetermined transform block. The method comprises encoding, for the predetermined transform block, a block of coefficients into the data stream by encoding the coefficients of the block of coefficients into the data stream in sub-blocks into which the block of coefficients is partitioned, by inferring coefficients within sub-blocks for which a sub-block flag in the data stream signals zeroness, to be zero, and encoding coefficients within sub-blocks for which a sub-block flag in the data stream signals non-zeroness into the data stream, with encoding a currently encoded sub-block flag into the data stream by context adaptive entropy encoding and using a context. The context depends on a logical disjunction of sub-block flags relating to sub-blocks neighboring the currently encoded sub-block flag if the selected transformation is one of the at least one non-identity transformation, and the context depends on an arithmetic sum of sub-block flags relating to sub-blocks neighboring the currently encoded sub-block flag if the selected transformation is the identity transformation. The block of coefficients is related to the residual sample array according to the selected transformation, and the predetermined transform block is reconstructible by correcting the prediction for the predetermined transform block using the residual sample array.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation and deriving a prediction for the predetermined transform block. The method comprises encoding, for the predetermined transform block, a block of coefficients into the data stream by encoding for a current coefficient a significance flag indicative of whether the current coefficient is zero or not using a context. The context depends on a number of coefficients being non-zero among a first set of coefficients immediately neighboring the current coefficient if the selected transformation is the identity transformation, and the context depends on a number of coefficients being non-zero among a second set of coefficients which comprises the first set of coefficients and coefficients positioned farther away from the current coefficient than the first set of coefficients, values of the second set of coefficients and a position of the current coefficient if the selected transformation is one of the at least one non-identity transformation. The block of coefficients is related to the residual sample array according to the selected transformation, and the predetermined transform block is reconstructible by correcting the prediction for the predetermined transform block using the residual sample array.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation and deriving a prediction for the predetermined transform block. The method comprises encoding, for the predetermined transform block, a block of coefficients into the data stream by encoding a predetermined coefficient by context adaptively entropy encoding N greater-than-X flags indicative of whether an absolute of the predetermined coefficient is greater than X or not. Furthermore the method comprises encoding, for the predetermined transform block, a block of coefficients into the data stream by encoding a predetermined coefficient by encoding, using a variable length code, a remainder indicative of an amount at which the absolute of the predetermined coefficient exceeds an absolute threshold which depends on N, with N being larger if the selected transformation is the identity transformation, than compared to if the selected transformation is one of the at least one non-identity transformation. The block of coefficients is related to the residual sample array according to the selected transformation, and the predetermined transform block is reconstructible by correcting the prediction of the predetermined transform block using the residual sample array.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation and deriving a prediction for the predetermined transform block. The method comprises encoding, for the predetermined transform block, a block of coefficients into the data stream by encoding a sign of a predetermined coefficient by context adaptive entropy encoding using a predetermined context and updating a probability associated with the predetermined context if the selected transformation is the identity transformation, and the method comprises encoding, for the predetermined transform block, a block of coefficients into the data stream by encoding a sign of a predetermined coefficient by bypass encoding if the selected transformation is one of the at least one non-identity transformation. The block of coefficients is related to the residual sample array according to the selected transformation, and the predetermined transform block is reconstructible by correcting the prediction of the predetermined transform block using the residual sample array.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation and deriving a prediction for the predetermined transform block. The method comprises encoding, for the predetermined transform block, a block of coefficients into the data stream by encoding a predetermined coefficient by context adaptively entropy encoding N greater-than-X flags indicative of whether an absolute of the predetermined coefficient is greater than X or not. Additionally the method comprises encoding, for the predetermined transform block, a block of coefficients into the data stream by encoding a predetermined coefficient by encoding, using a variable length code, a remainder indicative of an amount at which the absolute of the predetermined coefficient exceeds an absolute threshold which depends on N. If the selected transformation is one of the at least one non-identity transformation, the method comprises performing the context adaptively entropy encoding of the N greater-than-X flags in a sequence of passes by context adaptively entropy encoding the N greater-than-X flags sequentially with increasing X with one or more of the N greater-than-X flags per pass, and log a number of flags coded using context adaptively entropy encoding during the sequence of passes and to cease the context adaptively entropy encoding of the N greater-than-X flags if the number exceeds a predetermined flag threshold, and if the selected transformation is the identity transformation, the method comprises performing the context adaptively entropy encoding of the N greater-than-X flags sequentially and encode, after encoding a significance flag (X=0) among the N greater-than-X flags and prior to further N greater-than-X flags among the N greater-than-X flags, a greater-than-X-flags-bypass flag indicative of whether the predetermined coefficient is greater than the absolute threshold and cease the context adaptively entropy encoding the N greater-than-X flags with respect to the further greater-than-X flags in case of the greater-than-X-flags-bypass flag indicating that the predetermined coefficient is greater than the absolute threshold. The block of coefficients is related to the residual sample array according to the selected transformation, and the predetermined transform block is reconstructible by correcting the prediction of the predetermined transform block using the residual sample array.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation and deriving a prediction for the predetermined transform block. The method comprises encoding, for the predetermined transform block, a block of coefficients into the data stream, in a sequence of passes which traverse the coefficients of the block of coefficients in a predetermined scan order, by, for a predetermined coefficient, context adaptively entropy encoding N greater-than-X flags indicative of whether an absolute of the predetermined coefficient is greater than X or not. Additionally the method comprises encoding, for the predetermined transform block, a block of coefficients into the data stream, in a sequence of passes which traverse the coefficients of the block of coefficients in a predetermined scan order, by, for a predetermined coefficient, encoding, using a variable length code, a remainder indicative of an amount at which the absolute of the predetermined coefficient exceeds an absolute threshold which depends on N, and the method comprises encoding, for the predetermined transform block, a block of coefficients into the data stream, in a sequence of passes which traverse the coefficients of the block of coefficients in a predetermined scan order, by, for a predetermined coefficient, encoding a sign of the predetermined coefficient. Furthermore the method comprises differently distributing the encoding of the N greater-than-X flags, the remainder and the sign over the sequence of passes depending on the selected transformation being the identity transformation or being one of the at least one non-identity transformation. The block of coefficients is related to the residual sample array according to the selected transformation, and the predetermined transform block is reconstructible by correcting the prediction of the predetermined transform block using the residual sample array.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises encoding, for the predetermined transform block, a block of coefficients into the data stream by encoding, in a sequence of passes which traverse the coefficients of the block, one or more predetermined flags for each coefficient into the data stream using context adaptively binary entropy encoding, each predetermined flag reducing an absolute value domain of the respective coefficient within which an absolute value of the respective coefficient is positioned, and by encoding, in a sequence of passes which traverse the coefficients of the block, for each coefficient for which a cardinality of the absolute value domain is not reduced down to one by the one or more predetermined flags encoded for the respective coefficient, a variable length code codeword indicating the absolute value of the respective coefficient within the absolute value domain of the respective coefficient. Furthermore the method comprises encoding, for the predetermined transform block, a block of coefficients into the data stream so that the block of coefficients is related to a residual sample array for the predetermined transform block according to the selected transformation, the residual sample array allowing for correcting a prediction for the predetermined transform block to reconstruct the predetermined transform block. The method comprises, in encoding, in the sequence of passes, the one or more predetermined flags, ceasing the encoding the one or more predetermined flags as soon as a predetermined number of predetermined flags has been reached so that the cardinality of the absolute value domain within which the pointer points to the absolute value is smaller for a first set of non-zero coefficients compared a second set of non-zero coefficients and using different variable length codes for the variable length code codeword of the first and second sets of non-zero coefficients.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises encoding, for the predetermined transform block, a block of coefficients into the data stream by if the selected transform is a non-identity transformation, encoding the coefficients of the block of coefficients into the data stream along a first scan order leading towards a DC coefficient of the non-identity transformation. Additionally the method comprises encoding, for the predetermined transform block, a block of coefficients into the data stream by if the selected transform is the identity transformation, encoding the coefficients of the block of coefficients into the data stream along a second scan order leading from an upper left sample position to a lower right sample position. The method comprises encoding, for the predetermined transform block, a block of coefficients into the data stream so that the block of coefficients is related to a residual sample array for the predetermined transform block according to the selected transformation which allows for correcting a prediction for the predetermined transform block to reconstruct the predetermined transform block.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises encoding, for the predetermined transform block, a block of coefficients into the data stream by if the selected transformation is one of the at least one non-identity transformation, encoding a syntax element into the data stream, deriving therefrom whether signs of non-zero coefficients within a predetermined group of non-zero coefficients are equal to each other or not and, if so, the signs of the non-zero coefficients within the predetermined group of non-zero coefficients and, if the signs of the non-zero coefficients within the predetermined group of non-zero coefficients are not equal to each other, encoding the signs of the non-zero coefficients within the predetermined group of non-zero coefficients by encoding sign bits on a per non-zero-coefficient basis. Furthermore the method comprises encoding, for the predetermined transform block, a block of coefficients into the data stream by if the selected transformation is the identity transformation, encoding the signs of the non-zero coefficients within the predetermined group of non-zero coefficients by encoding sign bits on a per non-zero-coefficient basis irrespective of the signs of the non-zero coefficients within the predetermined group of non-zero coefficients being equal to each other or not. Additionally the method comprises encoding, for the predetermined transform block, a block of coefficients into the data stream so that the block of coefficients is related to a residual sample array for the predetermined transform block according to the selected transformation, wherein the residual sample array allows to correct a prediction for the predetermined transform block to reconstruct the predetermined transform block.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises encoding, for the predetermined transform block, a block of coefficients into the data stream by encoding signs of non-zero coefficients of the predetermined block of coefficients by encoding a sign probability tendency index into the data stream and entropy encoding the sign of a predetermined non-zero coefficient using context model associated with the sign probability tendency index if the selected transformation is the identity transformation, and the method comprises encoding, for the predetermined transform block, a block of coefficients into the data stream by encoding signs of non-zero coefficients of the predetermined block of coefficients by bypass encoding the sign of the predetermined non-zero coefficient if the selected transformation is one of the at least one non-identity transformation. Furthermore the method comprises encoding, for the predetermined transform block, a block of coefficients into the data stream by encoding signs of non-zero coefficients of the predetermined block of coefficients so that the block of coefficients is related to a residual sample array for the predetermined transform block according to the selected transformation, wherein a prediction for the predetermined transform block is correctible using the residual sample array to reconstruct the predetermined transform block.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises encoding, for the predetermined transform block, a block of coefficients into the data stream by encoding signs of non-zero coefficients of the predetermined block of coefficients by encoding the sign of a predetermined non-zero coefficient using a predetermined context model among a plurality of context models and select the predetermined context model among the plurality of context models depending on a statistic of signs of previously encoded coefficients if the selected transformation is the identity transformation, and the method comprises encoding, for the predetermined transform block, a block of coefficients into the data stream by encoding signs of non-zero coefficients of the predetermined block of coefficients by bypass encoding the sign of the predetermined non-zero coefficient if the selected transformation is one of the at least one non-identity transformation. Furthermore the method comprises encoding, for the predetermined transform block, a block of coefficients into the data stream by encoding signs of non-zero coefficients of the predetermined block of coefficients so that the block of coefficients is related to a residual sample array for the predetermined transform block according to the selected transformation, so that a prediction for the predetermined transform block is correctible using the residual sample array to reconstruct the predetermined transform block.

According to an embodiment, a method for encoding a picture using predictive coding and block-based transform residual coding, comprises selecting, for a predetermined transform block, a selected transformation out of a predetermined list of transformations, the selected transformation comprising the identity transformation and at least one non-identity transformation. The method comprises encoding, for the predetermined transform block, a block of coefficients into the data stream by encoding, in a sequence of passes which traverse the coefficients of the block, one or more predetermined flags for each coefficient from the data stream using context adaptively binary entropy encoding, each predetermined flag reducing an absolute value domain of the respective coefficient within which an absolute value of the respective coefficient is positioned, and the method comprises encoding, for the predetermined transform block, a block of coefficients into the data stream by encoding, in a sequence of passes which traverse the coefficients of the block, for each coefficient for which a cardinality of the absolute value domain is not reduced down to one by the one or more predetermined flags encoded for the respective coefficient, a variable length code codeword for identifying the absolute value of the respective coefficient out of the absolute value domain of the respective coefficient. The method comprises encoding, for the predetermined transform block, a block of coefficients into the data stream so that the block of coefficients is related to a residual sample array for the predetermined transform block according to the selected transformation, so that a prediction for the predetermined transform block is correctible using the residual sample array to reconstruct the predetermined transform block. Furthermore the method comprises, in encoding, in the sequence of passes, the one or more predetermined flags, ceasing the encoding the one or more predetermined flags as soon as a predetermined number of predetermined flags has been reached so that the cardinality of the absolute value domain is smaller for a first set of non-zero coefficients compared a second set of non-zero coefficients, except with respect to a significance flag among the one or more predetermined flags, which indicates whether the coefficient for which it is encoded is zero or not, wherein the predetermined number corresponds to an upper limit minus a number of coefficients for which the significance flag has not yet been encoded.

According to an embodiment, a data stream is encoded by a method according to any one of the above described embodiments.

An embodiment relates to a computer program having a program code for executing a method according to any one of the above described embodiments, when the program runs on one or several computers.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for decoding a picture comprising:
   a processor configured to:
      select, for a transform block, a transformation out of a predetermined list of transformations comprising an identity transformation and at least one non-identity transformation;
      decode, for the transform block, a block of coefficients from a data stream based on the selected transformation, wherein:
         to decode the block of coefficients when the selected transformation is a non-identity transformation, the processor is configured to:
            decode, from the data stream, position information for acquiring a coefficient position, the position information indicating where along a scanning order traversing all coefficients of the block of coefficients, a non-zero coefficient is encountered first or where along the scanning order a non-zero coefficient is encountered last,
            decode first coefficients of the block of coefficients from the data stream, the first coefficients comprise all non-zero coefficients of the block of coefficients and are traversed by the scanning order starting from or up to the coefficient position, and
            infer second coefficients of the block of coefficients to be zero, the second coefficients different from the first coefficients,
         to decode the block of coefficients when the selected transformation is the identity transformation, the processor is configured to decode all coefficients of the block of coefficients from the data stream;
      derive from the block of coefficients a residual sample array for the transform block so that the block of coefficients is related to the residual sample array according to the selected transformation; and
      correct a prediction for the transform block using the residual sample array to reconstruct the transform block.

2. The apparatus of claim 1, wherein:
decoding the first coefficients of the block of coefficients from the data stream, the processor is configured to:
start the decoding of the first coefficients at the coefficient position, so that the first coefficients are traversed by the scanning order starting from the coefficient position, or
finish the decoding of the first coefficients at the coefficient position, so that the first coefficients are traversed by the scanning order up to the coefficient position,
decoding all of the coefficients of the block of coefficients from the data stream, the processor is configured to sequentially decode all coefficients starting or finishing at a coefficient of the block of coefficients which is traversed last by the scanning order.

3. The apparatus of claim 1, wherein decoding all coefficients of the block of coefficients from the data stream, the processor is configured to:
use the scanning order and finish the decoding of all coefficients at a coefficient of the block of coefficients traversed last by the scanning order or
use an inverse scanning order and start the decoding of all coefficients at the coefficient of the block of coefficients traversed last by the scanning order.

4. The apparatus of claim 1, wherein to decode the position information, the processor is configured to:
decoding decode coordinates of the coefficient position from the data stream, or
decode a rank of the coefficient position within the scanning order from the data stream.

5. An apparatus for encoding a picture comprising:
a processor configured to:
select, for a transform block, a transformation out of a predetermined list of transformations comprising an identity transformation and at least one non-identity transformation;
derive a prediction for the transform block; and
encode, for the transform block, a block of coefficients into a data stream based on the selected transformation,
wherein to encode the block of coefficients when the selected transformation is a non-identity transformation, the processor is configured to:
encode, into the data stream, position information for acquiring a coefficient position, the position information indicating where along a scanning order traversing all coefficients of the block of coefficients, a non-zero coefficient is encountered first or where along the scanning order a non-zero coefficient is encountered last,
encode first coefficients of the block of coefficients into the data stream, the first coefficients comprise all non-zero coefficients of the block of coefficients and are traversed by the scanning order starting from or up to the coefficient position, and
infer second coefficients of the block of coefficients to be zero, the second coefficients different from the first coefficients,
wherein to encode the block of coefficients when the selected transformation is the identity transformation, the processor is configured to encode all coefficients of the block of coefficients into the data stream,
wherein the block of coefficients is related to a residual sample array according to the selected transformation, and
wherein the transform block is reconstructible by correcting the prediction thereof using the residual sample array.

6. A method for decoding a picture, comprising:
selecting, for a transform block, a transformation out of a predetermined list of transformations comprising an identity transformation and at least one non-identity transformation;
decoding, for the transform block, a block of coefficients from a data stream based on the selected transformation, wherein:
decoding the block of coefficients when the selected transformation is a non-identity transformation, comprises
decoding, from the data stream, position information for acquiring a coefficient position, the position information indicating where along a scanning order traversing all coefficients of the block of coefficients, a non-zero coefficient is encountered first or where along the scanning order a non-zero coefficient is encountered last,
decoding first coefficients of the block of coefficients from the data stream, the first coefficients comprise all non-zero coefficients of the block of coefficients and are traversed by the scanning order starting from or up to the coefficient position, and
inferring second coefficients of the block of coefficients to be zero, the second coefficients, different from the first coefficients,
decoding the block of coefficients when the selected transform is the identity transformation, comprises decoding all coefficients of the block of coefficients from the data stream;
deriving from the block of coefficients a residual sample array for the transform block so that the block of coefficients is related to the residual sample array according to the selected transformation; and
correcting a prediction for the transform block using the residual sample array to reconstruct the transform block.

7. A method for encoding a picture comprising:
selecting, for a transform block, a transformation out of a predetermined list of transformations comprising an identity transformation and at least one non-identity transformation;
deriving a prediction for the transform block; and
encode, for the transform block, a block of coefficients into a data stream based on the selected transformation,
wherein encoding the block of coefficients when the selected transformation is a non-identity transformation, comprises:
encoding, into the data stream, position information for acquiring a coefficient position, the position information indicating where along a scanning order traversing all coefficients of the block of coefficients, a non-zero coefficient is encountered first or where along the scanning order a non-zero coefficient is encountered last,
encoding first coefficients of the block of coefficients into the data stream, the first coefficients comprise all non-zero coefficients of the block of coefficients and are traversed by the scanning order starting from or up to the coefficient position, and
inferring second coefficients of the block of coefficients to be zero, the second coefficients different from the first coefficients, wherein encoding the block of coefficients when the selected transformation is the identity transformation, comprises encoding all coefficients of the block of coefficients into the data stream, wherein the block of coefficients is related to a residual sample array according to the selected transformation, and wherein the transform block is reconstructible by correcting the prediction thereof using the residual sample array.

8. A non-transitory computer-readable medium comprising program code, wherein the program code that, when executed by a processor of a decoding device, causes the processor to:

select, for a transform block, a transformation out of a predetermined list of transformations comprising an identity transformation and at least one non-identity transformation;

decode, for the transform block, a block of coefficients from a data stream based on the selected transformation, wherein:

the program code that when executed cause the processor to decode the block of coefficients when the selected transformation is a non-identity transformation, comprise program code that when executed cause the processor to:

decode, from the data stream, position information for acquiring a coefficient position, the position information indicating where along a scanning order traversing all coefficients of the block of coefficients, a non-zero coefficient is encountered first or where along the scanning order a non-zero coefficient is encountered last, decode first coefficients of the block of coefficients from the data stream, the first coefficients comprise all non-zero coefficients of the block of coefficients and are traversed by the scanning order starting from or up to the coefficient position, and infer second coefficients of the block of coefficients to be zero, the second coefficients different from the first coefficients, the program code that when executed cause the processor to decode the block of coefficients when the selected transformation is the identity transformation, comprise program code that when executed cause the processor to decode all coefficients of the block of coefficients from the data stream;

derive from the block of coefficients a residual sample array for the transform block so that the block of coefficients is related to the residual sample array according to the selected transformation; and correct a prediction for the transform block using the residual sample array to reconstruct the transform block.

9. A non-transitory computer-readable medium comprising program code, wherein the program code that, when executed by a processor of an encoding device, causes the processor to:

select, for a transform block, a transformation out of a predetermined list of transformations comprising an identity transformation and at least one non-identity transformation;

derive a prediction for the transform block; and encode, for the transform block, a block of coefficients into a data stream based on the selected transformation, the program code that when executed cause the processor to encode the block of coefficients when the selected transformation is a non-identity transformation, comprise program code that when executed cause the processor to:

encode, into the data stream, position information for acquiring a coefficient position, the position information indicating where along a scanning order traversing all coefficients of the block of coefficients, a non-zero coefficient is encountered first or where along the scanning order a non-zero coefficient is encountered last, encode first coefficients of the block of coefficients into the data stream, the first coefficients comprise all non-zero coefficients of the block of coefficients and are traversed by the scanning order starting from or up to the coefficient position, and infer second coefficients of the block of coefficients to be zero, the second coefficients different from the first coefficients;

the program code that when executed cause the processor to encode the block of coefficients when the selected transformation is the identity transformation comprise program code that when executed cause the processor to encode all coefficients of the block of coefficients into the data stream, wherein the block of coefficients is related to a residual sample array according to the selected transformation, and wherein the transform block is reconstructible by correcting the prediction thereof using the residual sample array.

* * * * *